United States Patent
Yamanouchi et al.

(10) Patent No.: US 6,800,673 B2
(45) Date of Patent: Oct. 5, 2004

(54) INK FOR INK JET RECORDING, METHOD OF PRODUCING INK FOR INK JET RECORDING, AND INK JET RECORDING METHOD

(75) Inventors: Junichi Yamanouchi, Kanagawa (JP); Takahiro Ishizuka, Kanagawa (JP); Yoshiharu Yabuki, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 22 days.

(21) Appl. No.: 09/922,842

(22) Filed: Aug. 7, 2001

(65) Prior Publication Data

US 2002/0143079 A1 Oct. 3, 2002

(30) Foreign Application Priority Data

Aug. 7, 2000 (JP) ........................... 2000-238817
Jul. 30, 2001 (JP) ........................... 2001-230507

(51) Int. Cl.⁷ .................. C09D 11/10; C08K 5/23; C08K 5/3415; C08K 5/3445; C08K 5/3472
(52) U.S. Cl. ................. 523/160; 524/87; 524/88; 524/91; 524/94; 524/105; 524/106; 524/556; 524/589; 524/601; 524/609; 523/334
(58) Field of Search ................ 523/160, 161, 523/334; 106/31.43, 31.49; 524/87, 88, 91, 94, 96, 104, 105, 106, 190, 556, 589, 601, 609

(56) References Cited

U.S. PATENT DOCUMENTS

| 4,016,152 | A | * | 4/1977 | Dehnert et al. ............. 534/657 |
| 4,101,541 | A | * | 7/1978 | Petitpierre et al. ........... 534/769 |
| 4,246,154 | A | * | 1/1981 | Yao .............................. 524/88 |
| 4,665,411 | A | * | 5/1987 | Kiritani et al. ............. 503/213 |
| 5,302,437 | A | * | 4/1994 | Idei et al. .................... 428/195 |
| 5,508,421 | A | * | 4/1996 | Suzuki et al. ............. 548/262.4 |
| 5,753,017 | A | * | 5/1998 | Onodera et al. .......... 106/31.49 |
| 6,235,096 | B1 | * | 5/2001 | Meyrick et al. .......... 106/31.43 |
| 6,342,094 | B1 | * | 1/2002 | Kabalnov ................. 106/31.25 |
| 2002/0017217 | A1 | * | 2/2002 | Mizukawa et al. ....... 106/31.47 |

FOREIGN PATENT DOCUMENTS

| JP | 01095093 A | * | 4/1989 |
| JP | 03231975 A | * | 10/1991 |
| JP | 5-76977 | | 10/1993 |
| JP | 09059552 A | * | 3/1997 |
| JP | 10-279873 | | 10/1998 |

OTHER PUBLICATIONS

English Translation of JP 09059552 A (1997).*
English Translation of JP 03231975 A (1991).*

* cited by examiner

Primary Examiner—Callie Shosho
(74) Attorney, Agent, or Firm—Burns, Doane, Swecker & Mathis, L.L.P.

(57) ABSTRACT

An ink for ink jet recording which inclides a water-insoluble ionic group-containing polymer added to a colored fine particle dispersion containing at least a hydrophobic high-boiling organic solvent having a boiling point of 150° C. or more and an oil-soluble dye. In a preferred embodiment, the water-insoluble ionic group-containing polymer is converted by emulsification dispersion into a fine particle dispersion and added to the colored fine particle dispersion, and the oil-soluble dye is represented by specific formulae.

27 Claims, No Drawings

INK FOR INK JET RECORDING, METHOD OF PRODUCING INK FOR INK JET RECORDING, AND INK JET RECORDING METHOD

BACKGROUND OF THE INVENTION

1. Field of the Invention

The present invention relates to an ink for ink jet recording comprising an aqueous colored fine particle dispersion containing an oil-soluble dye, a method of manufacturing the ink for ink jet recording, and an ink jet recording method using the ink for ink jet recording. In particular, the present invention relates to an ink for ink jet recording preferable for a thermal, piezoelectric, electric field or acoustic ink jet recording system, excellent in the qualities of recorded images, superior in image water resistance and image fastness properties and excellent in the stability of the ink with time and in discharge stability, as well as a method of manufacturing said ink for ink jet recording and an ink jet recording method using the same.

2. Description of the Related Art

As computers have spread in recent years, ink jet printers are widely utilized for printing on paper, film, cloth, etc. not only in offices but also in homes. As inks for ink jet recording, there are known oily, aqueous and solid inks, among which the aqueous inks are mainly used, because of advantages such as easy production, handling, smelling, safety, etc.

Many of these aqueous inks make use of water-soluble dyes to be dissolved in a molecular state, so there are the advantages of high transparency and high color density, but because these dyes are water-soluble, there are the problem of insufficient water resistance causing bleeding which deteriorates qualities upon printing on paper, as well as poor light resistance.

For the purpose of solving the problems described above, aqueous inks using pigments or dispersed dyes are proposed in e.g. JP-A 56-157468, JP-A 4-18468, JP-A 8-183920, JP-A 10-110126 and JP-A 10-195355.

However, there are the problems that the water resistance of these aqueous inks is improved at a certain degree but is still not satisfactory, the pigment inks are inferior in coloration to the dye inks, the above pigment inks or dye-dispersed inks are poor in shell stability and easily cause clogging in nozzles for discharge of ink.

In addition, a recording paper provided thereon with an ink receiving layer containing a porous inorganic pigment (hereinafter also referred to as "photograph-quality paper"), which came to be used with an increasing demand for high-quality pictures in recent ink jet technology, is poor in stainability with said aqueous inks using pigments or dispersed dyes, and such pigments or dyes are easily removed from the surface upon rubbing with hands.

In addition, JP-A 58-45272, JP-A 6-340835, JP-A 7-268254, JP-A 7-268257 and JP-A 7-268260 propose respectively a method wherein a dye is included in polyurethane- or polyester-dispersed particles.

However, the dispersions described in these literatures have the disadvantage that colored particles excellent in dispersion stability are hardly obtained when the dye is included at a desired concentration, and these dispersions also have the above-described problem of removal of the dye.

Further, JP-A 10-279873 discloses a method of producing colored polymer fine particles by dissolving an acrylic polymer and an oil-soluble dye in an organic solvent, dispersing them, and removing the organic solvent, but there is a problem with the qualities of recorded images particularly on a photograph-quality paper medium or with stability in continuous recording, and another problem is that the stability of the dispersion with time cannot be satisfactory.

On the other hand, JP-B 5-76977 discloses an ink composition wherein an oil-soluble dye is dissolved and dispersed in an organic solvent having low water solubility and specific gravity similar to that of water, but it was revealed that the organic solvent defined therein is generally poor in compatibility with the oil-soluble dye, thus making recording density low, and in some cases the dye is precipitated during storage to cause clogging of nozzles. Further, this dispersion similar to those dispersions described above also has a problem in stability with time.

SUMMARY OF THE INVENTION

The problem of the present invention is to solve the problems described in the prior art described above thereby achieving the following object.

The object of the present invention is to provide an ink for ink jet recording preferable for a thermal, piezoelectric, electric field or acoustic ink jet recording system, not depending on paper, excellent in color reproduction and color tone upon printing on an arbitrarily selected paper, capable of high recording density, excellent in ink penetration into a photograph-quality paper, solving the problem of staining just after printing, excellent in image water resistance and image fastness properties, and also excellent in the stability of the ink with time and in discharge stability, a method of manufacturing said ink for ink jet recording, and an ink jet recording method capable of high-quality recording by use of said ink for ink jet recording.

The means for solving the problem described above is as follows. That is, the present invention relates to an ink for ink jet recording which includes a water-insoluble ionic group-containing polymer added to a colored fine particle dispersion containing at least a hydrophobic high-boiling organic solvent having a boiling point of 150° C. or more and an oil-soluble dye.

The ink for ink jet recording may be characterized in that the water-insoluble ionic group-containing polymer is converted by emulsification dispersion into a fine particle dispersion and added to the colored fine particle dispersion.

The ink for ink jet recording may be characterized in that the oil-soluble dye is represented by formula (I):

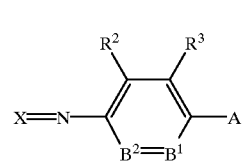

Formula (I)

wherein X represents a residue of a color-photographic coupler; A represents —NR$^4$R$^5$ or a hydroxyl group; R$^4$ and R$^5$ each independently represents a hydrogen atom, an aliphatic group, an aromatic group or a heterocyclic group; B$^1$ represents =C(R$^6$)— or =N—; B$^2$ represents —C(R$^7$)= or —N=; R$^2$, R$^3$, R$^6$ and R$^7$ each independently represents a hydrogen atom, a halogen atom, an aliphatic group, an aromatic group, a heterocyclic group, a cyano group, —OR$^{51}$, —SR$^{52}$, —CO$_2$R$^{53}$, —OCOR$^{54}$, —NR$^{55}$R$^{56}$, —CONR$^{57}$R$^{58}$, —SO$_2$R$^{59}$, —SO$_2$NR$^{60}$R$^{61}$, —$NR^{62}CONR^{63}R^{64}$, —$NR^{65}CO_2R^{66}$, —$COR^{67}$, —$NR^{68}COR^{69}$ or —$NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group; and $R^2$ and $R^3$, $R^3$ and $R^4$, $R^4$ and $R^5$, $R^5$ and $R^6$, and $R^6$ and $R^7$ may be bound to each other form a ring.

The ink for ink jet recording may be characterized in that the content of the hydrophobic high-boiling organic solvent in the colored fine particles is 25% by weight or more.

The ink for ink jet recording may be characterized in that the water-insoluble ionic group-containing polymer has 0.1 to 3.0 mmol/g of ionic groups.

The ink for ink jet recording may be characterized in that the ionic group in the water-insoluble ionic group-containing polymer is a carboxyl group and/or a sulfonic acid group.

The ink for ink jet recording may be characterized in that the relative dielectric constant of the hydrophobic high-boiling organic solvent is 3 to 12 at 25° C.

The ink for ink jet recording may be characterized in that the average particle diameter of the colored fine particles in the colored fine particle dispersion is 100 nm or less.

Further, the present invention provides an ink jet recording method which comprises using an ink for ink jet recording described as follows.

The ink jet recording method may be characterized in that an image-receiving material to be recorded comprises an ink receiving layer containing a porous inorganic pigment on a support.

Further, the present invention provides a method of manufacturing an ink for ink jet recording, which includes the steps of allowing colored fine particles containing at least a hydrophobic high-boiling organic solvent having a boiling point of 150° C. or more and an oil-soluble dye to be dispersed in an aqueous medium to prepare a colored fine particle dispersion, and mixing a fine particle dispersion prepared by emulsification dispersion of a water-insoluble ionic group-containing polymer with the colored fine particle dispersion.

DETAILED DESCRIPTION OF THE PREFERRED EMBODIMENTS (I) Ink for Ink Jet Recording

Hereinafter, the ink for ink jet recording according to the present invention is described.

The ink for inkjet recording according to the present invention includes an ionic group-containing water-insoluble polymer added to a colored fine particle dispersion containing at least a hydrophobic high-boiling organic solvent having a boiling point of 150° C. or more and an oil-soluble dye. The expressions "an ionic group-containing polymer" and "a water-insoluble polymer" used herein are defined as "an ionic group-containing water-insoluble polymer".

Colored Fine Particle Dispersion

Now, the colored fine particle dispersion is described.

The colored fine particle dispersion of the present invention comprises a colored fine particle dispersion containing at least a hydrophobic high-boiling organic solvent having a boiling point of 150° C. or more and an oil-soluble dye dispersed in an aqueous medium.

Specifically, the colored fine particle dispersion of the present invention is a dispersion wherein a hydrophobic high-boiling organic solvent having a boiling point of 150° C. or more and an oil-soluble dye are dispersed as fine oil droplets (that is, in an emulsified and dispersed state) in an aqueous medium.

The "aqueous medium" in the present invention refers to water or a mixture of water and a small amount of a water-miscible organic solvent, to which additives such as a surfactant, a wetting agent, a stabilizer, a preservative, etc. have been added as necessary.

The oil-soluble dye contained in the colored fine particle dispersion is described.

Of oil-soluble dyes usable in the present invention, a yellow dye may be an arbitrary one. Examples thereof include aryl or heteryl azo dyes having phenols, naphthols, anilines, pyrazolones, pyridones, or closed-chain active methylene compounds as coupling components; azomethine dyes having closed-chain methylene compounds as coupling components; methine dyes such as benzylidene dye and monomethine oxonol dye; quinone type dyes such as naphthoquinone dye, anthraquinone dye, etc., and other dyes including quinophthalone dyes, nitro-nitroso dyes, acridine dyes and acridinone dyes.

Of the oil-soluble dyes usable in the present invention, a magenta dye may be an arbitrary one. Examples thereof include aryl or heteryl azo dyes having phenols, naphthols or anilines as coupling components; azomethine dyes having pyrazolones or pyrazolotriazoles as coupling components; methine dyes such as allylidene dye, styryl dye, merocyanine dye, and oxonol dye; carbonium dyes such as diphenyl methane dye, triphenyl methane dye and xanthene dye; quinone type dyes such as naphthoquinone, anthraquinone and anthraxpyridone; and fused polycyclic dyes such as dioxazine dyes.

Of the oil-soluble dyes usable in the present invention, a cyan dye may be an arbitrary one. Examples thereof include indoaniline dyes, indophenol dyes, or azomethine dyes having pyrrolotriazoles as coupling components; polymethine dyes such as cyanine dye, oxonol dye and merocyanine dye; carbonium dyes such as diphenyl methane dye, triphenyl methane dye and xanthene dye; phthalocyanine dye; anthraquinone dye; aryl or heteryl azo dyes and indigo thioindigo dyes having phenols, naphthols or anilines as coupling components.

The respective dyes described above may be those showing a yellow, magenta or cyan color upon dissociation of a portion of chromophores, and the counter cation in this case may be an alkali metal or an inorganic cation such as ammonium, or may be an organic cation such as pyridium or quaternary ammonium salt or a polymer cation having the same in partial structure.

Among these oil-soluble dyes, preferable examples include, but are not limited to, the following:

Preferable examples are C.I. Solvent Black 3, 7, 27, 29 and 34; C.I. Solvent Yellow 14, 16, 19, 29, 30, 56, 82, 93 and 162; C.I. Solvent Red 1, 3, 8, 18, 24, 27, 43, 49, 51, 72, 73, 109, 122, 132 and 218; C.I. Solvent Violet 3; C.I. Solvent Blue 2, 11, 25, 35 and 70; C.I. Solvent Green 3 and 7; and C.I. Solvent Orange 2, etc.

More preferable examples are Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS™ (Orient Kagaku Co., Ltd.), Neopen Yellow 075, Neopen Magenta SE1378, Neopen Blue 808, Neopen Blue FF4012, and Neopen Cyan FF4238™ (BASF).

In the present invention, dispersion dyes can also be used within a range in which they are dissolved in a water-immiscible organic solvent, and preferable examples thereof include, but are not limited to, the followings.

Preferable examples include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9, etc.

Among the oil-soluble dyes, the compounds represented by formulae (I), (M-I) and (C-I) shown below are preferable. Among them, formulae (M-I) and (C-I) are more preferable for magenta colorants and cyan colorants, respectively.

The compounds represented by formula (I) are described, and are preferably compounds wherein at least one group in the formula (I) is within the preferable scope defined below, more preferably those compounds wherein more groups are within the preferable scope and most preferably those compounds wherein all groups are within the preferable scope.

Formula (I)

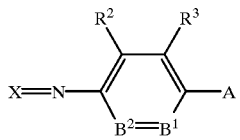

In the formula (I) above, X represents a residue of a color-photographic coupler; A represents —$NR^4R^5$ or a hydroxyl group; and $R^4$ and $R^5$ each independently represents a hydrogen atom, an aliphatic group, an aromatic group or a heterocyclic group.

A is preferably —$NR^4R^5$, and each of $R^4$ and $R^5$ is preferably a hydrogen atom and an aliphatic group, more preferably a hydrogen atom, an alkyl group or a substituted alkyl group, and most preferably a hydrogen atom, a $C_{1-18}$ alkyl group or a $C_{1-18}$ substituted alkyl group.

In the formula (I) above, $B^1$ represents =$C(R^6)$— or =N—; $B^2$ represents —$C(R^7)$= or —N=; preferably, $B^1$ and $B^2$ are not simultaneously —N=, and more preferably $B^1$ is =$C(R^6)$—, and $B^2$ is —$C(R^7)$=.

In the formula (I) above, $R^2$, $R^3$, $R^6$ and $R^7$ each independently represents a hydrogen atom, a halogen atom, an aliphatic group, an aromatic group, a heterocyclic group, a cyano group, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$ or —$NR^{70}SO_2R^{71}$.

$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group.

Among these groups, each of $R^2$ and $R^7$ is preferably a hydrogen atom, a halogen atom, an aliphatic group, —$OR^{51}$, —$NR^{62}CONR^{63}R^{64}$, —$NR^{65}CO_2R^{66}$, —$NR^{68}COR^{69}$ or —$NR^{70}SO_2R^{71}$; more preferably a hydrogen atom, a fluorine atom, a chlorine atom, an alkyl group, a substituted alkyl group, —$NR^{62}CONR^{63}R^{64}$ or —$NR^{68}COR^{69}$; particularly preferably a hydrogen atom, a chlorine atom, a $C_{1-10}$ alkyl group or a $C_{1-10}$ substituted alkyl group; and most preferably a hydrogen atom, a $C_{1-4}$ alkyl group and a $C_{1-4}$ substituted alkyl group.

Among these groups, each of $R^3$ and $R^6$ is preferably a hydrogen atom, a halogen atom or an aliphatic group, more preferably a hydrogen atom, a fluorine atom, a chlorine atom, an alkyl group or a substituted alkyl group, particularly preferably a hydrogen atom, a chlorine atom, a $C_{1-10}$ alkyl group or a $C_{1-10}$ substituted alkyl group, and most preferably a hydrogen atom, a $C_{1-4}$ alkyl group or a $C_{1-4}$ substituted alkyl group.

In the formula (I) above, $R^2$ and $R^3$, $R^3$ and $R^4$, $R^4$ and $R^5$, $R^5$ and $R^6$, and $R^6$ and $R^7$ may mutually bond to form a ring. The combinations that form rings are particularly preferably the combinations $R^3$ and $R^4$, $R^4$ and $R^5$, and $R^5$ and $R^6$.

A ring formed by mutual linkage of $R^2$ and $R^3$ or $R^6$ and $R^7$ is preferably a 5- or 6-membered ring. The ring is preferably an aromatic ring (e.g., a benzene ring, etc.) or an unsaturated heterocyclic ring (e.g., a pyridine ring, imidazole ring, thiazole ring, pyrimidine ring, pyrrole ring, furan ring, etc.).

A ring formed by mutual linkage of $R^3$ and $R^4$ or $R^5$ and $R^6$ is preferably a 5- or 6-membered ring. The ring is preferably a tetrahydroquinoline ring or dihydroindole ring.

A ring formed by mutual linkage of $R^4$ and $R^5$ is preferably a 5- or 6-membered ring. The ring is preferably a pyrrolidine ring, piperidine ring or morpholine ring.

In this specification, an aliphatic group means an alkyl group, substituted alkyl group, alkenyl group, substituted alkenyl group, alkynyl group, substituted alkynyl group, aralkyl group or substituted aralkyl group.

The aralkyl group may be branched or cyclic. The number of carbon atoms in the alkyl group is preferably 1 to 20, more preferably 1 to 18.

The alkyl moiety in the substituted alkyl group is the same as the above-described alkyl group.

The alkenyl group may be branched or cyclic. The number of carbon atoms in the alkenyl group is preferably 2 to 20, more preferably 2 to 18.

The alkenyl moiety in the substituted alkenyl group is the same as the above-described alkenyl group.

The alkynyl group may be branched or cyclic. The number of carbon atoms in the alkynyl group is preferably 2 to 20, more preferably 2 to 18.

The alkynyl moiety in the substituted alkynyl group is the same as the above-described alkyl group.

The alkyl moiety in the aralkyl group and the substituted aralkyl group is the same as the above-described alkyl group.

The aryl moiety in the aralkyl group and the substituted aralkyl group is the same as the above-described aryl group.

Substituent groups on the alkyl moieties in the substituted alkyl group, the substituted alkenyl group, the substituted alkynyl group and the substituted aralkyl group include e.g. a halogen atom, a cyano group, a nitro group, a heterocyclic group, —$OR^{111}$, —$SR^{112}$, —$CO_2R^{113}$, —$NR^{114}R^{115}$, —$OCNR^{116}R^{117}$, —$SO_2R^{118}$ and —$SO_2NR^{119}R^{120}$.

$R^{111}$, $R^{112}$, $R^{113}$, $R^{114}$, $R^{115}$, $R^{116}$, $R^{117}$, $R^{118}$, $R^{119}$ and $R^{120}$ each independently represents a hydrogen atom, an aliphatic group or an aromatic group.

Substituent groups on the aryl moiety in the substituted aralkyl group are the same as substituent groups on the substituted aryl group described below.

In this specification, an aromatic group means an aryl group or a substituted aryl group.

The aryl group is preferably a phenyl group or a naphthyl group, more preferably a phenyl group.

The aryl moiety in the substituted aryl group is the same as the above-described aryl group.

Substituent groups on the substituted aryl group include a halogen atom, a cyano group, a nitro group, an aliphatic group, a heterocyclic group, —$OR^{121}$, —$SR^{122}$, —$CO_2R^{123}$, —$NR^{124}R^{125}$, —$CONR^{126}R^{127}$, —$SO_2R^{128}$ and —$SO_2NR^{129}R^{130}$.

$R^{121}$, $R^{122}$, $R^{123}$, $R^{124}$, $R^{125}$, $R^{126}$, $R^{127}$, $R^{128}$, $R^{129}$ and $R^{130}$ each independently represents a hydrogen atom, an aliphatic group or an aromatic group.

In this specification, heterocyclic groups include groups having either a saturated heterocyclic ring or an unsaturated heterocyclic group. The heterocyclic ring is preferably a 5- or 6-membered ring. Further, the heterocyclic ring may have an aliphatic ring, an aromatic ring or another heterocyclic ring fused therewith.

The hetero-atom in the heterocyclic ring includes e.g. a boron atom, a nitrogen atom, an oxygen atom, a sulfur atom, a selenium atom, a tellurium atom, etc. Among these atoms, a nitrogen atom, an oxygen atom and a sulfur atom are preferable.

The heterocyclic ring is preferably a ring wherein of the atoms constituting the heterocyclic ring, a carbon atom has a free valence (monovalence) (the heterocyclic ring is bound via the carbon atom).

The saturated heterocyclic ring includes e.g. a pyrrolidine ring, a morpholine ring, a 2-bora-1,3-dioxolane ring and a 1,3-thiazolidine ring.

The unsaturated heterocyclic ring includes an imidazole ring, a thiazole ring, a benzothiazole ring, a benzoxazole ring, a benzotriazole ring, a benzoselenazole ring, a pyridine ring, a pyrimidine ring and a quinoline ring.

The heterocyclic ring may have a substituent group. The substituent group includes a halogen atom, a cyano group, a nitro group, an aliphatic group, an aromatic group, a heterocyclic group, $-OR^{131}$, $-SR^{132}$, $-CO_2R^{133}$, $-NR^{134}R^{135}$, $-CONR^{136}R^{137}$, $-SO_2R^{138}$ and $-SO_2NR^{139}R^{140}$.

$R^{131}$, $R^{132}$, $R^{133}$ $R^{134}$, $R^{135}$, $R^{136}$, $R^{137}$, $R^{138}$, $R^{139}$ and $R^{140}$ each independently represents a hydrogen atom, an aliphatic group or an aromatic group.

The couplers described above are preferably the following couplers.

The yellow couplers include the couplers represented by formulae (I) and (II) in U.S. Pat. Nos. 3,933,501, 4,022,620, 4,326,024, 4,401,752 and 4,248,961, JP-B 58-10739, British Patent Nos. 1,425,020 and 1,476,760, U.S. Pat. Nos. 3,973, 968, 4,314,023 and 4,511,649, European Patent Nos. 249, 473A and 502,424A, the couplers represented by formulae (1) and (2) (particularly Y-28 on page 18) in European Patent No. 513,496A, the couplers represented by formula (I) in claim 1 in European Patent No. 568,037A, the couplers represented by formula (I) in lines 45 to 55 in column 1 in U.S. Pat. No. 5,066,576, the couplers represented by formula (I) in column 0008 in JP-A 4-274,425, the couplers described in claim 1 on page 40 (particularly D-35 on page 18) in European Patent No. 498,381A1, the couplers represented by formula (Y) on page 4 (particularly Y-1 (page 17) and Y-54 (page 41)) in European Patent No. 447,969A1, the couplers represented by formulae (II) to (IV) in lines 36 to 58 in column 7 (particularly II-17, II-19 (column 17), and II-24 (column 19)) in U.S. Pat. No. 4,476,219.

The magenta couplers include those in U.S. Pat. Nos. 4,310,619, 4,351,897, European Patent No. 73,636, U.S. Pat. Nos. 3,061,432 and 3,725,067, Research Disclosure No. 24220 (June, 1984), Research Disclosure No. 24230 (June, 1984), JP-A 60-33552, JP-A 60-43659, JP-A 61-72238, JP-A 60-35730, JP-A 55-118034, JP-A 60-185951, U.S. Pat. Nos. 4,500,630, 4,540,654 and 4,556,630, International Publication WO88/04795, JP-A 3-39737 (L-57 (lower right column on page 11), L-68 (lower right column on page 12), L-77 (lower right column on page 13)), [A-4]-63 (page 134) and [A-4]-73, and [A-4]-75 (page 139) in European Patent No. 456,257, M-4, M-6 (page 26) and M-7 (page 27) in European Patent No. 486,965, M-45 (page 19) in European Patent No. 571,959A, (M-1) (page 6) in JP-A 5-204106, and M-22 in paragraph 0237 of JP-A 4-362631.

The cyan couplers include the couplers in U.S. Pat. Nos. 4,052,212, 4,146,396, 4,228,233 and 4,296,200, European Patent No. 73,636, CX-1, -3, -4, -5, -11, -12, -14 and -15 (pages 14 to 16) in JP-A 4-204843; C-7, 10 (page 35), 34, and 35 (page 37), (I-1) and (I-17) (pages 42 to 43) in JP-A 4-43345; and the couplers represented by formula (Ia) or (Ib) in claim 1 in JP-A 6-67385.

In addition, the couplers described in JP-A 62-215272 (page 91), JP-A 2-33144 (pages 3 and 30), EP355,660A (pages, 4, 5, 45 and 47) are also useful.

Among the compounds represented by formula (I) above, the magenta dyes are more preferably compounds represented by formula (II):

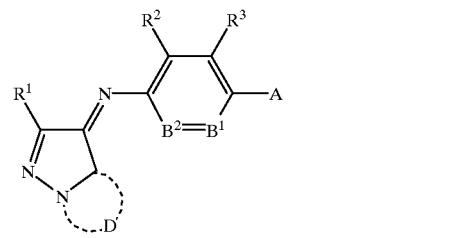

Formula (II)

In formula (II) above, $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$ or $-NR^{30}SO_2R^{31}$; $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group or an aromatic group; and $R^2$, $R^3$, A, $B^1$ and $B^2$ have the same meanings as defined in formula (I) above and their preferable scope is the same as defined above.

In the formula (II) above, D represents an atomic group forming a 5- or 6-membered nitrogenous heterocyclic ring which may be substituted with at least one substituent group. Further, said heterocyclic ring may further form a fused ring with another ring.

At least one substituent group on the atomic group forming a 5- or 6-membered nitrogenous heterocyclic ring, represented by D, is an aliphatic group, an aromatic group, a heterocyclic group, a cyano group, $-OR^{81}$, $-SR^{82}$, $-CO_2R^{83}$, $-OCOR^{84}$, $-NR^{85}R^{86}$, $-CONR^{87}R^{88}$, $-SO_2R^{89}$, $-SO_2NR^{90}R^{91}$, $-NR^{92}CONR^{93}R^{94}$, $-NR^{95}CO_2R^{96}$, $-COR^{97}$, $-NR^{98}COR^{99}$ or $-NR^{100}SO_2R^{101}$.

$R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$ and $R^{101}$ each independently represents a hydrogen atom, an aliphatic group or an aromatic group.

In the formula (II) above, $R^1$ is preferably a hydrogen atom, an aliphatic group, an aromatic group, $-OR^{11}$, $-SR^{12}$, $-NR^{15}R^{16}$, $-SO_2R^{19}$, $-NR^{22}CONR^{23}R^{24}$, $-NR^{25}CO_2R^{26}$, $-NR^{28}COR^{29}$ or $-NR^{30}SO_2R^{31}$, more preferably a hydrogen atom, an aliphatic group, an aromatic group, $-OR^{11}$ or $-NR^{15}R^{16}$, further preferably a hydrogen atom, an alkyl group, a substituted alkyl group, an aryl group, a substituted aryl group, an alkoxy group, a substituted alkoxy group, a phenoxy group, a substituted phenoxy group, a dialkylamino group or a substituted dialkylamino group, particularly preferably a hydrogen atom, a $C_{1-10}$ alkyl group, a $C_{1-10}$ substituted alkyl group, a $C_{6-10}$ aryl group or a $C_{6-10}$ substituted aryl group and most preferably a hydrogen atom, a $C_{1-6}$ alkyl group or a $C_{1-6}$ substituted alkyl group.

In the formula (II) above, A is preferably —NR⁴R⁵. D is preferably a group forming a 5-membered nitrogenous heterocyclic ring, and the 5-membered nitrogenous heterocyclic ring is more preferably an imidazole ring, a triazole ring or a tetrazole ring.

Among the compounds represented by the formula (II) above, particularly preferable are oil-soluble pyrazolotriazole azomethine compounds represented by formula (III):

Formula (III)

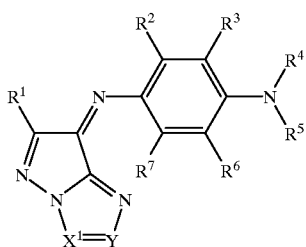

In the formula (III) above, $R^1$, $R^2$, $R^3$, $R^4$, $R^5$, $R^6$ and $R^7$ have the same meanings as defined in formula (II) above. One of $X^1$ and Y represents —C($R^8$)═ and the other represents —N═. $R^8$ represents a hydrogen atom, an aliphatic group or an aromatic group.

In the formula (III) above, $R^8$ is preferably a hydrogen atom, an alkyl group, a substituted alkyl group, an aryl group or a substituted aryl group, more preferably a hydrogen atom, a $C_{1-150}$ substituted alkyl group or a $C_{6-150}$ substituted aryl group and most preferably a $C_{1-100}$ substituted alkyl group or a $C_{6-100}$ substituted aryl group.

Among the compounds represented by formula (III) above, the pyrazolotriazole azomethine compounds wherein $X^1$ is —N═ and Y is —C($R^8$)═ are preferable.

The pyrazolotriazole azomethine compounds represented by formula (II) above are shown as the following exemplified compounds (M-1 to M-16) which are not intended to limit the present invention.

M-1

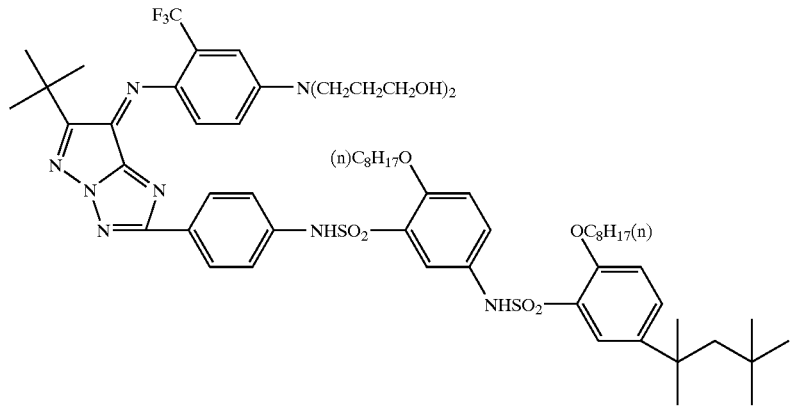

M-2

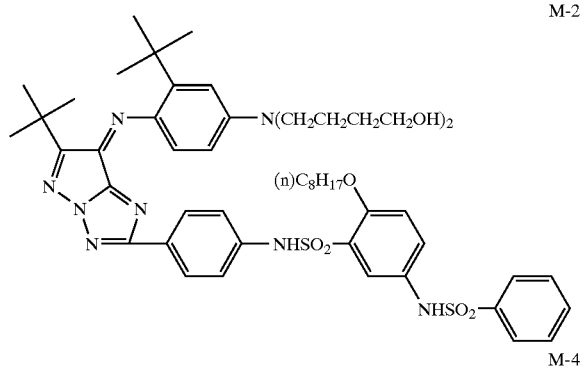

M-3

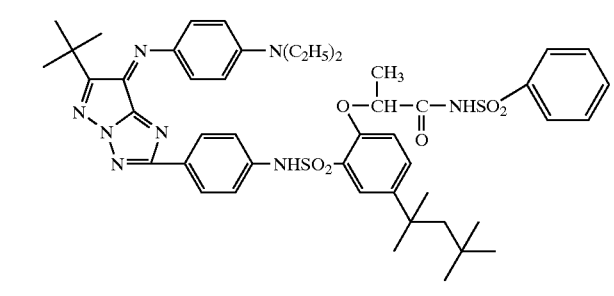

M-4

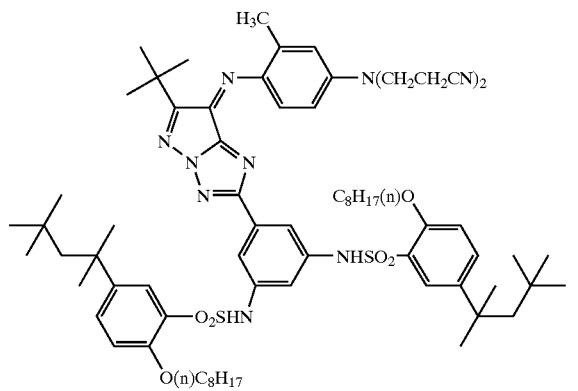

M-5

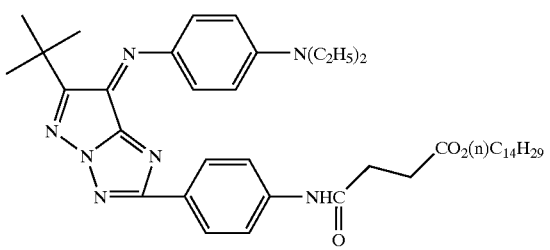

M-6
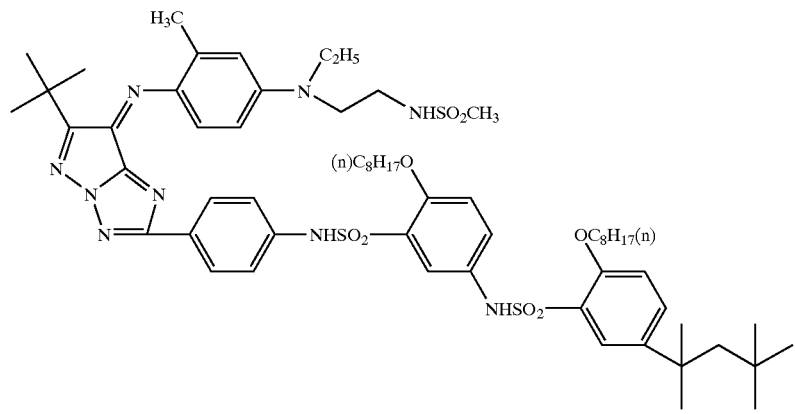
M-7
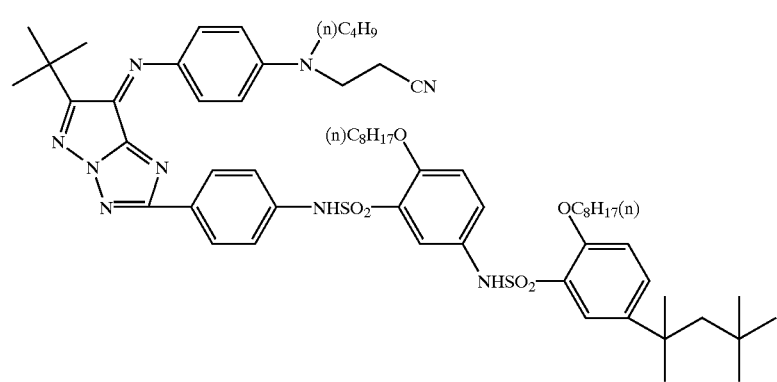
M-8
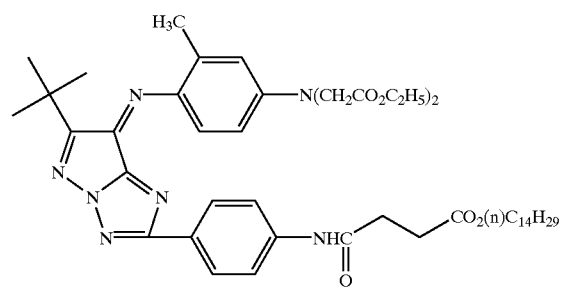
M-9
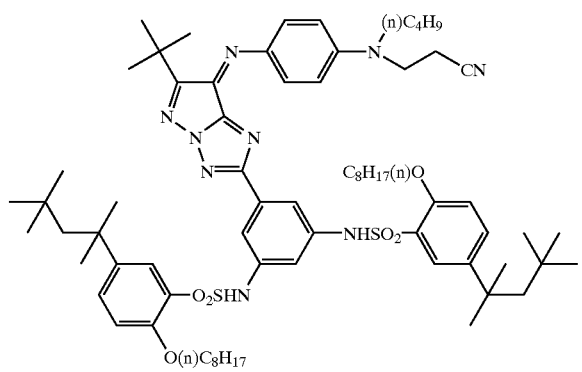
M-10
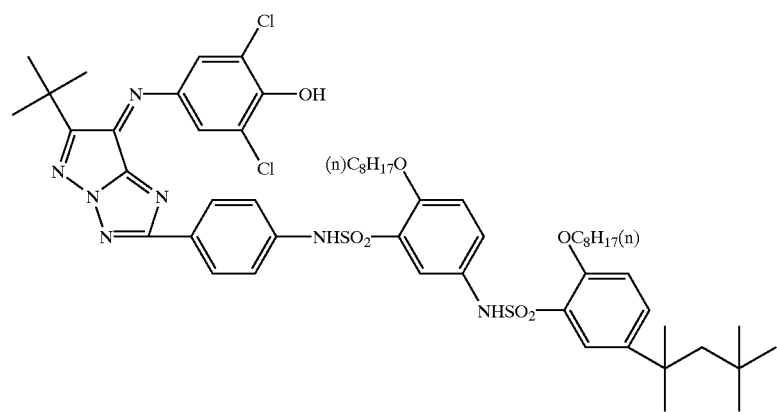

-continued
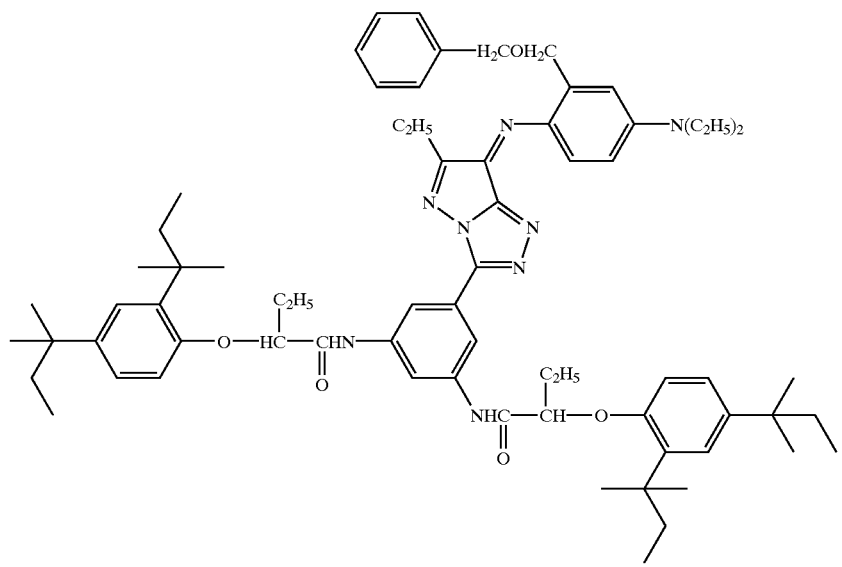
M-11
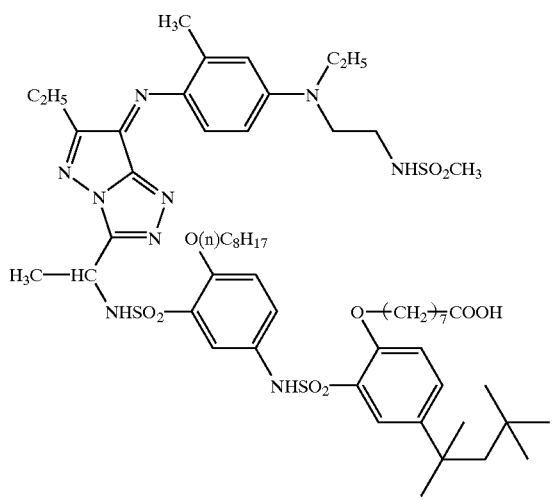
M-12
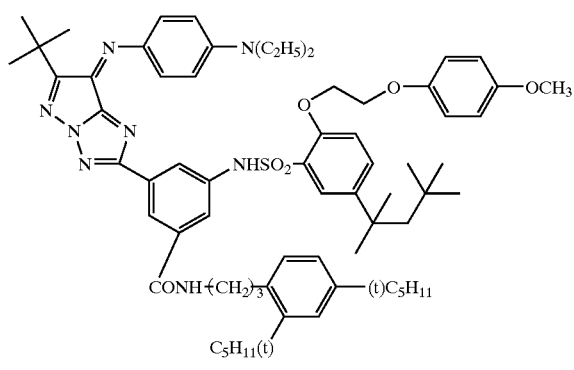
M-13
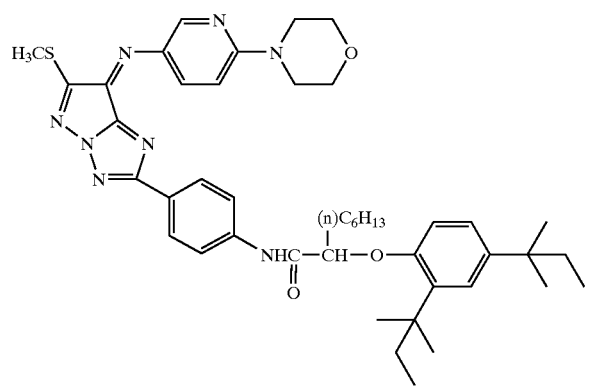
M-14

-continued

M-15

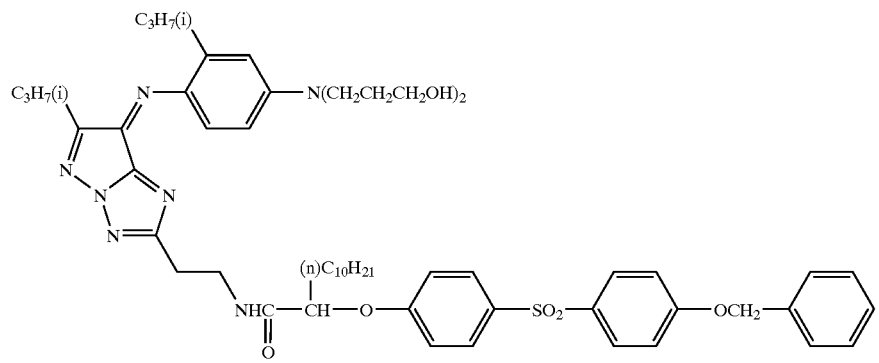

M-16

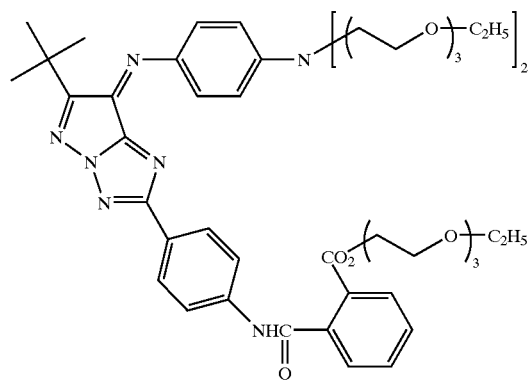

The compounds usable in the present invention include, but are not limited to, the exemplified compounds described in Japanese Patent Application No. 2000-78491.

The compounds represented by formula (II) above can be synthesized by reference to a method described in e.g. JP-A 4-126772, JP-B 7-94180 and Janese Patent Application No. 2000-78491.

As the cyan dyes, the pyrrolotriazole azomethine compounds represented by formulae (IV-1) to (IV-4) below are particularly preferably used.

(IV-1)

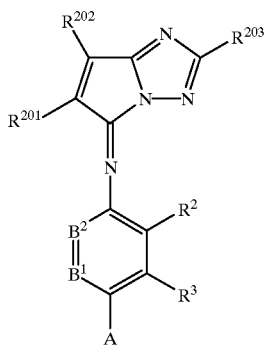

-continued (IV-2)

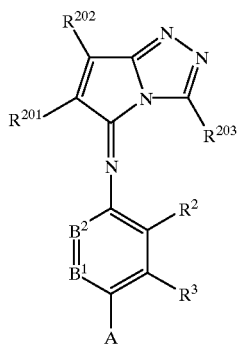

(IV-3)

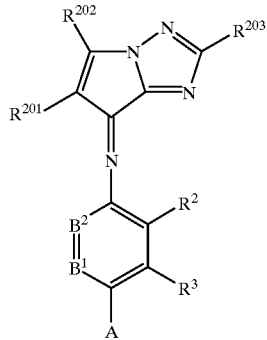

(IV-4)

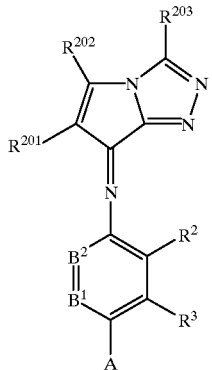

In the formulae (IV-1) to (IV-4) above, A, $R^2$, $R^3$, $B^1$ and $B^2$ have the same meanings as defined in formula (I) above and their preferable scopes are also the same as defined above. $R^{201}$, $R^{202}$ and $R^{203}$ independently have the same meanings as those of $R^1$ defined in formula (II) above. $R^{201}$ and $R^{202}$ may be bound to each other to form a ring.

Further, pyrrolotriazole azomethine compounds represented by formulae (IV-1) to (IV-4) wherein $R^{201}$ is an electron attractive group having a Hammett's substituent constant $\sigma_p$ value of 0.30 or more are more preferable owing to their sharp absorption.

The pyrrolotriazole azomethine compounds wherein the sum of the Hammett's substituent constant $\sigma_p$ values of $R^{201}$ and $R^{202}$ is 0.70 or more are particularly preferable owing to their excellent hue as cyan color.

Now, the hues of the pyrrolotriazole azomethine compounds represented by formulae (IV-1) to (IV-4) above are described.

The pyrrolotriazole azomethine compounds represented by formulae (IV-1) to (IV-4) above can have a wide variety of hues depending on the combination of $R^{201}$, $R^{202}$, $R^{203}$, $R^2$, $R^3$, A, $B^1$ and $B^2$.

The pyrrolotriazole azomethine compounds represented by formulae (IV-1) to (IV-4) above wherein $R^{201}$ is an electron attractive substituent group are more preferable owing to their sharper absorption waveform. As the electron attraction of the group is increased, the absorption waveform becomes sharper. In this respect, $R^{201}$ is preferably an electron attractive group having a Hammett's substituent constant $\sigma_p$ value of 0.30 or more, more preferably 0.45 or more and most preferably 0.60 or more, rather than an alkyl or aryl group.

The pyrrolotriazole azomethine compounds can be used not only as magenta dyes but also as cyan dyes, and they are used more preferably as cyan dyes. The pyrrolotriazole azomethine compounds represented by formulae (IV-1) to (IV-4) above can also be used as magenta dyes.

When the pyrrolotriazole azomethine compounds represented by formulae (IV-1) to (IV-4) above are used as cyan compounds, the sum of the Hammett's substituent constant $\sigma_p$ values of $R^{201}$ and $R^{202}$ is preferably 0.70 or more. A sum of $\sigma_p$ values of less than 0.70 is not preferable because the absorption maximum wavelength is too short a wavelength for the cyan dye and the dye seems blue to human eyes. In particular, the compounds wherein the Hammett's substituent constant $\sigma_p$ value of $R^{202}$ is 0.30 or more are more preferable. In addition, the compounds wherein the sum of the Hammett's substituent constant $\sigma_p$ values of $R^{201}$ and $R^{202}$ is 2.0 or less are preferable.

The electron attractive groups having a Hammett's substituent constant $\sigma_p$ value of 0.30 or more include, e.g., an acyl group, acyloxy group, carbamoyl group, alkoxycarbonyl group, aryloxycarbonyl group, cyano group, nitro group, alkyl sulfinyl group, aryl sulfinyl group, alkyl sulfonyl group, aryl sulfonyl group, sulfamoyl group, halogenated alkyl group, halogenated alkoxy group, halogenated aryloxy group and halogenated alkylthio group, as well as an aryl or heterocyclic group substituted with two or more electron attractive groups having a $\sigma_p$ value of 0.15 or more.

More specifically, mention can be made of an acyl group (e.g., acetyl, 3-phenylpropanoyl, etc.), acyloxy group (e.g., acetoxy, etc.), carbamoyl group [e.g., N-ethylcarbamoyl, N,N-dibutylcarbamoyl, N-(2-dodecyloxyethyl) carbamoyl, N-methyl-N-dodecylcarbamoyl, etc.], alkoxycarbonyl group (e.g., methoxycarbamoyl, butyloxycarbonyl, dodecyloxycarbonyl, octadecyloxycarbonyl, etc.), aryloxycarbonyl group (e.g., phenoxycarbonyl, etc.), cyano group, nitro group, alkyl sulfinyl group (e.g., 3-phenoxypropyl sulfinyl, etc.), aryl sulfinyl group (e.g., 3-pentadecyl phenyl sulfinyl, etc.), alkyl sulfonyl group (e.g., methane sulfonyl, octane sulfonyl, etc.), aryl sulfonyl group (e.g., benzene sulfonyl, etc.), sulfamoyl group (e.g., N-ethyl sulfamoyl, N,N-dipropyl sulfamoyl, etc.), halogenated alkyl group (e.g., trichloromethyl, heptachloropropyl, etc.), halogenated alkoxy group (e.g., trichloromethyloxy, etc.), halogenated aryloxy group (e.g., pentachlorophenyloxy, etc.), halogenated alkylthio group (e.g., difluoromethylthio, etc.), aryl group substituted with two or more electron-attracting group having a $\sigma_p$ value of 0.15 or more (e.g., 2,4-dinitrophenyl, 2,4,6-trichlorophenyl, pentachlorophenyl, etc.), heterocyclic group (e.g., 2-benzoxazolyl, 2-benzothiazolyl, 1-phenyl-2-benzimidazolyl, 5-chloro-1-tetrazolyl, 1-pyrrolyl, etc.).

The electron attractive group having a Hammett's substituent constant $\sigma_p$ value of 0.45 or more includes an acyl group (e.g., acetyl, 3-phenylpropanoyl, etc.), alkoxycarbonyl group (e.g., methoxycarbonyl, etc.), aryloxy carbonyl group (e.g., m-chlorophenoxycarbonyl, etc.), cyano group, nitro group, alkyl sulfinyl group (e.g., n-propyl sulfinyl, etc.), aryl sulfinyl group (e.g. phenyl sulfinyl, etc.), alkyl sulfonyl group (e.g., methane sulfonyl, n-octane sulfonyl, etc.), aryl sulfonyl group (e.g., benzene sulfonyl, etc.), sulfamoyl group (e.g., N-ethylsulfamoyl, N,N-dimethylsulfamoyl, etc.), halogenated alkyl group (e.g., trifluoromethyl, etc.), etc.

The electron attractive group having a Hammett's substituent constant $\sigma_p$ value of 0.60 or more includes a cyano group (0.66), nitro group (0.78), methane sulfonyl group (0.72), etc.

The combination of $R^{201}$ and $R^{202}$ having a Hammett's substituent constant $\sigma_p$ value of 0.70 or more in total is preferably a combination of an $R^{201}$ selected from a cyano group, alkoxy carbonyl group, alkyl sulfonyl group, aryl sulfonyl group and halogenated alkyl group, and an $R^{202}$ selected from an acyl group, acyloxy group, carbamoyl group, alkoxycarbonyl group, aryloxy carbonyl group, cyano group, alkyl sulfonyl group, aryl sulfonyl group, sulfamoyl group and halogenated alkyl group.

Preferable structures of the pyrrolotriazole azomethine compounds in the present invention are those compounds represented by formula (IV-1a) below wherein $R^2$ represents a hydrogen atom, a $C_{1-4}$ alkyl group, a $C_{1-4}$ substituted alkyl group, a halogen atom (fluorine, chlorine, bromine), a $C_{1-5}$ acylamino group, a $C_{1-5}$ aminocarbonyl amino group or a $C_{2-5}$ alkoxycarbonyl amino group, $R^4$ and $R^5$ each independently represents a hydrogen atom, a $C_{1-18}$ alkyl group or a $C_{1-18}$ substituted alkyl group, $R^{201}$ and $R^{202}$ each independently represents an electron attractive group having a Hammett's substituent constant $\sigma_p$ value of 0.30 or more in total, and $R^{203}$ represents a $C_{1-18}$ alkyl group, a $C_{1-18}$ substituted alkyl group or a $C_{6-20}$ substituted or unsubstituted aryl group.

When the pyrrolotriazole azomethine compounds are used as cyan dyes, the preferable structures described above are more preferably those wherein the sum of the Hammett's substituent constant $\sigma_p$ values of $R^{201}$ and $R^{202}$ is 0.70 or more, particularly 1.00 or more.

The pyrrolotriazole azomethine compounds in the present invention are most preferably those compounds represented by formula (IV-1a) below wherein $R^2$ represents a hydrogen atom or a methyl group, $R^4$ and $R^5$ each independently represents a $C_{1-5}$ alkyl group, $R^{201}$ represents a cyano group, $R^{202}$ represents an alkoxycarbonyl group and $R^{203}$ represents an aryl group.

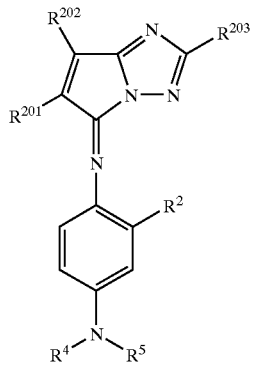

(IV-1a)

The Hammett's substituent constant used in this specification is described in Japanese Patent Application No. 11-365188, and the $\sigma_p$ value in the present invention has the same meanings as defined therein.

The pyrrolotriazole azomethine compounds in the present invention are shown as the following exemplified compounds (C-1 to C-9) which are not intended to limit the present invention.

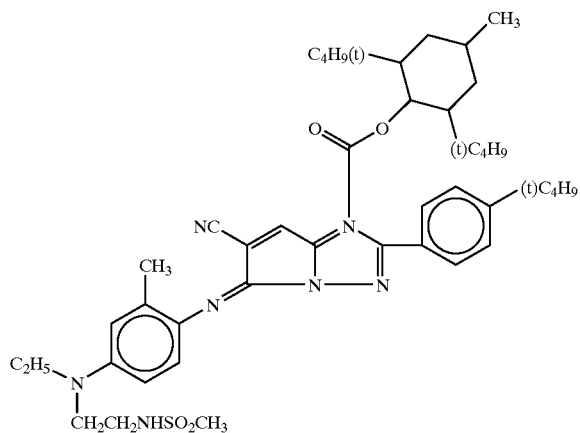

C-1

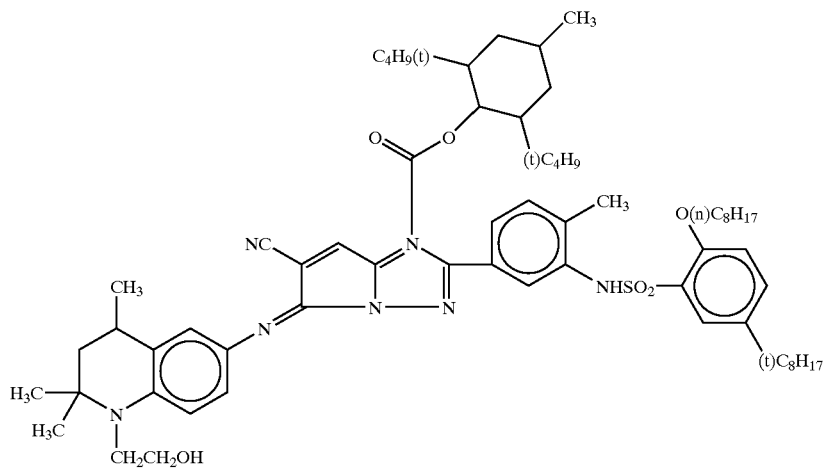

C-2

-continued
C-3
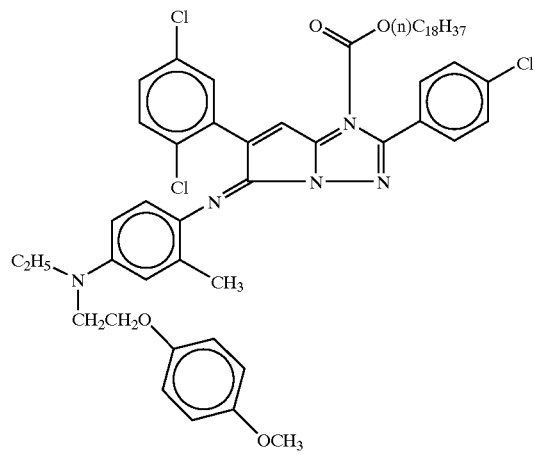
C-4
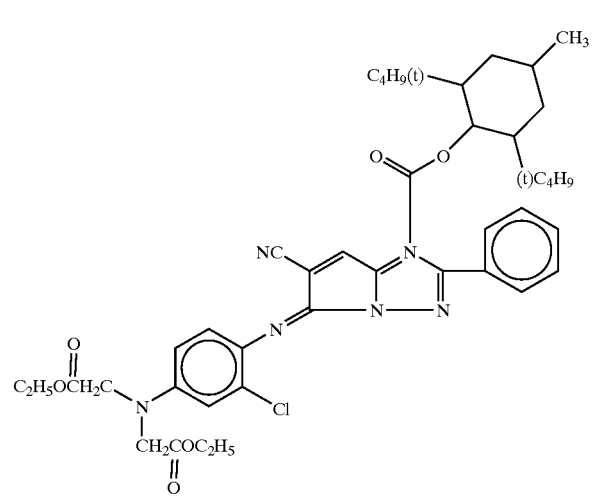
C-5
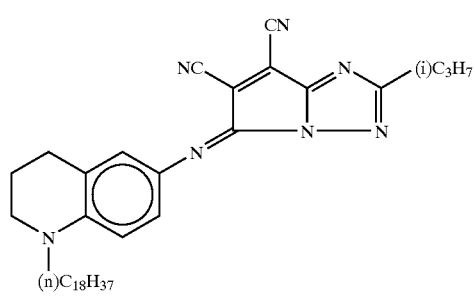
C-6
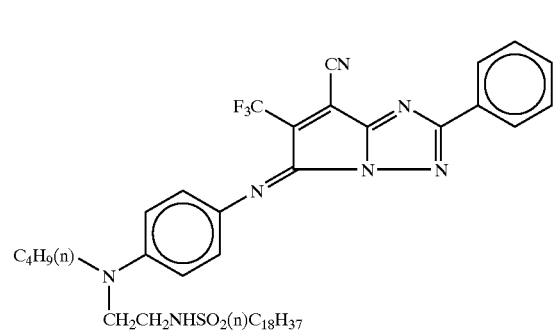
C-7
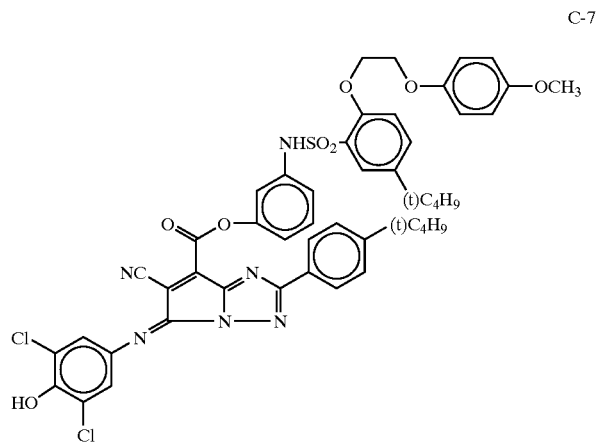
C-8
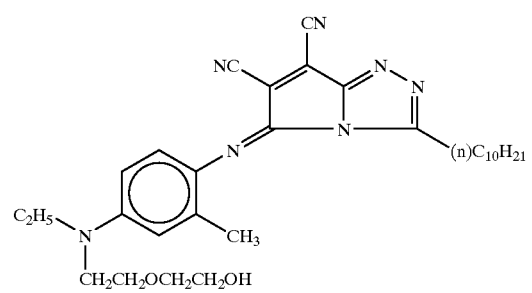
C-9
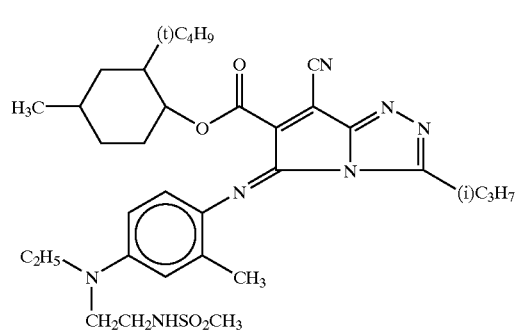

The compounds usable in the present invention include, but are not limited to, those compounds exemplified in Japanese Patent Application No. 11-365188.

The pyrrolotriazole azomethine compounds represented by formulae (IV-1) to (IV-4) above can be synthesized by reference to the methods described in JP-A 5-177959, JP-A 9-292679, JP-A 10-62926 and Japanese Patent Application No. 11-365188.

It is preferable to use a compound (hereinafter, occasionally referred to as "azo dye") represented by the following general formula (M-I) as the oil-soluble dye in the present invention. Explanation will now be given of compounds represented by the general formula (M-I).

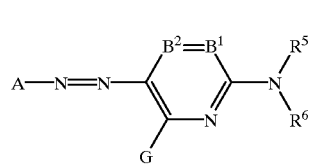

General Formula (M-1)

In the general formula (M-I), A represents a residual group of a 5-membered heterocyclic ring diazo component A-NH$_2$.

As for B$^1$ and B$^2$, B$^1$ represents =CR$^1$— and B$^2$ represents —CR$^2$=, or one represents a nitrogen atom while the other represents =CR$^1$— or —CR$^2$=.

R$^5$ and R$^6$ each independently represents a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each of these groups may also have substituent groups.

G, R$^1$ and R$^2$ each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbomoyloxy group, heterocyclic oxy group, alkoxycarbonyloxy group, aryloxycarbonyloxy group, amino group substituted by alkyl group or aryl group or heterocyclic group, acylamino group, ureido group, sulfamoylamino group, alkoxycarbonylamino group, alkylarylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group, and each of these groups may have further substituent group(s).

Further, R$^1$ and R$^5$, or R$^5$ and R$^6$, may also be bonded to form a 5- or 6-membered ring.

The oil-soluble compound represented by general formula (M-I) of the present invention will now be described.

In general formula (M-I), A represents a 5-membered heterocyclic group diazo component A-NH$_2$ residual group. Examples of the 5-membered heterocyclic ring heteroatoms include N, O and S. Preferable is a nitrogen-including 5-membered heterocyclic ring, and an aliphatic group, aromatic group or other heterocyclic ring may be bonded to the heterocyclic ring.

Preferable examples of the heterocyclic ring A include pyrazole rings, imidazole rings, thiazole rings, isothiazole rings, thiadiazole rings, benzothiazole rings, benzooxazole rings, and benzoisothiazole rings. Each of these heterocyclic rings may also have substituents. Among these, the pyrazole rings, imidazole rings, isothiazole rings, thiadiazole rings and benzothiazole rings represented by the general formulae (M-a) through (M-f) are preferable.

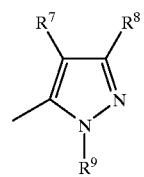
(M-a)

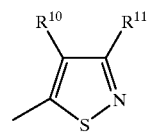
(M-b)

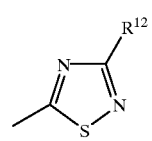
(M-c)

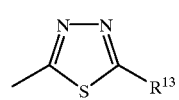
(M-d)

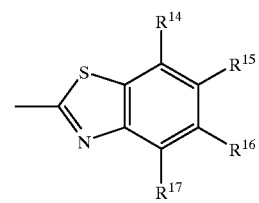
(M-e)

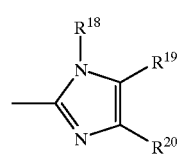
(M-f)

R$^7$ through R$^{20}$ of the general formulae (M-a) through (M-f) represent the same substituents as substituents G, R$^1$ and R$^2$ that are described later.

Preferable among the general formulae (M-a) through (M-f) are the pyrazole groups and isothiazole groups represented by general formulae (M-a) and (M-b), with the most preferable being the pyrazole groups represented by the general formula (M-a).

B$^1$ represents =CR$^1$— and B$^2$ represents —CR$^2$=, or one represents a nitrogen atom while the other represents =CR$^1$— or —CR$^2$=. However, it is preferable that B$^1$ represents =CR$^1$— and B$^2$ represents —CR$^2$=.

R$^5$ and R$^6$ each independently represents a hydrogen atom, aliphatic group, aromatic group, heterocyclic group, acyl group, alkoxycarbonyl group, aryloxycarbonyl group, carbamoyl group, alkylsulfonyl group, arylsulfonyl group, or sulfamoyl group. Each of these groups may have substituents. Preferable examples of substituents represented by R$^5$ and R$^6$ include hydrogen atoms, aliphatic groups, aromatic groups, heterocyclic groups, acyl groups, alkylsulfonyl groups and arylsulfonyl groups. Even more preferable examples include hydrogen atoms, aromatic groups, heterocyclic groups, acyl groups, alkylsulfonyl groups and arylsulfonyl groups. Most preferable are hydrogen atoms, aryl groups, and heterocyclic groups. Each of these groups may have substituents. However, R⁵ and R⁶ may not both be hydrogen atoms.

G, R¹ and R² each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted by an alkyl group or aryl group or heterocyclic group, acylamino group, ureido group, sulfamoyl amino group, alkoxycarbonylamino group, aryloxycarbonylamino group, alkylsulfonylamino group, arylsulfonylamino group, nitro group, alkyl or arylthio group, heterocyclic thio group, alkylsulfonyl group, arylsulfonyl group, alkylsulfinyl group, arylsulfinyl group, sulfamoyl group, or sulfo group. Each of these groups may have substituents.

Preferable substituents represented by G include hydrogen atoms, halogen atoms, aliphatic groups, aromatic groups, hydroxy groups, alkoxy groups, aryloxy groups, acyloxy groups, heterocyclic oxy groups, alkyl groups, amino groups substituted by aryl groups or heterocyclic groups, acylamino groups, ureido groups, sulfamoyl amino groups, aryloxycarbonylamino groups, alkylthio groups, arylthio groups, and heterocyclic thio groups. More preferable are hydrogen atoms, halogen atoms, alkyl groups, hydroxy groups, alkoxy groups, aryloxy groups, aryloxy groups, amino groups substituted by alkyl groups or aryl groups or heterocyclic groups, or acylamino groups. Among these, hydrogen atoms, arylamino groups and amide groups are most preferable. Each of these groups may also have substituents.

Examples of preferable substituents represented by R¹ and R² include hydrogen atoms, alkyl groups, alkoxycarbonyl groups, carboxyl groups, carbamoyl groups and cyano groups. Each of these groups may also have substituents.

R¹ and R⁵, or R⁵ and R⁶, may be bonded to form a 5- or 6-membered ring.

Examples of substituents when each of the substituents represented by A, R¹, R², R⁵ and R⁶ have further substituents include G, R¹ and R².

Below, substituents represented by G, R¹ and R² will be described.

Examples of the halogen atoms include fluorine atoms, chlorine atoms and bromine atoms.

By aliphatic groups is meant alkyl groups, substituted alkyl groups, alkenyl groups, substituted alkenyl groups, alkinyl groups, substituted alkinyl groups, aralkyl groups and substituted aralkyl groups. The aliphatic groups may have branches or may form rings. It is preferable that the number of carbon atoms in the aliphatic group is 1–20, and more preferably 1–16. It is preferable for the aryl portions of the aralkyl groups and substituted aralkyl groups to be phenyl or naphthyl, yet phenol is particularly preferable. Examples of the aliphatic groups include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenothyl, vinyl and allyl.

In the present specification, aromatic groups refer to aryl groups and substituted aryl groups. It is preferable for the aryl groups to be phenyl or naphthyl, with phenyl being particularly preferable. The number of carbon atoms in the aromatic group is preferable 6–20 and more preferably 6–16.

Examples of the aromatic groups include phenyl, p-tolyl, p-methoxyphenyl, o-chlorophenyl and m-(3-sulfopropylamino)phenyl.

Examples of the heterocyclic groups include substituted and unsubstituted heterocyclic groups. Other heterocyclic rings such as aliphatic rings and aromatic rings may also be condensed on the heterocyclic ring. It is preferable that the heterocyclic group has five or six members. Examples of the substituents include aliphatic groups, halogen atoms, alkyl sulfonyl groups, arylsulfonyl groups, acyl groups, acylamino groups, sulfamoyl groups, carbamoyl groups, ionic hydrophilic groups and the like. Examples of the heterocyclic groups include 2-pyridyl groups, 2-thienyl groups, 2-thiazolyl groups, 2-benzothiazolyl groups, 2-benzooxazolyl groups, and 2-furyl groups.

Examples of the alkylsulfonyl groups and arylsulfonyl groups respectively include methane sulfonyl groups and phenylsulfonyl groups.

Examples of the alkylsulfinyl groups and arylsulfinyl groups respectively include methane sulfinyl groups and phenylsulfinyl groups.

Examples of the acyl groups include acyl groups having substituted and unsubstituted acyl groups. The number of carbon atoms in the acyl group is preferably 1–12. Examples of the unsubstituted acyl groups include ionic hydrophilic groups. Examples of the acyl groups include acetyl groups and benzoyl groups.

Examples of the amino groups include amino groups substituted by alkyl groups, aryl groups and heterocyclic groups. The alkyl groups, aryl groups and heterocyclic groups may also have substituents. Unsubstituted amino groups are not included. It is preferable that the alkylamino group is one having 1–6 carbon atoms. Examples of the substituents include ionic hydrophilic groups. Examples of the alkylamino groups include methylamino groups and diethylamino groups.

Examples of the arylamino groups include arylamino groups having substituted and unsubstituted arylamino groups. The number of carbon atoms in the arylamino group is preferably 6–12. Examples of the substituents include halogen atoms and ionic hydrophilic groups. Examples of the arylamino groups include anilino groups and 2-chloroanilino groups.

Examples of the alkoxy groups include alkoxy groups having substituted and unsubstituted alkoxy groups. The number of carbon atoms in the alkoxy group is preferably 1–12. Examples of the substituents include alkoxy groups, hydroxyl groups and ionic hydrophilic groups. Examples of the alkoxy groups include methoxy groups, ethoxy groups, isopropoxy groups, methoxyethoxy groups, hydroxyethoxy groups and 3-carboxypropoxy groups.

Examples of the aryloxy groups include aryloxy groups having substituted and unsubstituted aryloxy groups. The number of carbon atoms in the aryloxy group is preferably 6–12. Examples of the substituents include alkoxy groups and ionic hydrophilic groups. Examples of the alkoxy groups include phenoxy groups, p-methoxyphenoxy groups and o-methoxyphenoxy groups.

Examples of the acylamino groups include acylamino groups having substituents. The number of carbon atoms in the acylamino group is preferably 2–12. Examples of the substituents include ionic hydrophilic groups. Examples of the acylamino groups include acetylamino groups, propionylamino groups, benzoylamino groups, N-phenylacetylamino groups, and 3,5-disulfobenzoylamino groups.

Examples of the ureido groups include substituted and unsubstituted ureido groups. The number of carbon atoms in a ureido group is preferably 1–12. Examples of the substituents include alkyl groups and aryl groups. Examples of the ureidos include 3-methylureido groups, 3,3-dimethylureido groups and 3-phenylureido groups.

Examples of the sulfamoylamino groups include sulfamoylamino groups having substituted and unsubstituted sulfamoylamino groups. Examples of the substituents include alkyl groups. Examples of the sulfamoylamino groups include N,N-dipropylsulfamoylamino.

Examples of the alkoxycarbonylamino groups include those having substituents and those that do not. The number of carbon atoms in the alkoxycarbonylamino group is preferably 2–12. Examples of the substituents include ionic hydrophilic groups. Examples of the alkoxycarbonylamino groups include ethoxycarbonylamino groups.

Examples of the alkyl sulfonylamino groups and aryl sulfonylamino groups include those having substituents and those that do not. The number of carbon atoms in the alkyl and aryl sulfonylamino groups is preferably 1–12. Examples of the substituents include ionic hydrophilic groups. Examples of the alkyl and aryl sulfonylamino groups include methane sulfonylamino groups, N-phenylmethane sulfonylamino groups, benzene sulfonylamino groups and 3-carboxybenzene sulfonylamino groups.

Examples of the carbamoyl groups include those having substituents and those that do not. Examples of the substituents include alkyl groups. Examples of the carbamoyl groups include methylcarbamoyl groups and dimethylcarbamoyl groups.

Examples of the sulfamoyl groups include those having substituents and those that do not. Examples of the substituents include alkyl groups. Examples of the sulfamoyl groups include dimethylsulfamoyl groups and di-(2-hydroxyethyl)sulfamoyl groups.

Examples of the alkoxycarbonyl groups include those having substituents and those that do not. The number of carbon atoms in the alkoxycarbonyl group is preferably 2–12. Examples of the substituents include ionic hydrophilic groups. Examples of the alkoxycarbonyl groups include methoxycarbonyl groups and ethoxycarbonyl groups.

Examples of the acyloxy groups include those having substituents and those that do not. The number of carbon atoms in the acyloxy groups is preferably 1–12. Examples of the substituents include ionic hydrophilic groups. Examples of the acyloxy groups include acetoxy groups and benzoyloxy groups.

Examples of the carbamoyloxy groups include those having substituents and those that do not. Examples of the substituents include alkyl groups. Examples of the carbamoyloxy groups include N-methylcarbamoyloxy groups.

Examples of the aryloxycarbonyl groups include those having substituents and those that do not. The number of carbon atoms in the aryloxycarbonyl group is preferably 7–12. Examples of the substituents include ionic hydrophilic groups. Examples of the aryloxycarbonyl groups include phenoxycarbonyl groups.

Examples of the aryloxycarbonylamino groups include those having substituents and those that do not. The number of carbon atoms in the aryloxycarbonylamino group is preferably 7–12. Examples of the substituents include ionic hydrophilic groups. Examples of the aryloxycarbonylamino groups include phenoxycarbonylamino groups.

Examples of the alkyl, aryl and heterocyclic ring thio groups include those having substituents and those that do not. The number of carbon atoms in the alkyl, aryl and heterocyclic ring thio groups is preferably 1–12. Examples of the substituents include ionic hydrophilic groups. Examples of the alkyl, aryl and heterocyclic ring thio groups include methyl thio groups, phenyl thio groups and 2-pyridyl thio groups.

In the present invention, the oil-soluble dye represented by general formula (M-II) below is particularly preferable.

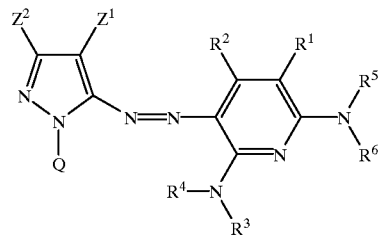

In the general formula (M-II), $Z^1$ represents an electron withdrawing group in which Hammett's substituent constant $\sigma_p$ is no less than 0.20. It is preferable that $Z^1$ is an electron withdrawing group in which $\sigma_p$ is 0.30 to 1.0. Examples of specifically preferable substituents include electron withdrawing substituents described later. Among these, acyl groups having 2–12 carbon atoms, alkyloxycarbonyl groups, nitro groups and cyano groups having 2–12 carbon atoms, alkylsulfonyl groups having 1–12 carbon atoms, arylsulfonyl groups having 6–18 carbon atoms, carbamoyl groups having 1–12 carbon atoms and alkyl halide groups having 1–12 carbon atoms are preferable. Particularly preferable are cyano groups, alkylsulfonyl groups having 1–12 carbon atoms and arylsulfonyl groups having 6–18 carbon atoms. Most preferable are cyano groups.

$R^1$, $R^2$, $R^5$ and $R^6$ are the same as in general formula (M-I).

$R^3$ and $R^4$ each independently represents a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Among these, hydrogen atoms, aromatic groups, heterocyclic groups, acyl groups, alkylsulfonyl groups and arylsulfonyl groups are preferable, and hydrogen atoms, aromatic groups and heterocyclic groups are particularly preferable.

$Z^2$ represents a hydrogen atom, aliphatic group, aromatic group or heterocyclic group.

Q represents a hydrogen atom, aliphatic group, aromatic group or heterocyclic group. It is preferable that Q is a group comprising a non-metallic atom group necessary to form a 5- to 8-membered ring. The 5- to 8-membered ring may be substituted or may be a saturated ring with an unsaturated bond. Aromatic groups and heterocyclic groups are particularly preferable. Examples of preferable non-metallic atoms include nitrogen atoms, oxygen atoms, sulfur atoms and carbon atoms. Specific examples of the 5- to 8-membered ring include, for example, benzene rings, cyclopentane rings, cyclohexane rings, cycloheptane rings, cyclooctane rings, cyclohexene rings, pyridine rings, pyrimidine rings, pyrazine rings, pyridazine rings, triazine rings, imidazole rings, benzimidazole rings, oxazole rings, benzooxazole rings, thiazole rings, benzothiazole rings, oxane rings, sulforane rings and thiane rings.

Each of the groups described in general formula (M-II) may have further substituents. When these groups have further substituents, examples thereof include the substituents described in general formula (M-I), the groups listed as examples in G, $R^1$ and $R^2$, and ionic hydrophilic groups.

Here, in relation to substituent group $Z^1$, description will be given of Hammett's substituent constant $\sigma_p$ used in the present specification.

Hammett's rule is a rule proposed in 1935 by L. P. Hammett to quantitatively describe the influence that substituents have on equilibrium or reaction of benzene derivatives, and the rule has become widely accepted today. Among substituent constants obtained by Hammett's rule are $\sigma_p$ and $\sigma_m$, which can be seen in many general textbooks such as *Lange's Handbook of Chemistry* 12th edition (edited by J. A. Dean, McGraw-Hill, 1979) and *Kagaku no Ryouiki* (Special Issue, No. 122, pp. 96–103, Nankoudou, 1979). It should be noted that, in the present invention, each of the substituents is limited by Hammett's substituent constant $\sigma_p$, but this does not mean that the substituents are limited only to substituents having known values and that can be seen in the aforementioned textbooks. Needless to say, substituents having values that are likely encompassed within the range when the value is measured on the basis of Hammett's rule, even if the values are unknown in the literature, are included. Further, substituents which are not benzene derivatives are also included in general formulae (M-I) and (M-II) of the present invention. $\sigma_p$ is used as a measure indicating electron effects of the substituents with no relation to substitution position. $\sigma_p$ is used with this kind of meaning in the present invention.

Examples of electron withdrawing groups in which Hammett's substituent constant $\sigma_p$ is no less than 0.60 include cyano groups, nitro groups, alkylsulfonyl groups (e.g., methanesulfonyl groups) and arylsulfonyl groups (e.g., benzenesulfonyl groups).

Examples of electron withdrawing groups in which Hammett's substituent constant $\sigma_p$ is no less than 0.45 include, in addition to the preceding, acyl groups (e.g., acetyl groups), alkoxycarbonyl groups (e.g., dodecyloxycarbonyl groups), aryloxycarbonyl groups (e.g., m-chlorophenoxycarbonyl), alkylsulfinyl (e.g., n-propylsulfinyl), arylsulfinyl groups (e.g., phenylsulfinyl), sulfamoyl groups (e.g., N-ethylsulfamoyl, N,N-dimethylsulfamoyl), and alkyl halide groups (e.g., trifluoromethyl).

Examples of electron withdrawing groups in which Hammett's substituent constant $\sigma_p$ is no less than 0.30 include, in addition to the preceding, acyloxy groups (e.g., acetoxy), carbamoyl groups (e.g., N-ethylcarbamoyl, N,N-dibutylcarbamoyl), alkoxy halide groups (e.g., trichloromethyloxy), aryloxy halide groups (e.g., pentafluorophenyloxy), sulfonyloxy groups (e.g., methylsulfonyloxy groups), alkylthio halide groups (e.g., difluoromethylthio), aryl groups substituted by two or more electron withdrawing groups whose $\sigma_p$ are 0.15 or more (e.g., 2,4-dinitrophenyl, pentachlorophenyl), and heterocyclic rings (e.g., 2-benzooxazolyl, 2-benzothiazolyl, or 1-phenyl-2-benzimidazolyl).

Specific examples of electron withdrawing groups in which Hammett's substituent constant $\sigma_p$ is no less than 0.20 include, in addition to the preceding, halogen atoms.

Particularly preferable combinations of substituents as the oil-soluble compound represented by general formula (M-I) are as follows.

(A) $R^5$ and $R^6$ are preferably hydrogen atoms, alkyl groups, aryl atoms, heterocyclic groups, sulfonyl groups or acyl groups, more preferably hydrogen atoms, aryl groups, heterocyclic groups, and most preferably hydrogen atoms, aryl groups, and heterocyclic groups. However, $R^5$ and $R^6$ do not simultaneously represent hydrogen atoms.

(B) G is preferably a hydrogen atom, halogen atom, alkyl group, hydroxyl group, amino group, or amide group, more preferably a hydrogen atom, halogen atom, amino group, or amide group, and most preferably a hydrogen atom, amino group or amide group.

(C) A is preferably a pyrazole ring, imidazole ring, isothiazole ring, thiadiazole ring, or benzothiazole ring, more preferably a pyrazole ring or isothiazole ring, and most preferably a pyrazole ring.

(D) $B^1$ and $B^2$ are =$CR^1$— and —$CR^2$=, respectively. $R^1$ and $R^2$ are each preferably a hydrogen atom, halogen atom, cyano group, carbamoyl group, carboxyl group, alkyl group, hydroxyl group, or alkoxyl group, and more preferably a hydrogen atom, cyano group, carbamoyl group or alkoxy group.

With regard to preferable combinations of substituents of compounds represented by general formula (M-I), it is preferable the compound has at least one of the various substituents described above as preferable groups. It is more preferable that the compound has many different kinds of substituents described above as being a preferable group. It is most preferable that the compound is one in which all of the groups therein are the groups listed above as being preferable.

Specific examples (a-1 to a-27, b-1 to b-6, c-1 to c-3, d-1 to d-4 and e-1 to e-4) of the oil-soluble compound represented by general formula (M-I) are indicated below, yet the oil-soluble dye used in the present invention is not limited to the same.

TABLE 1

| Dye | $R^1$ | $R^2$ | $R^3$ |
|---|---|---|---|
| a-1 | 2-benzothiazolyl | 4-$C_8H_{17}$-phenyl | 4-$C_8H_{17}$-phenyl |

TABLE 1-continued

| Dye | R¹ | R² | R³ |
|---|---|---|---|
| a-2 | 2-methyl-5-chlorobenzothiazol-yl | 4-C₈H₁₇-phenyl | 2,3,5-trimethylphenyl |
| a-3 | 2-methyl-6-chlorobenzothiazol-yl | 2,3,5-trimethylphenyl | 4-C₈H₁₇-phenyl |
| a-4 | 2-methylbenzothiazol-yl | 2-methyl-6-OC₈H₁₇-phenyl | 4-C₈H₁₇-phenyl |
| a-5 | 2-methyl-5-NO₂-benzothiazol-yl | 2,4-dimethylphenyl | 2,4-dimethylphenyl |
| a-6 | 2-methyl-6-(SO₂NH(CH₂)₃O-2-tert-amyl-4-tert-butylphenyl)benzothiazol-yl | 4-methylphenyl | 4-methylphenyl |
| a-7 | 2-methyl-6-(SO₂NH(CH₂)₃OCH₂CH(C₈H₁₇)(C₆H₁₃))benzothiazol-yl | 2,3,5-trimethylphenyl | 4-methylphenyl |
| a-8 | 2-methyl-6-(NHCOCH(C₂H₅)O-2-tert-amyl-4-tert-butylphenyl)benzothiazol-yl | 4-C₈H₁₇-phenyl | 4-C₈H₁₇-phenyl |
| a-9 | 2-methyl-6-(NHSO₂-2-OC₈H₁₇(n)-5-C₈H₁₇(t)-phenyl)benzothiazol-yl | 2,4,5-trimethylphenyl | C₈H₁₇(t) |

TABLE 1-continued
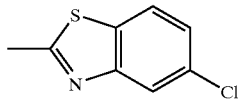
| Dye | R¹ | R² | R³ |
|---|---|---|---|
| a-10 | 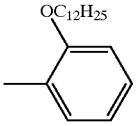 | 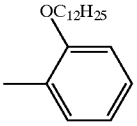 | 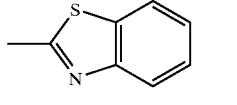 |
TABLE 2
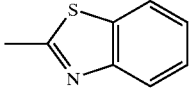
| Dye | R¹ | R² | R³ | R⁴ |
|---|---|---|---|---|
| a-11 | 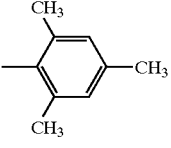 | 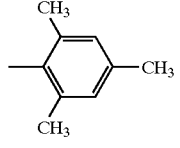 | 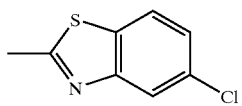 | 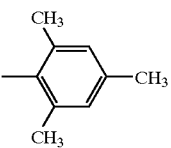 |
| a-12 | 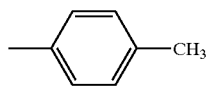 | SO$_2$CH$_3$ | 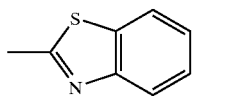 | 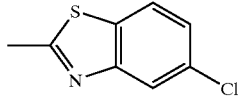 |
| a-13 | 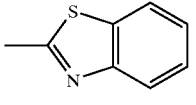 | COCH$_3$ | C$_8$H$_{17}$(t) | C$_8$H$_{17}$(t) |
| a-14 | 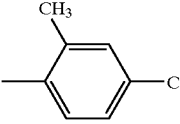 |  | 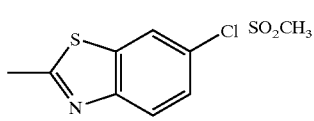 | 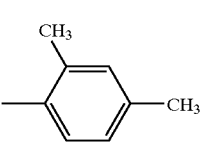 |
| a-15 | (similar benzothiazole with Cl) | SO$_2$CH$_3$ | (2,4-dimethylphenyl) | C$_8$H$_{17}$(t) |

TABLE 3

| Dye | R¹ | R² | R³ | R⁴ |
|---|---|---|---|---|
| a-16 | 4-(1,1,3,3-tetramethylbutyl)-2-sec-butylphenyl-SO₂NH(CH₂)₃O- benzothiazol-2-yl (methyl) | 2-methylbenzothiazol-5-yl with SO₂NH(CH₂)₃O-(4-tert-octyl-2-sec-butylphenyl) | 2,4,6-trimethylphenyl | 2,4,6-trimethylphenyl |
| a-17 | 4-(1,1,3,3-tetramethylbutyl)-2-sec-butylphenyl-SO₂NH(CH₂)₃O- benzothiazol-2-yl (methyl) | 2-methylbenzothiazol-5-yl NHCOCH(C₂H₅)-O-(4-tert-octyl-2-tert-butylphenyl) | 2,4,6-trimethylphenyl | 2,4,6-trimethylphenyl |
| a-18 | 6-chloro-2-methylbenzothiazol-2-yl | 2-methylbenzothiazol-2-yl | 2,4-dimethylphenyl | 2,4-dimethylphenyl |
| a-19 | 2-methylbenzothiazol-2-yl | 2-methylbenzothiazol-2-yl | 2-methoxy(OC₁₂H₂₅)phenyl | 2-methyl(OC₁₂H₂₅)phenyl |
| a-20 | 6-nitro-2-methylbenzothiazol-2-yl | 2-methylbenzothiazol-5-yl NHSO₂-(2-OC₈H₁₇(n)-5-C₈H₁₇(t))phenyl | 4-(C₈H₁₇)phenyl | 2-methyl-(C₈H₁₇(t))phenyl |

TABLE 4
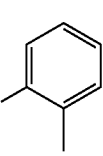
| Dye | R¹ | R² | R³ | R⁴ | R⁵ | R⁶ | R⁷ | R⁸ |
|---|---|---|---|---|---|---|---|---|
| a-21 | 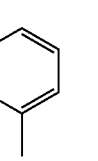 | CN |  | H | CONH₂ | SO₂CH₃ | 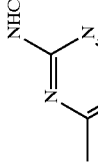 | 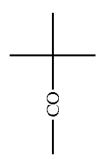 |
| a-22 | 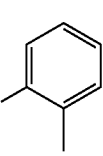 | Br | 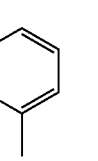 | COOC₂H₅ | H |  | C₈H₁₇(t) | COCH₃ |
| a-23 | 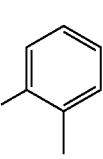 | SO₂CH₃ | 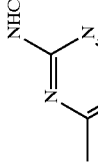 | CONH₂ | H | 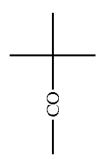 | 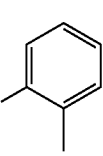 | —CO— 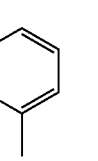 |
| a-24 |  | CN | 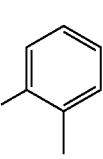 | H | H | 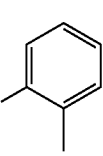 | 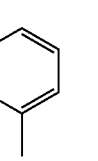 | SO₂CH₃ |

TABLE 5

Structure: Pyrazole-azo-pyridine with substituents R¹, R², R³ (on pyrazole) and R⁴, R⁵ (on pyridine), plus NR⁶R⁷ and NHR⁸ amine groups.

| Dye | $R^1$ | $R^2$ | $R^3$ | $R^4$ | $R^5$ | $R^6$ | $R^7$ | $R^8$ |
|---|---|---|---|---|---|---|---|---|
| a-25 | t-Bu | Br | 2,6-dichloro-4-nitrophenyl (methyl) | H | $CONH_2$ | $COCH_3$ | mesityl (2,4,6-trimethylphenyl) | 4-$C_8H_{17}$-phenyl |
| a-26 | t-Bu | CN | 2-benzothiazolyl | $CH_3$ | H | 2-benzothiazolyl | 2,4,6-triethyl-...mesityl-like (2,6-diethyl-4-methylphenyl) | 2,6-diethyl-4-methylphenyl |
| a-27 | t-Bu | CN | 2-benzothiazolyl | $CH_3$ | CN | H | 2,6-diethyl-4-methylphenyl | 2,6-diethyl-4-methylphenyl |

TABLE 6

Structure: Isothiazole (with CN substituent)-azo-pyridine with substituents R¹ (on isothiazole), R², R³ (on pyridine), plus NR⁴R⁵ and NHR⁶ amine groups.

| Dye | $R^1$ | $R^2$ | $R^3$ | $R^4$ | $R^5$ | $R^6$ |
|---|---|---|---|---|---|---|
| b-1 | $CH_3$ | $CH_3$ | CN | H | 4-$C_8H_{17}$-phenyl | 4-$C_8H_{17}$-phenyl |
| b-2 | $CH_3$ | $CH_3$ | CN | H | mesityl (2,4,6-trimethylphenyl) | mesityl (2,4,6-trimethylphenyl) |
| b-3 | $CH_3$ | $CH_3$ | $CONH_2$ | H | 4-$C_8H_{17}$-phenyl | mesityl (2,4,6-trimethylphenyl) |

TABLE 6-continued

Structure:

R¹ on isothiazole (with CN); isothiazole-N=N-pyridine; pyridine has R², R³, NR⁴R⁵, and NHR⁶ substituents.

| Dye | R¹ | R² | R³ | R⁴ | R⁵ | R⁶ |
|---|---|---|---|---|---|---|
| b-4 | CH₃ | CH₃ | H | H | 2,4,6-trimethylphenyl | 2,4,6-trimethylphenyl |
| b-5 | CH₃ | CH₃ | H | 2-benzothiazolyl | 2,4,6-trimethylphenyl | 2,4,6-trimethylphenyl |
| b-6 | CH₃ | CH₃ | H | 2-benzothiazolyl | 2,4,6-trimethylphenyl | 4-C₈H₁₇-phenyl |

TABLE 7

Structure: 1,2,4-thiadiazole (R¹ substituent) –N=N– pyridine (R², R³, NR⁴R⁵, NHR⁶).

| Dye | R¹ | R² | R³ | R⁴ | R⁵ | R⁶ |
|---|---|---|---|---|---|---|
| c-1 | SCH₃ | CH₃ | CN | H | C₈H₁₇(t) | 4-C₈H₁₇-phenyl |
| c-2 | CH₃ | CH₃ | H | 2-benzothiazolyl-6-SO₂NH(CH₂)₃O-(2,4-di-tert-pentylphenyl) | 2,4,6-trimethylphenyl | 4-C₈H₁₇-phenyl |
| c-3 | phenyl | H | H | H | 2-benzothiazolyl-6-NHSO₂-(2-OC₈H₁₇(n)-5-C₈H₁₇(t)-phenyl) | 2,4,6-trimethylphenyl, C₈H₁₇(t) |

TABLE 8

[Structure: 1,3,4-thiadiazole bearing R¹ at 5-position, connected via N=N azo linkage to a pyridine ring with R² (position 4), R³ (position 5), NR⁴R⁵ (position 6), and NH-R⁶ (position 2)]

| Dye | R¹ | R² | R³ | R⁴ | R⁵ | R⁶ |
|---|---|---|---|---|---|---|
| d-1 | $CH_3$ | $CH_3$ | CN | H | 2,6-diethyl-4-methylphenyl | 2,6-diethyl-4-methylphenyl |
| d-2 | $CH_3$ | H | H | 2-benzothiazolyl | 2,3,5,6-tetramethylphenyl | 2,3,5,6-tetramethylphenyl |
| d-3 | phenyl | $CH_3$ | $CONH_2$ | H | 4-$C_8H_{17}$-phenyl | 4-$C_8H_{17}$-phenyl |
| d-4 | phenyl | $CH_3$ | H | 2-methylbenzothiazol-6-yl-$SO_2NH(CH_2)_3O$-[3-(tert-amyl)-4-{2-[4-(n-$OC_4H_9$)phenyl]propan-2-yl}phenyl] | $C_2H_5$ | 2,6-diethyl-4-methylphenyl |

TABLE 9

[Structure: benzothiazole (positions 4–7 indicated, R¹ substituent on benzene ring) connected via N=N azo linkage at 2-position to a pyridine ring with R² (position 4), R³ (position 5), NR⁴R⁵ (position 6), and NH-R⁶ (position 2)]

| Dye | R¹ | R² | R³ | R⁴ | R⁵ | R⁶ |
|---|---|---|---|---|---|---|
| e-1 | 5-Cl | $CH_3$ | $CONH_2$ | H | $C_8H_{17}(t)$ | $C_8H_{17}(t)$ |
| e-2 | 5,6-diCl | H | H | 2-benzothiazolyl | 4-$C_8H_{17}$-phenyl | 4-$C_8H_{17}$-phenyl |
| e-3 | 5,6-diCl | $CH_3$ | H | 2-benzothiazolyl | 2,4,6-trimethylphenyl | $COCH_3$ |

TABLE 9-continued

| Dye | R¹ | R² | R³ | R⁴ | R⁵ | R⁶ |
|---|---|---|---|---|---|---|
| e-4 | 5-NO₂ | CH₃ | H | SO₂CH₃ | *o*-tolyl | mesityl |

As the oil-soluble dye in the present invention, it is particularly preferable to use a compound (hereinafter, occasionally referred to as "phthalocyanine dye") represented by the following general formula (C-I). The compound represented by general formula (C-I) is described below.

General formula (C-I)

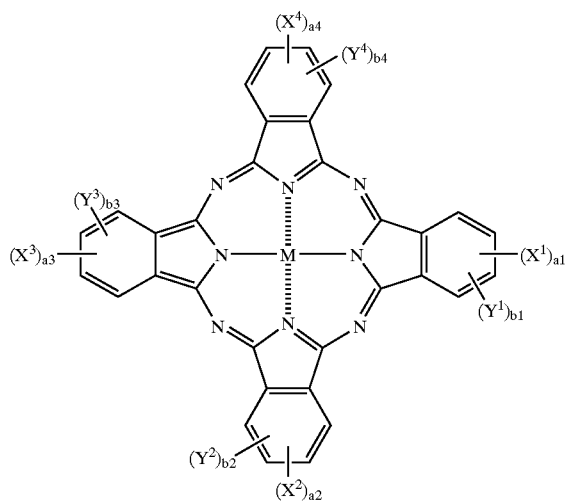

In general formula (C-I), $X^1$, $X^2$, $X^3$ and $X^4$ each independently represents —SO—$Z^1$, —SO₂—$Z^1$ or —SO₂NR²¹R²².

$Z^1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. In particular, a substituted or unsubstituted alkyl group, substituted or unsubstituted aryl group and substituted or unsubstituted heterocyclic group are preferable, with the substituted alkyl group, substituted aryl group and substituted heterocyclic group being most preferable.

$R^{21}$ and $R^{22}$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group. In particular, hydrogen atoms, substituted or unsubstituted alkyl groups, substituted or unsubstituted aryl groups, and substituted or unsubstituted heterocyclic groups are preferable, with hydrogen atoms, substituted alkyl groups, substituted aryl groups and substituted heterocyclic groups being most preferable. However, $R^{21}$ and $R^{22}$ are not both hydrogen atoms.

It is preferable that the number of carbon atoms in a substituted or unsubstituted alkyl group represented by $R^{21}$, $R^{22}$ or $Z^1$ is 1–30. Examples of the substituents include the same substituents as in the case in which it is possible for $Z^1$, $R^{21}$, $R^{22}$, $Y^1$, $Y^2$, $Y^3$ and $Y^4$ to have additional substituents. In particular, hydroxyl groups, alkoxy groups, cyano groups and halogen atoms are preferable.

It is preferable that the number of carbon atoms in a substituted or unsubstituted cycloalkyl group represented by $R^{21}$, $R^{22}$ or $Z^1$ is 5–30. Examples of the substituents include the same substituents as in the case in which it is possible for $Z^1$, $R^{21}$, $R_{22}$, $Y^1$, $Y^2$, $Y^3$ and $Y^4$ to have additional substituents. In particular, hydroxyl groups, alkoxy groups, cyano groups and halogen atoms are preferable.

It is preferable that the number of carbon atoms in a substituted or unsubstituted alkenyl group represented by $R^{21}$, $R^{22}$ or $Z^1$ is 2–30. Examples of the substituents include the same substituents as in the case in which it is possible for $Z^1$, $R^{21}$, $R^{22}$, $Y^1$, $Y^2$, $Y^3$ and $Y^4$ to have additional substituents. In particular, hydroxyl groups, alkoxy groups, cyano groups and halogen atoms are preferable.

It is preferable that the number of carbon atoms in a substituted or unsubstituted aralkyl group represented by $R^{21}$, $R^{22}$ or $Z^1$ is 7–30. Examples of the substituents include the same substituents as in the case in which it is possible for $Z^1$, $R^{21}$, $R^{22}$, $Y^1$, $Y^2$, $Y^3$ and $Y^4$ to have additional substituents. In particular, hydroxyl groups, alkoxy groups, cyano groups and halogen atoms are preferable.

Examples of substituents of an aryl group represented by $R^{21}$, $R^{22}$ or $Z^1$ include the same substituents as in the case in which it is possible for $Z^1$, $R^{21}$, $R^{22}$, $Y^1$, $Y^2$, $Y^3$ and $Y^4$ to have additional substituents. Examples of preferable substituents include halogen atoms, heterocyclic groups, cyano groups, hydroxyl groups, nitro groups, carboxyl groups, acylamino groups, ureido groups, sulfamoylamino groups, alkyloxycarbonyl groups, alkyloxycarbonylamino groups, sulfonamide groups, sulfamoyl groups, carbamoyl groups, sulfonyl groups, acyloxy groups, carbamoyloxy groups, imide groups, heterocyclic ring thio groups, acyl groups, sulfo groups, quaternary ammonium groups and the like. Preferable among these are heterocyclic groups, cyano groups, carboxyl groups, acylamino groups, sulfonamide groups, sulfamoyl groups, carbamoyl groups, sulfonyl groups, imide groups, acyl groups. Particularly preferable are cyano groups, carboxyl groups, sulfamoyl groups, carbamoyl groups, sulfonyl groups, imide groups, and acyl groups.

It is preferable that heterocyclic groups represented by $R^{21}$, $R^{22}$ and $Z^1$ have 5 to 6 membered rings. These rings may be condensed. Further, they may be aromatic heterocyclic rings or non-aromatic heterocyclic rings.

Heterocyclic groups represented by $R^{21}$, $R^{22}$ and $Z^1$ are indicated below by their heterocyclic ring with substituent positions omitted. It should be noted that there are no limitations on the substituent positions. If, for example, the substituent is pyridine, substitution is possible at the second, third and fourth positions.

Examples of the heterocyclic groups include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzoisothiazole, thiadiazole, isooxazole, benzoisooxazole, pyrrolidine, piperidine, piperazine, imidazolidine, and thiazoline. Among these, aromatic heterocyclic groups are preferable. Preferable examples thereof include, as listed above, pyridine, pyrazine, pyrimidine, pyridazine, triazine, pyrazole, imidazole, benzimidazole, triazole, thiazole, benzothiazole, isothiazole, benzoisothiazole, and thiadiazole. These may also have substituents.

$Y^1$, $Y^2$, $Y^3$ and $Y^4$ each independently represents a hydrogen atom, halogen atom, alkyl group, cycloalkyl group, alkenyl group, aralkyl group, aryl groups, heterocyclic group, cyano group, hydroxyl group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group or sulfo group. Each of these may have additional substituents.

Preferable among these are hydrogen atoms, halogen atoms, alkyl groups, aryl groups, cyano groups, alkoxy groups, amide groups, ureido groups, sulfonamide groups, carbamoyl groups, sulfamoyl groups and alkoxycarbonyl groups. Particularly preferable are hydrogen atoms, halogen atoms and cyano atoms, with hydrogen atoms being most preferable.

When the group is one in which it is possible for $Z^1$, $R^{21}$, $R^{22}$, $Y^1$, $Y^2$, $Y^3$ and $Y^4$ to have additional substituents, $Z^1$, $R^{21}$, $R^{22}$, $Y^1$, $Y^2$, $Y^3$ and $Y^4$ may have the following substituents.

Halogen atoms (e.g., chlorine, bromine), alkyl groups with straight or branching chains and 1–30 carbons, aralkyl groups with 7–30 carbons, alkenyl groups with 2–30 carbons, alkinyl groups with straight or branching chains and 2–30 carbons, cycloalkyl groups with straight or branching chains and 3–30 carbons, cycloalkenyl groups with straight or branching chains and 3–30 carbons, (specifically, methyl, ethyl, propyl, isopropyl, t-butyl, 2-methanesulfonylethyl, 3-phenoxypropyl, trifluoromethyl, cyclopentyl), aryl groups (e.g., phenol, 4-t-butylphenol, 2,4-di-t-amyl phenol), heterocyclic groups (e.g., imidazolyl, pyrazolyl, triazolyl, 2-furil, 2-thienyl, 2-pyrimidinyl, 2-benzothiazolyl), cyano groups, hydroxyl groups, nitro groups, carboxyl groups, amino groups, alkyloxy groups (e.g., methoxy, ethoxy, 2-methoxyethoxy, 2-methanesulfonylethoxy), aryloxy groups (e.g., phenoxy, 2-methylphenoxy, 4-t-butylphenoxy, 3-nitrophenoxy, 3-t-butyloxycarbamoylphenoxy, 3-methoxycarbamoyl), acylamino groups (e.g., acetamide, benzamide, 4-(3-t-butyl-4-hydroxyphenoxy)butanamide), alkylamino groups (e.g., methylamino, butylamino, diethylamino, methylbutylamino), anilino groups (e.g., phenolamino, 2-chloroanilino), ureido groups (e.g., phenolureido, methylureido, N,N-dibutylureido), sulfamoylamino groups (e.g., N,N-dipropylsulfamoylamino), alkylthio groups (e.g., methylthio, octylthio, 2-phenoxyethylthio), arylthio groups (e.g., phenylthio, 2-butoxy-5-t-octylphenylthio, 2-carboxyphenylthio), alkyloxycarbonylamino groups (e.g., methoxycarbonylamino), sulfonamide groups (e.g., methanesulfonamide, benzenesulfonamide, p-toluenesulfonamide), carbamoyl groups (e.g., N-ethylcarbamoyl, N,N-dibutylcarbamoyl), sulfamoyl groups (e.g., N-ethylsulfamoyl, N,N-dipropylsulfamoyl, N-phenylsulfamoyl), sulfanyl groups (e.g., methane sulfanyl, octanesulfanyl, benzenesulfanyl, toluenesulfanyl), alkyloxycarbonyl groups (e.g., methoxycarbonyl, butyloxycarbonyl) heterocyclic groups (e.g., 1-phenyltetrazole-5-oxy, 2-tetrahydropyranyloxy), azo groups (e.g., phenolazo, 4-methoxyphenylazo, 4-pivaloylaminophenolazo, 2-hydroxy-4-propanoylphenolazo), acyloxy groups (e.g., acetoxy), carbamoyloxy groups (e.g., N-methylcarbamoyloxy, N-phenylcarbamoyloxy), silyloxy (e.g., trimethylsilyloxy, dibutylmethylsilyloxy), aryloxycarbonylamino groups (e.g., phenoxycarbonylamino), imide groups (e.g., N-succinimide, N-phthalimide), heterocyclic ring thio groups (e.g., 2-benzothialylthio, 2,4-di-phenoxy-1,3,5-triazole-6-thio, 2-pyridylthio), sulfinyl groups (e.g., 3-phenoxypropylsulfinyl), phosphonyl groups (e.g., phenoxyphosphonyl, octyloxyphosphonyl, phenylphosphonyl), aryloxycarbonyl groups (e.g., phenoxycarbonyl), acyl groups (e.g., acetyl, 3-phenylpropanoyl, benzoyl), ionic hydrophilic groups (e.g., carboxyl groups, sulfo groups, and quaternary ammonium groups) and the like.

$a^1$ to $a^4$ and $b^1$ to $b^4$ represent substituent numbers for $X^1$ to $X^4$ and $Y^1$ to $Y^4$ respectively. $a^1$ to $a^4$ each independently represents an integer of 0 to 4, and $b^1$ to $b^4$ each independently represents an integer of 0 to 4, wherein the summation of $a^1$ to $a^4$ is no less than 2. Here, if any of $a^1$ to $a^4$ and $b^1$ to $b^4$ represent integers of 2 or greater, plural incidences of $X^1$ to $X^4$ and $Y^1$ to $Y^4$ may be the same or different.

$a^1$ and $b^1$ each independently represents an integer of 0–4 that fulfills the relationship $a^1+b^1=4$. Particularly preferable is a combination in which $a^1$ represents 1 or 2 and $b^1$ represents 3 or 2. The most preferable combination is one in which $a^1$ represents 1 and $b^1$ represents 3.

$a^2$ and $b^2$ each independently represents an integer of 0–4 that fulfills the relationship $a^2+b^2=4$. Particularly preferable is a combination in which $a^2$ represents 1 or 2 and $b^2$ represents 3 or 2. The most preferable combination is one in which $a^2$ represents 1 and $b^2$ represents 3.

$a^3$ and $b^3$ each independently represents an integer of 0–4 that fulfills the relationship $a^3+b^3=4$. Particularly preferable is a combination in which $a^3$ represents 1 or 2 and $b^3$ represents 3 or 2. The most preferable combination is one in which $a^3$ represents 1 and $b^3$ represents 3.

$a^4$ and $b^4$ each independently represents an integer of 0–4 that fulfills the relationship $a^4+b^4=4$. Particularly preferable is a combination in which $a^4$ represents 1 or 2 and $b^4$ represents 3 or 2. The most preferable combination is one in which $a^4$ represents 1 and $b^4$ represents 3.

M represents a hydrogen atom, a metal element or oxide, hydride or halide thereof.

Preferable examples of M include hydrogen atoms and metal atoms such as Li, Na, K, Mg, Ti, Zr, V, Nb, Ta, Cr, Mo, W, Mn, Fe, Co, Ni, Ru, Pd, Os, Ir, Pt, Cu, Ag, Au, Zn, Cd, Hg, Al, Ga, In, Si, Ge, Sn, Pb, Sb and Bi. Examples of oxides include VO and GeO. Examples of hydrides include $Si(OH)_2$, $Cr(OH)_2$ and $Sn(OH)_2$. Further, examples of halides include AlCl, $SiCl_2$, VCl, $VCl_2$, VOCl, FeCl, GaCl and ZrCl. Cu, Ni, Zn and Al are particularly preferable, with Cu being the most preferable.

Further, a Pc (phthalocyanine ring) may be formed as a dimer (e.g., Pc—M—L—M—Pc) or trimer via L (a divalent continuous group). In this case, the Ms may be the same or different.

The divalent continuous group represented by L is preferably an oxy group-O—, thio group-S—, carbonyl group-CO—, sulfonyl group-$SO_2$—, imino group-NH—, or methyl group-$CH_2$.

Particularly preferable combinations for the compound represented by general formula (C-I) are as follows.

It is particularly preferable for $X^1$–$X^4$ to each independently represent —$SO_2$—$Z^1$ or $SO_2NR^{21}R^{22}$.

It is preferable for each $Z^1$ to respectively independently be a substituted or unsubstituted alkyl group, a substituted or unsubstituted aryl group, or a substituted or unsubstituted heterocyclic group, with a substituted alkyl group, a substituted aryl group and a substituted heterocyclic group being the most preferable.

It is preferable for $R^{21}$ and $R^{22}$ to respectively independently be a halogen atom, a substituted or unsubstituted alkyl group, a substituted or unsubstituted aryl group, or a substituted or unsubstituted a heterocyclic group, with a halogen atom, a substituted alkyl group, a substituted aryl group and a substituted heterocyclic group being the most preferable.

It is preferable for $Y^1$–$Y^4$ to be hydrogen atoms, halogen atoms, alkyl groups, aryl groups, cyano groups, alkoxy groups, amide groups, ureido groups, sulfonamide groups, carbamoyl groups, sulfamoyl groups, alkoxycarbonyl groups, carboxyl groups and sulfo groups, with hydrogen atoms, halogen atoms, cyano groups, carboxyl groups and sulfo groups being particularly preferable and hydrogen atoms being most preferable.

It is preferable for $a^1$–$a^4$ to each independently be 1 or 2, with 1 being particularly preferable. It is preferable for $b^1$–$b^4$ to each independently be 3 or 2, with 3 being particularly preferable.

M represents a hydrogen atom, or a metal element or its oxide, hydride or halide. In particular, Cu, Ni, Zn and Al are preferable, with Cu being most preferable.

With respect to combinations of preferable substituents of the compound represented by general formula (C-I), it is preferable for at least one of the various substituents to comprise a group listed as being preferable above. It is more preferable for many of the substituents to comprise groups listed as being preferable above, and most preferable for all of the substituents to comprise groups listed as being preferable above.

Among compounds represented by general formula (C-I), compounds having a structure represented by the following general formula (C-II) are more preferable.

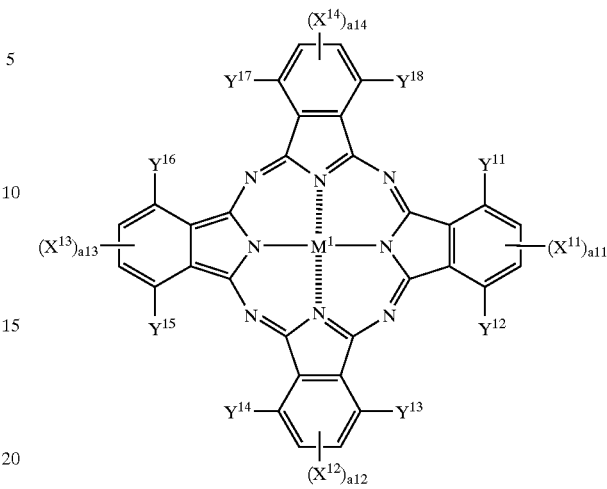

General formula (C-II)

In general formula (C-II), $X^{11}$–$X^{14}$ are the same as $X^1$–$X^4$ in general formula (C-I), and $Y^{11}$–$Y^{14}$ are the same as $Y^1$–$Y^4$ in general formula (C-I). Preferable examples of $X^{11}$–$X^{14}$ and $Y^{11}$–$Y^{14}$ are the same as those respectively given for $X^1$–$X^4$ and $Y^1$–$Y^4$. Further, $M^1$ is the same as M in general formula (C-I), and preferable examples thereof are also the same as those given for M.

Specifically, in general formula (C-II), $X^{11}$, $X^{12}$ $X^{13}$ and $X^{14}$ each independently represents —SO—$Z^{11}$, —$SO_2$—$Z^{11}$ or $SO_2NR^{23}R^{24}$.

$Z^{11}$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

$R^{23}$ represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group.

$R^{24}$ represents a substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group.

$Y^{11}$, $Y^{12}$, $Y^{13}$, $Y^{14}$, $Y^{15}$, $Y^{16}$, $Y^{17}$, $Y^{18}$ and $Y^{19}$ each independently represents a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonyl amino group, imide group, heterocyclic thio group, phosphoryl group, acyl group, carboxyl group or sulfo group. Each of these may have additional substituents.

$a^{11}$ to $a^{14}$ represent substituent numbers of $X^{11}$–$X^{14}$ respectively, but are never all 0 at the same time. It should be noted that when any of $a^{11}$ to $a^{14}$ represent 2, two incidences of $X^{11}$ to $X^{14}$ may respectively be the same or different.

$M^1$ is a hydrogen atom, or a metal element or oxide, hydride or halide thereof.

In general formula (C-II), It is preferable that $a^{11}$ to $a^{14}$ represent respectively independent integers of 1 or 2, within a range of $4 \leq a^{11}+a^{12}+a^{13}+a^{14} \leq 8$. Particularly preferable is a range of $4 \leq a^{11}+a^{12}+a^{13}+a^{14} \leq 6$, with $a^{11}=a^{12}=a^{13}=a^{14}=1$ being most preferable.

Among the compounds represented by general formula (C-II), examples of particularly preferable combinations of substituents are as follows.

It is preferable that $X^{11}$ to $X^{14}$ are respectively independently $-SO_2-Z^{11}$ or $-SO_2NR^{23}R^{24}$.

It is preferable that each $Z^{11}$ is respectively independently a substituted or unsubstituted alkyl group, a substituted or unsubstituted aryl group, or a substituted or unsubstituted heterocyclic group, with a substituted alkyl group, a substituted aryl group and a substituted heterocyclic group being most preferable.

It is preferable that each $R^{23}$ is respectively independently a hydrogen atom, a substituted or unsubstituted alkyl group, a substituted or unsubstituted aryl group, or a substituted or unsubstituted heterocyclic group, with a hydrogen atom, a substituted alkyl group, a substituted aryl group and a substituted heterocyclic group being most preferable.

It is preferable that each $R^{24}$ is respectively independently a substituted or unsubstituted alkyl group, a substituted or unsubstituted aryl group, or a substituted or unsubstituted heterocyclic group, with a substituted alkyl group, a substituted aryl group and a substituted heterocyclic group being most preferable.

It is preferable for $Y^{11}$–$Y^{18}$ to respectively independently be hydrogen atoms, halogen atoms, alkyl groups, aryl groups, cyano groups, alkoxy groups, amide groups, ureido groups, sulfonamide groups, carbamoyl groups, sulfamoyl groups and alkoxycarbonyl groups, with hydrogen atoms, halogen atoms and cyano groups being particularly preferable and hydrogen atoms being most preferable.

It is preferable for $a^{11}$–$a^{14}$ to each independently be 1 or 2, with 1 being particularly preferable.

$M^1$ represents a hydrogen atom, a metal element or its oxide, hydride or halide. In particular, Cu, Ni, Zn and Al are preferable, with Cu being most preferable.

With respect to combinations of preferable substituents of the compound represented by general formula (C-II), it is preferable for at least one of the various substituents to comprise a group listed as being preferable above. It is more preferable for many of the substituents to comprise groups listed as being preferable above, and most preferable for all of the substituents to comprise groups listed as being preferable above.

The compound represented by general formula (C-I) is generally an analogous mixture in which the position and number at which substituents Rn (n=1–4) and Yq (q=1–4) are introduced are unavoidably different depending upon the method of synthesis. There are many cases in which these analogous mixtures are expressed as statistical averages. It was discovered for the present invention that, when these analogous mixtures are classified into three classes as indicated below, specific mixtures are particularly preferable.

In the present invention, the phthalocyanine dye analogous mixtures that are compounds represented by the general formulae (C-I) and (C-II) are defined by classifying the mixtures into the following three classes on the basis of substitution position.

(1) β-position substitution type: (phthalocyanine dye having a specific substituent at: 2- and/or 3-position; 6- and/or 7-position; 10- and/or 11-position; and 14- and/or 15-position)

(2) α-position substitution type: (phthalocyanine dye having a specific substituent at: 1- and/or 4-position; 5- and/or 8-position; 9- and/or 12-position; and 13- and/or 16-position)

(3) α,β-position mixed substitution type: (phthalocyanine dye having specific substituents without regularity at the 1–16 positions)

In the present specification, when describing derivatives of phthalocyanine dyes whose structures are different (particularly, substitution positions), the β-position substitution type, α-position substitution type and α,β-position mixed substitution type designations will be used.

The phthalocyanine derivatives used in the present invention can be synthesized by combining methods disclosed in, for example, *Futaroshianin: Kagaku to Kinou* ("Phthalocyanines: Chemistry and Functions", by Shirai and Kobayashi, published by APC Co., pp. 1–62) and *Phthalocyanines: Properties and Applications* (by C. C. Leznoff and A. B. P. Lever, published by VCH, pp. 1–54), and also by similar methods.

The compound represented by general formula (C-I) of the present invention can be synthesized through, for example, a sulfonation reaction, a sulfonyl chloridation reaction or an amidation reaction of an unsubstituted phthalocyanine compound, as disclosed in WO 00/17275, WO 00/08103, WO 00/08101, WO98/41853, JP-A No.10-36471 and the like. In this case, since sulfonation occurs easily at any position of the phthalocyanine nucleus, it is difficult to control the number of substituents that are sulfonated. Consequently, when a sulfo group is introduced under such reaction conditions, the number and position of the sulfo groups introduced to the product cannot be specified, and a mixture is invariably obtained in which the number and substitution position of the substituents are different. Thus, when using as raw material the mixture in which the number and substitution positions of the substituents are different to synthesize the compound of the present invention, because the number and substitution position of the heterocyclic substituent sulfamoyl groups cannot be specified, an α,β-position mixed-substitution type mixture that includes several types of compounds in which the number and substitution position of the substituents are different is obtained as the compound of the present invention.

As described above, when many electron withdrawing groups such as, for example, a sulfamoyl group are introduced to the phthalocyanine nucleus, oxidation potential becomes nobler and ozone resistance rises. When the above method of synthesis is followed, the number of electron withdrawing groups being introduced is few, i.e., it is unavoidable for the phthalocyanine dye, which has a baser oxidation potential, to be mixed. Therefore, in order to improve ozone resistance, it is preferable to use a synthesis method that suppresses formation of a compound whose oxidation potential is baser.

In contrast, the compound represented by general formula (C-II) of the present invention can be derived from a compound obtained by reacting the metal derivative represented by general formula (C-III) with a phthalonitrile derivative (compound P) represented by the following formula and/or a diiminoisoindoline derivative (compound Q).

(compound P)

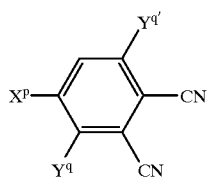

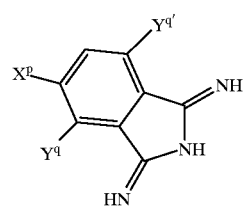

(compound Q)

In compounds P and Q, p represents 11–14 and q and q' each independently represents 11–18.

$$M—(Y)_d \qquad \text{General formula (C-III)}$$

(In general formula (C-III), M is the same as M in the compounds represented by the general formulae (C-I) and (C-II), Y represents a monovalent or divalent ligand such as a halogen atom, negative ion acetate, acetylacetonate or oxygen, and d represents an integer from 1–4.)

That is, if the above synthesis method is followed, it is possible to introduce only a specific number of desired substituents. Particularly when, as in the present invention, many electron withdrawing groups are to be introduced in order to raise oxidation potential, the above synthesis method is superior to the method of synthesizing the compound represented by general formula (C-I).

The compound that is represented by general formula (C-II) and obtained in this manner ordinarily is a mixture of compounds, which are isomers in respective substitution positions of $X^p$, represented by general formulae (C-II-1) to (C-II-4). They are β-position substitution types (phthalocyanine dyes having specific substituents at the 2- and/or 3-position, 6- and/or 7-position, 10- and/or 11-position, and 14- and/or 15-position).

General formula (C-II-1)

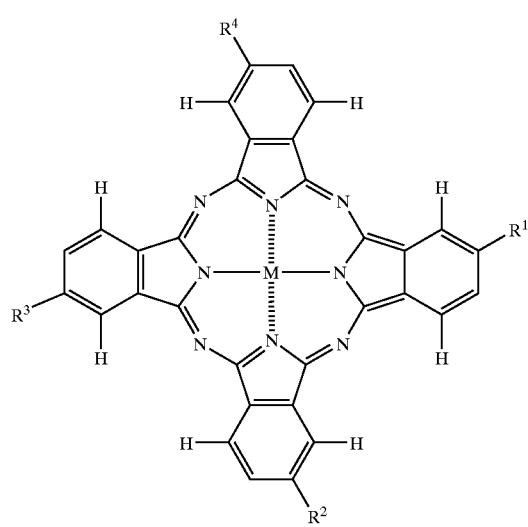

General formula (C-II-2)

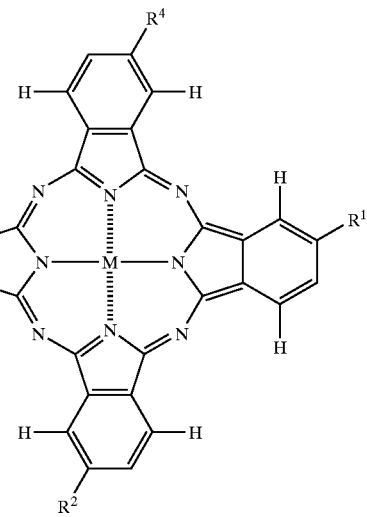

General formula (C-II-3)

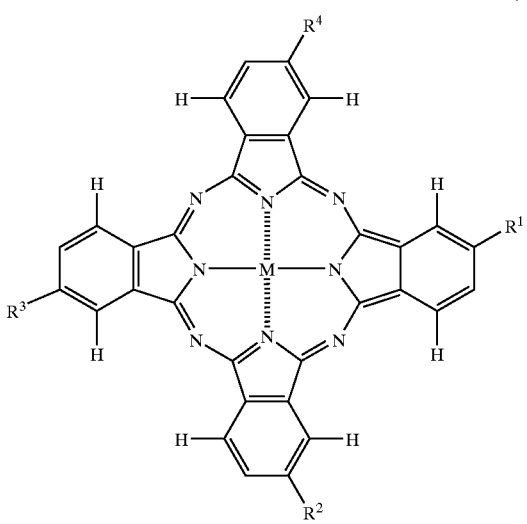

General formula (C-II-4)

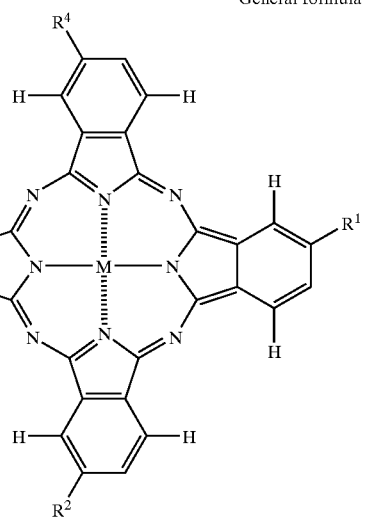

In the preceding general formulae (C-II-1) to (C-II-4), $R^1$ to $R^4$ are the same as $(X^{11})a^{11}$ to $(X^{14})a^{14}$ in the general formula (C-II).

In the present invention, it was discovered that it is extremely important for the oxidation potential to be nobler than 1.0V (vs SCE) in each of the substitution types, to improve fastness. In particular, there was a tendency for the β-position substitution type to be superior to the α,β-position mixed substitution type in terms of coloring, light fastness and resistance to ozone gas.

Specific examples (C-101 to C-120) of compounds represented by the general formulae (C-I) and (C-II) are given below, but the present invention is not limited to the same.

(C-101)

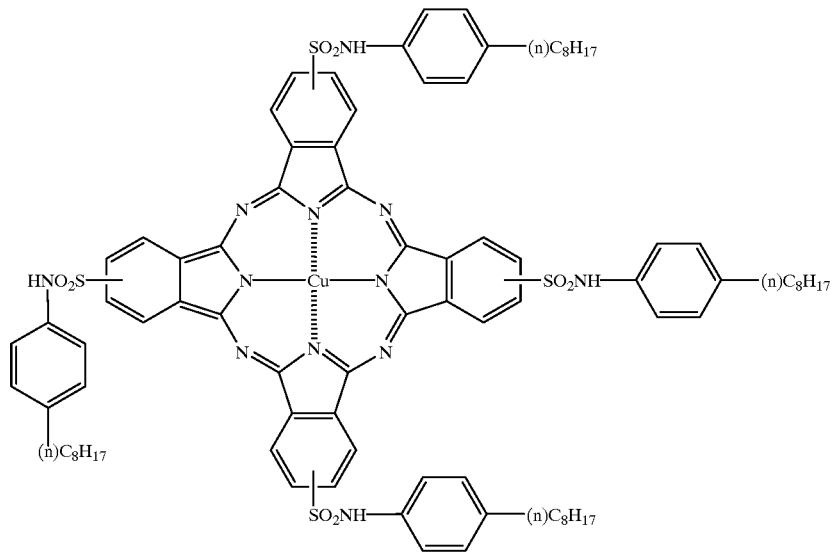

(C-102)

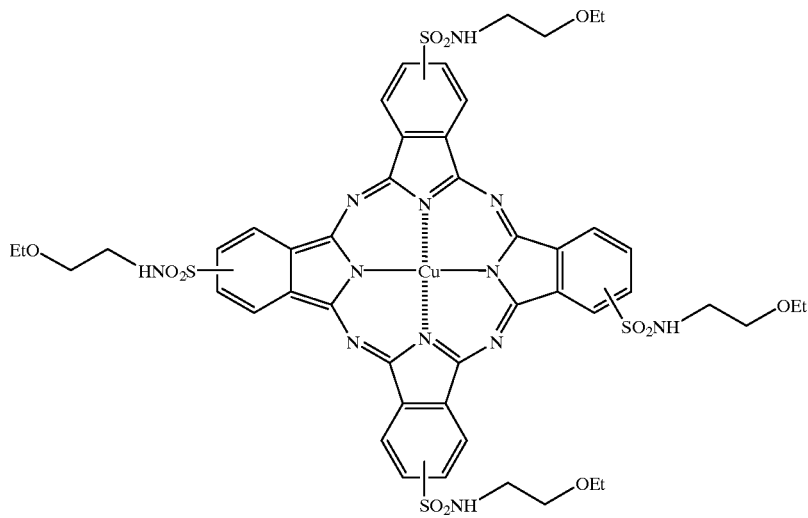

-continued
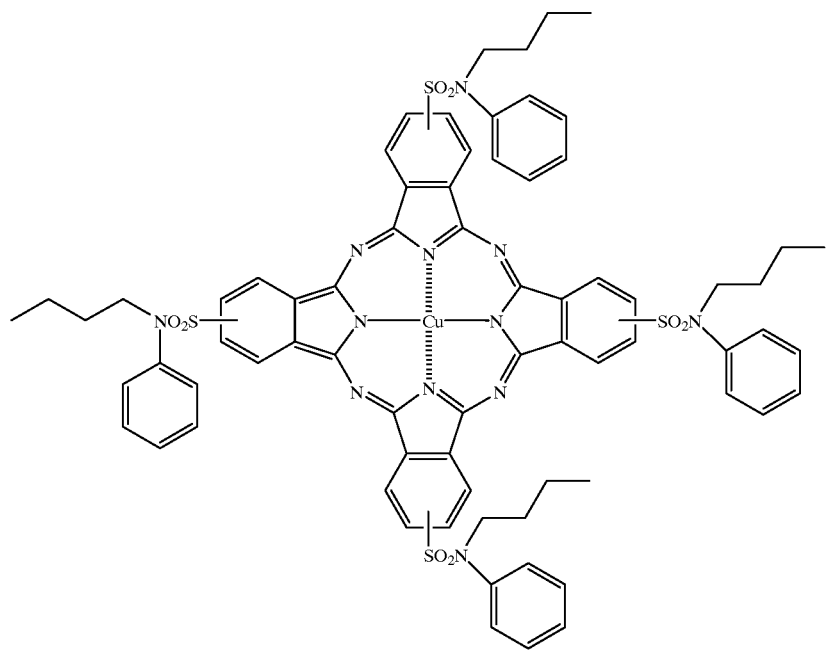
(C-103)
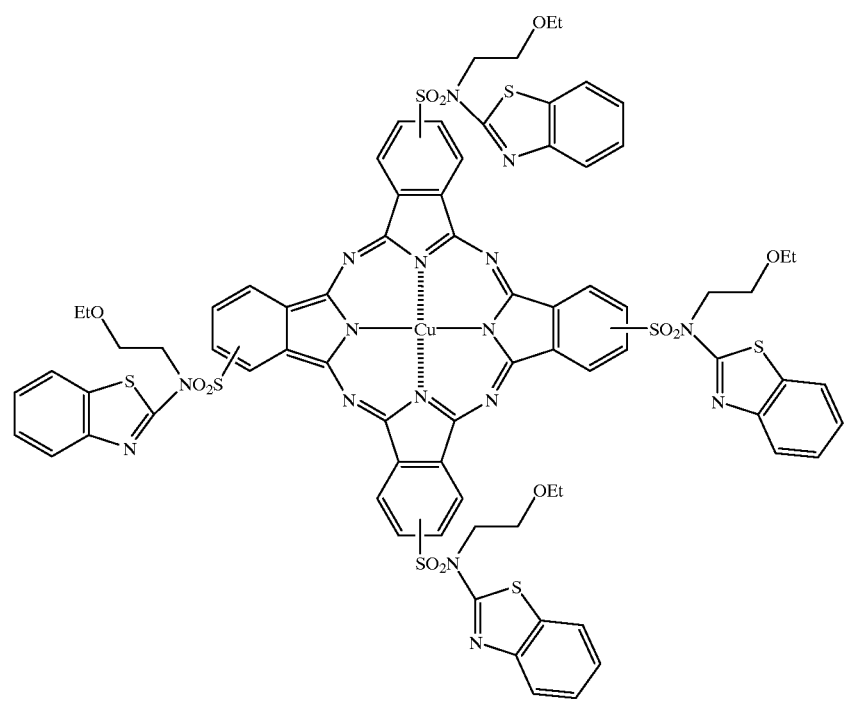
(C-104)

TABLE 10
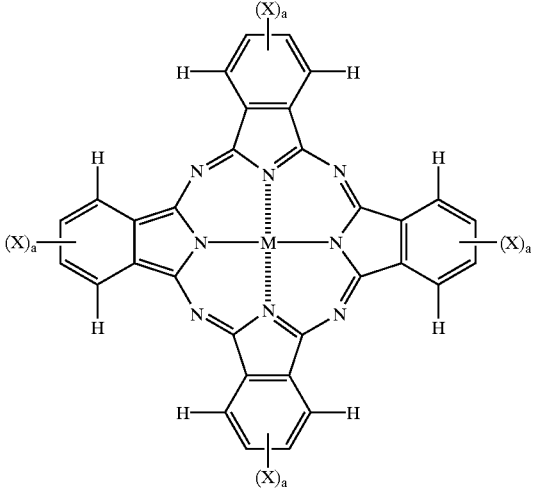
| compound No. | M | X | a |
|---|---|---|---|
| C-105 | Cu | —SO$_2$NHC$_8$H$_{17}$(t) | 1 |
| C-106 | Cu | 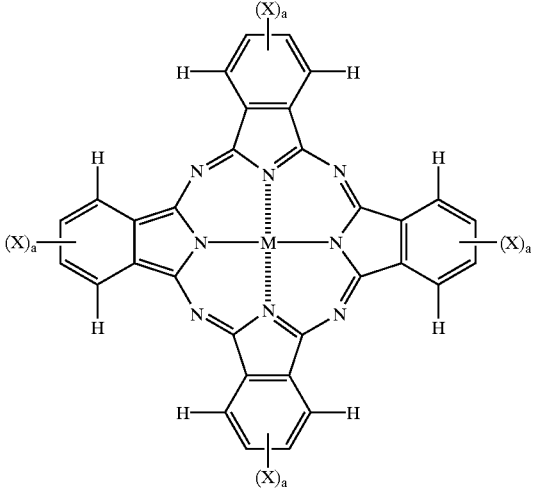 | 1 |
| C-107 | Cu | 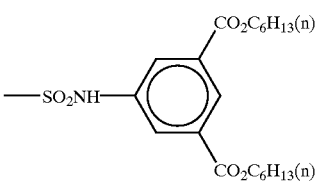 | 1 |
| C-108 | Cu | 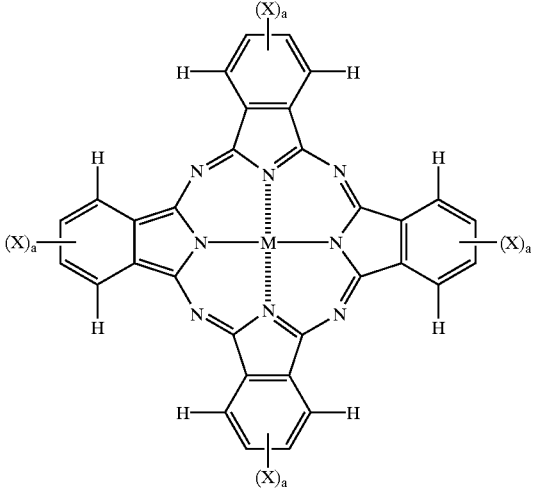 | 1 |
| C-109 | Cu | 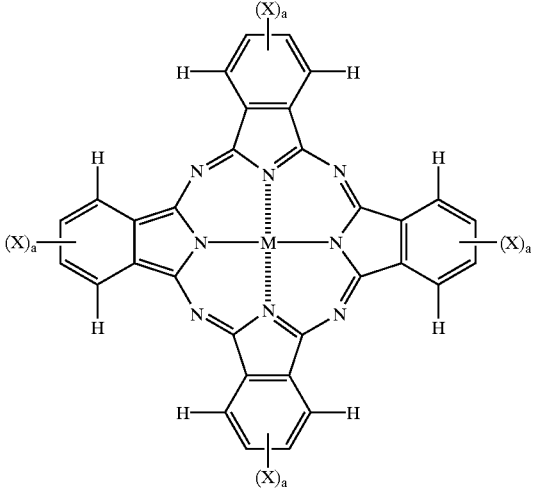 | 1 |
| C-110 | Cu | 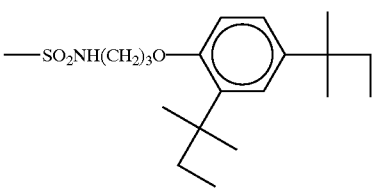 | 1 |
| C-111 | Cu | 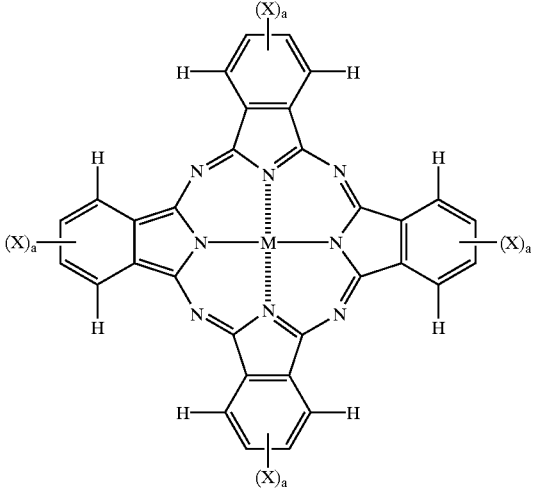 | 1 |
| C-112 | Cu | —SO$_2$N(CH$_2$CH$_2$OC$_2$H$_5$)$_2$ | 1 |

TABLE 11

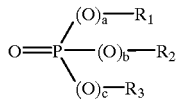

| compound No. | M | X | a |
|---|---|---|---|
| C-113 | Cu | C$_4$H$_9$O— ... —SO$_2$—⌬—C$_8$H$_{17}$(t) | 1 |
| C-114 | Cu | —SO$_2$(CH$_2$)$_2$SO$_2$NH(CH$_2$)$_3$OC$_3$H$_7$(i) | 1 |
| C-115 | Cu | —SO$_2$CH$_2$CO$_2$C$_2$H$_5$ | 1 |
| C-116 | Cu | —SO$_2$(CH$_2$)$_2$NHCOCH(C$_2$H$_5$)(C$_4$H$_9$) | 1 |
| C-117 | Cu | —SO$_2$(CH$_2$)$_2$CO$_2$C$_6$H$_{13}$(n) | 1 |
| C-118 | Cu | —SO$_2$C$_4$H$_9$(n) | 2 |
| C-119 | Cu | —SO$_2$—⌬—C$_4$H$_9$(t) | 1 |
| C-120 | Cu | —SO$_2$—⌬—H | 1 |

It is possible to synthesize the compound represented by general formula (C-I) according to the aforementioned patents. Further, the compound represented by general formula (C-II) can be synthesized by methods disclosed in JP-A No. 2000-24352, JP-A No. 2000-47013, JP-A No. 2000-57063 and JP-A No. 2000-96610. Further, the materials, coloring intermediate bodies and synthesis routes are not limited to the same.

Now, the hydrophobic high-boiling organic solvent contained in the colored fine particle dispersion is described.

The hydrophobic high-boiling organic solvent is hydrophobic and its boiling point is 150° C. or more. As used herein, the term "hydrophobic" refers to 3% or less solubility in distilled water at 25° C. The boiling point of the hydrophobic high-boiling organic solvent is preferably 170° C. or more. The dielectric constant of the hydrophobic high-boiling organic solvent is preferably 3 to 12, more preferably 4 to 10. As used herein, the term "dielectric constant" is indicative of relative dielectric constant under vacuum at 25° C.

The hydrophobic high-boiling organic solvent is not particularly limited and can be selected as necessary. For example, the compounds described in U.S. Pat. No. 2,322,027, etc. can be mentioned, and hydrophobic high-boiling organic solvents based on phosphates, fatty acid esters, phthalates, benzoates, phenols or amides are preferable.

The hydrophobic high-boiling organic solvent is particularly preferably those compounds represented by formulae [S-1] to [S-9]:

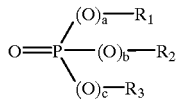

Formula [S-1]

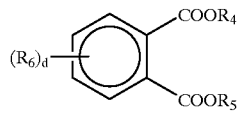

Formula [S-2]

(Ar—COO)$_e$—R$_7$    Formula [S-3]

(R$_8$—COO)$_f$—R$_9$    Formula [S-4]

R$_{10}$—(COO—R$_{11}$)$_g$    Formula [S-5]

Formula [S-6]

Formula [S-7]

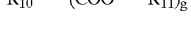

Formula [S-8]

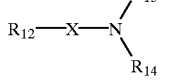

Formula [S-9]

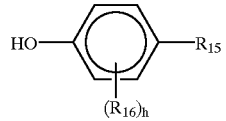

In formula [S-1] above, R$_1$, R$_2$ and R$_3$ each independently represents an aliphatic or aryl group. a, b and c each independently represents 0 or 1.

In formula [S-2] above, R$_4$ and R$_5$ each independently represents an aliphatic or aryl group.

R$_6$ represents a halogen atom (here and hereinafter F, Cl, Br, or I), an alkyl group, an alkoxy group, an aryloxy group, an alkoxycarbonyl group or an aryloxycarbonyl group.

d is an integer of 0 to 3. When d is two or more, a plurality of R$_6$ groups may be the same or different.

In formula [S-3] above, Ar represents an aryl group. e is an integer of 1 to 6. R$_7$ represents an e-valent hydrocarbon group or groups, the groups being bound to each other via ether linkage.

In formula [S-4] above, R$_8$ represents an aliphatic group. f is an integer of 1 to 6. R$_9$ represents an f-valent hydrocarbon group or groups, the groups bound to each other via ether linkage.

In formula [S-5] above, g is an integer of 2 to 6. $R_{10}$ represents a g-valent hydrocarbon group (excluding an aryl group). $R_{11}$ represents an aliphatic group or an aryl group.

In formula [S-6] above, $R_{12}$, $R_{13}$ and $R_{14}$ each independently represents a hydrogen atom, an aliphatic group or an aryl group. X represents —CO— or $SO_2$—. $R_{12}$ and $R_{13}$, or $R_{13}$ and $R_{14}$, may be bound to each other to form a ring.

In formula [S-7] above, $R_{15}$ represents an aliphatic group, an alkoxycarbonyl group, an aryloxycarbonyl group, an alkylsulfonyl group, an arylsulfonyl group, an aryl group or a cyano group.

$R_{16}$ represents a halogen atom, an aliphatic group, an aryl group, an alkoxy group or an aryloxy group.

h is an integer of 0 to 3. When h is two or more, a plurality of $R_{16}$ groups may be the same or different.

In formula [S-8] above, $R_{17}$ and $R_{18}$ each independently represents an aliphatic group or an aryl group. $R_{19}$ represents a halogen atom, an aliphatic group, an aryl group, an alkoxy group or an aryloxy group. i is an integer of 0 to 4. When i is two or more, a plurality of $R_{19}$ groups may be the same or different.

In formula [S-9] above, $R_{20}$ and $R_{21}$ represent an aliphatic group or an aryl group. j is 1 or 2.

In the formulae [S-1] to [S-9] above, when any of $R_1$ to $R_6$, $R_8$, and $R_{11}$ to $R_{21}$ represents an aliphatic group or a group containing an aliphatic group, the aliphatic group may be straight-chain, branched or cyclic, may contain an unsaturated bond, and may have a substituent group. Examples of the substituent group include a halogen atom, aryl group, alkoxy group, aryloxy group, alkoxycarbonyl group, hydroxyl group, acyloxy group, epoxy group, etc.

In the formulae [S-1] to [S-9] above, when any of $R_1$ to $R_6$, $R_8$ and $R_{11}$ to $R_{21}$ represents a cyclic aliphatic group (i.e. cycloalkyl group) or a group containing a cycloalkyl group, the cycloalkyl group may contain an unsaturated bond in the 3- to 8-membered ring thereof, or may have a substituent group or a crosslinking group. Examples of the substituent group include a halogen atom, aliphatic group, hydroxyl group, acyl group, aryl group, alkoxy group, epoxy group, alkyl group, etc., and examples of the crosslinking group include a methylene group, ethylene group, isopropylidene group, etc.

In the formulae [S-1] to [S-9] above, when any of $R_1$ to $R_6$, $R_8$, and $R_{11}$ to $R_{21}$ represents an aryl group or a group containing an aryl group, the aryl group may be substituted with a halogen atom, aliphatic group, aryl group, alkoxy group, aryloxy group, alkoxycarbonyl group, etc.

In the formulae [S-3], [S-4] and [S-5] above, when $R_7$, $R_9$ or $R_{10}$ is a hydrocarbon group, the hydrocarbon group may contain a cyclic structure (e.g. a benzene ring, a cyclopentane ring, a cyclohexane ring) or an unsaturated bond or may have a substituent group. Examples of the substituent group include a halogen atom, hydroxyl group, acyloxy group, aryl group, alkoxy group, aryloxy group, epoxy group, etc.

Now, particularly preferable hydrophobic high-boiling organic solvents in the present invention are described.

In the formula [S-1] above, $R_1$, $R_2$ and $R_3$ each represent a $C_{1-24}$ (preferably $C_{4-18}$) aliphatic group (e.g., n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, or 4-methylcyclohexyl) or a $C_{6-24}$ (preferably $C_{6-18}$) aryl group (e.g., phenyl, cresyl, p-nonylphenyl, xylyl, cumenyl, p-methoxyphenyl, or p-methoxycarbonylphenyl).

a, b and c are independently 0 or 1, and preferably all of them are 1.

In the formula [S-2] above, $R_4$ and $R_5$ each represents a $C_{1-24}$ (preferably $C_{4-18}$) aliphatic group (e.g., the same alkyl group as exemplified for $R_1$ above, ethoxycarbonyl methyl, 1,1-diethylpropyl, 2-ethyl-1-methylhexyl, cyclohexylmethyl, 1-ethyl-1,5-dimethylhexyl, 3,5,5-trimethylcyclohexyl, or 1-methylcyclohexyl) or a $C_{6-24}$ (preferably $C_{6-18}$) aryl group (e.g., the same aryl group as exemplified for $R_1$ above, 4-t-butylphenyl, 4-t-octylphenyl, 1,3,5-trimethylphenyl, or 2,4-di-t-butylphenyl, 2,4-di-t-pentylphenyl).

$R_6$ is a halogen atom (preferably Cl), a $C_{1-18}$ alkyl group (e.g., methyl, isopropyl, t-butyl, n-dodecyl), a $C_{1-18}$ alkoxy group (e.g., methoxy, n-butoxy, n-octyloxy, methoxyethoxy, benzyloxy), a $C_{6-18}$ aryloxy group (e.g., phenoxy, p-tolyloxy, 4-mehoxyphenoxy, 4-t-butylphenoxy), a $C_{2-19}$ alkoxycarbonyl group (e.g., methoxycarbonyl, n-butoxycarbonyl, 2-ethylhexyloxycarbonyl) or a $C_{6-25}$ aryloxycarbonyl group.

d is 0 or 1.

In the formula [S-3] above, Ar is a $C_{6-24}$ (preferably $C_{6-18}$) aryl group (e.g. phenyl, 4-chlorophenyl, 4-methoxyphenyl, 1-naphthyl, 4-n-butoxyphenyl, 1,3,5-trimethylphenyl), e is an integer of 1 to 4 (preferably 1 to 3), and $R_7$ is an e-valent $C_{2-24}$ (preferably $C_{2-18}$) hydrocarbon group [e.g., the same alkyl group exemplified for $R_4$ above, cycloalkyl group, aryl group, —$(CH_2)_2$—,

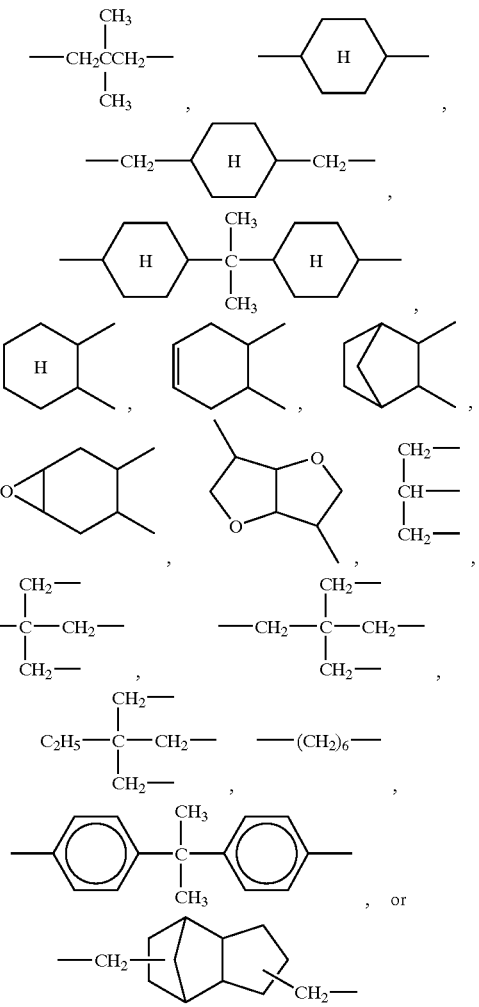

or e-valent $C_{4-24}$ (preferably $C_{4-18}$) hydrocarbon groups bound to each other via an ether linkage (for example, —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$—, and the following groups:

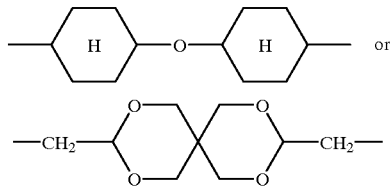

In formula [S-4] above, R$_8$ is a C$_{3-24}$ (preferably C$_{3-17}$) aliphatic group (e.g. n-propyl, 1-hydroxyethyl, 1-ethylpentyl, n-undecyl, pentadecyl, 8,9-epoxyheptadecyl, cyclopropyl, cyclohexyl, or 4-methylcyclohexyl), f is an integer of 1 to 4 (preferably 1 to 3), and R$^9$ is an f-valent C$_{2-24}$ (preferably C$_{2-18}$) hydrocarbon group or "c"-valent C$_{4-24}$ (preferably C$_{4-18}$) hydrocarbon groups bound to each other via an ether linkage (e.g., the same group exemplified for R$_7$ above).

In the formula [S-5] above, g is 2 to 4 (preferably 2 or 3), and R$_{10}$ is a g-valent hydrocarbon group (e.g., —CH$_2$—, —(CH$_2$)$_2$—, —(CH$_2$)$_4$—, —(CH$_2$)$_7$—, and the following groups:

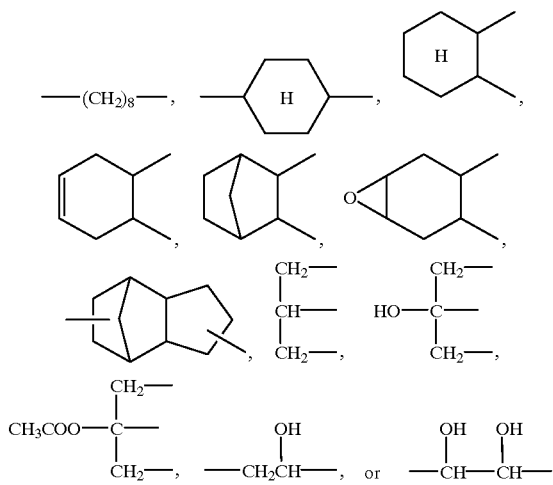

R$_{11}$ is a C$_{1-24}$ (preferably C$_{4-18}$) aliphatic group or a C$_{6-24}$ (preferably C$_{6-18}$) aryl group (e.g., the same aliphatic or aryl group as exemplified for R$_4$ above).

In the formula [S-6] above, R$_{12}$ is a C$_{1-20}$ aliphatic group (e.g., n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, or 4-methylcyclohexyl) or a C$_{6-24}$ (preferably C$_{6-18}$) aryl group (e.g., the same aryl group exemplified for Ar above).

R$_{13}$ and R$_{14}$ each represent a C$_{3-24}$ (preferably C$_{3-18}$) aliphatic group (e.g., isopropyl, n-butyl, n-hexyl, 2-ethylhexyl, n-dodecyl, cyclopentyl, cyclopropyl) or a C$_{6-18}$ (preferably C$_{6-15}$) aryl group (e.g., phenyl, 1-naphthyl, p-tolyl).

R$_{13}$ and R$_{14}$ may be bound to each other to form a pyrrolidine, piperidine or morpholine ring with N, and R$_{12}$ and R$_{13}$ may be bound to each other to form a pyrrolidone ring.

X represents —CO— or SO$_2$, preferably —C—.

In formula [S-7] above, R$_{15}$ is a C$_{1-24}$ (preferably C$_{3-18}$) aliphatic group (e.g., methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl, or cyclohexyl), a C$_{2-24}$ (preferably C$_{5-17}$) alkoxycarbonyl group (e.g., n-butoxycarbonyl, 2-ethylhexyloxycarbonyl, n-dodecyloxycarbonyl), a C$_{1-24}$ (preferably C$_{3-18}$) alkyl sulfonyl group (e.g., n-butyl sulfonyl, n-dodecyl sulfonyl), a C$_{6-30}$ (preferably C$_{6-24}$) aryl sulfonyl group (e.g., p-tolyl sulfonyl, p-dodecylphenyl sulfonyl, p-hexadecyloxyphenyl sulfonyl), a C$_{6-32}$ (preferably C$_{6-24}$) aryl group (e.g., phenyl, p-tolyl) or a cyano group.

R$_{16}$ is a halogen atom (preferably Cl), a C$_{1-24}$ (preferably C$_{3-18}$) alkyl group (e.g., the same alkyl group as exemplified for R$_{15}$ above), a C$_{5-17}$ cycloalkyl group (e.g., cyclopentyl, cyclohexyl), a C$_{6-32}$ (preferably C$_{6-24}$) aryl group (e.g., phenyl, p-tolyl), a C$_{1-24}$ (preferably C$_{1-18}$) alkoxy group (e.g., methoxy, n-butoxy, 2-ethylhexyloxy, benzyloxy, n-dodecyloxy, n-hexadecyloxy) or a C$_{6-32}$ (preferably C$_{6-24}$) aryloxy group (e.g., phenoxy, p-t-butylphenoxy, p-t-octylphenoxy, m-pentadecylphenoxy, p-decyloxyphenoxy), and h is an integer of 1 to 2.

In formula [S-8] above, R$_{17}$ and R$_{18}$ have the same meanings as defined for R$_{13}$ and R$_{14}$ above, and R$_{19}$ has the same meanings as defined for R$_{16}$ above.

In formula [S-9] above, R$_{20}$ and R$_{21}$ have the same meanings as defined for R$_1$, R$_2$ and R$_3$ above, and j is 1 or 2, preferably 1.

Examples of the hydrophobic high-boiling organic solvents (S-1 to S-23 as compounds represented by [S-1] above, S-24 to S-39 as compounds represented by [S-2] above, S-40 to S-44 as compounds represented by [S-3] above, S-45 to S-50 as compounds represented by [S-4] above, S-51 to S-58 as compounds represented by [S-5] above, S-59 to S-67 as compounds represented by [S-6] above, S-68 to S-75 as compounds represented by [S-7] above, S-76 to S-79 as compounds represented by [S-8] above, and S-80 to S-81 as compounds represented by [S-9] above) are shown below.

Compounds represented by formula [S-1]

Compounds represented by formula [S-1]

S-1
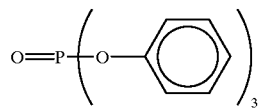

S-2
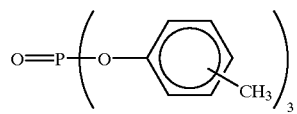

S-3
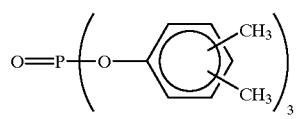

S-4
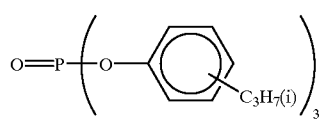

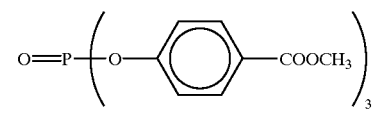
S-5
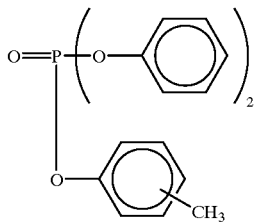
S-6
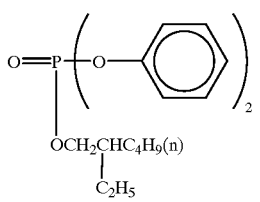
S-7
S-8
S-9
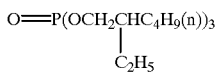
S-10
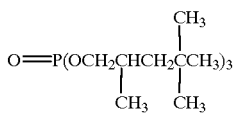
S-11
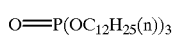
S-12
S-13
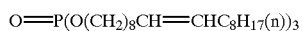
S-14
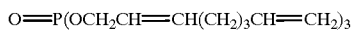
S-15
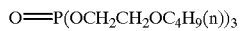
S-16
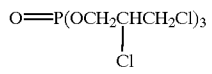
S-17
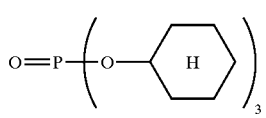
S-18
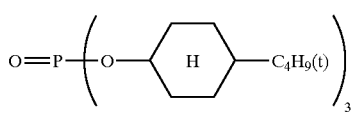
S-19
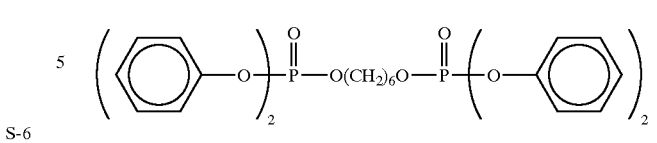
S-20
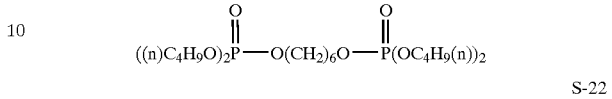
S-21
S-22
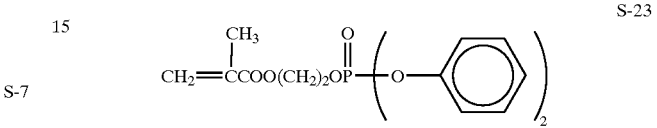
S-23
Compounds represented by formula [S-2]
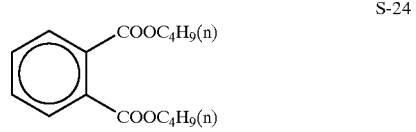
S-24
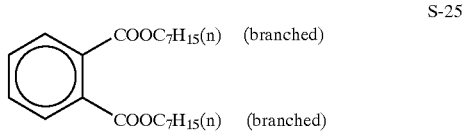
S-25
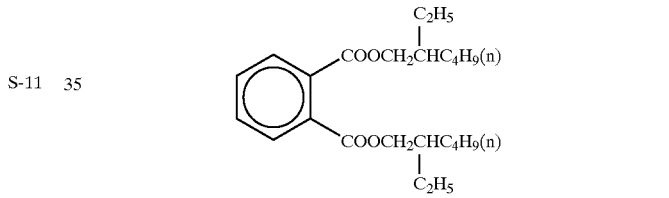
S-26
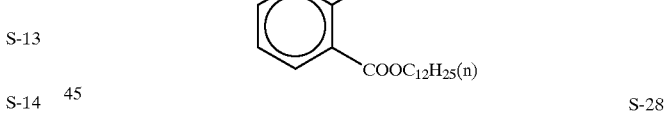
S-27
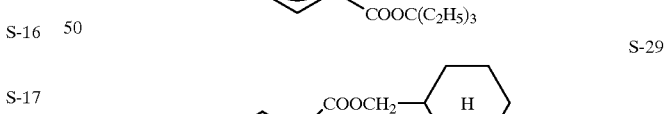
S-28
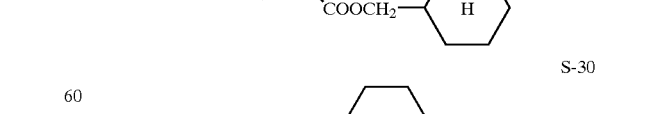
S-29
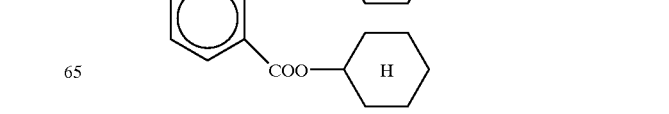
S-30

S-31 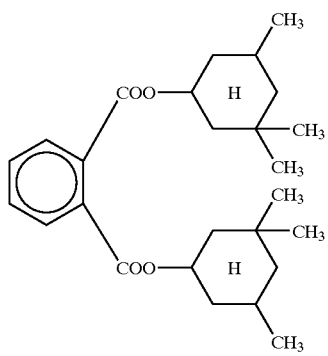
S-32 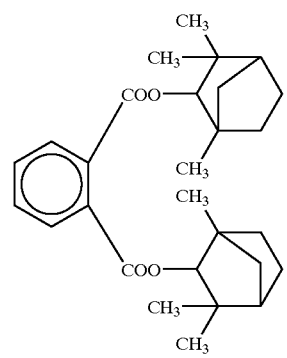
S-33 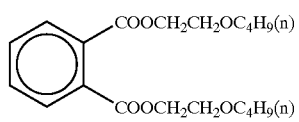
S-34 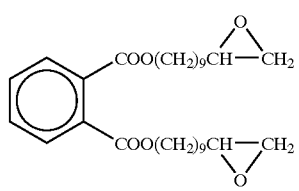
S-35 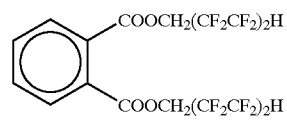
S-36 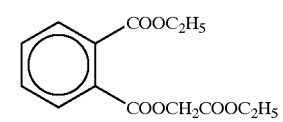
S-37 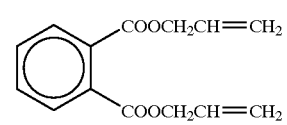
S-38 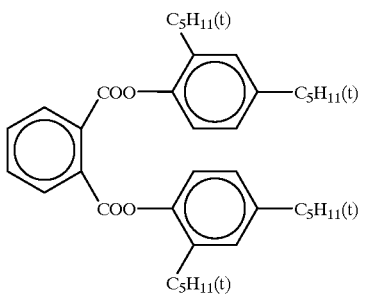
S-39 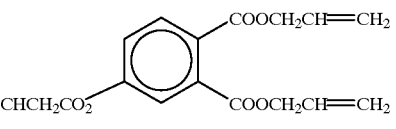
Compounds represented by formula [S-3]
S-40 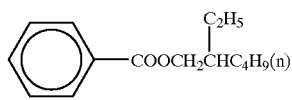
S-41 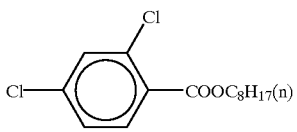
S-42 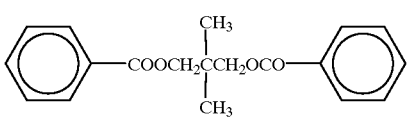
S-43 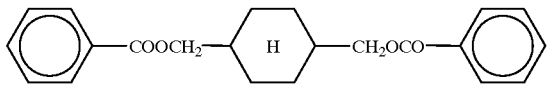
S-44 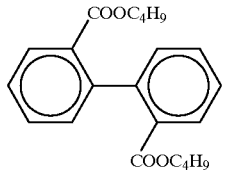
Compounds represented by formula [S-4]
S-45 $(n)C_{15}H_{31}COOC_{16}H_{33}(n)$
S-46 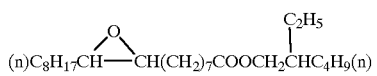
S-47 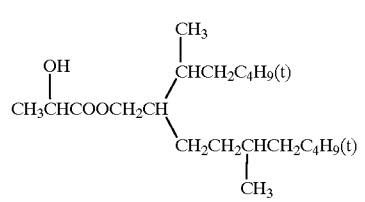

-continued
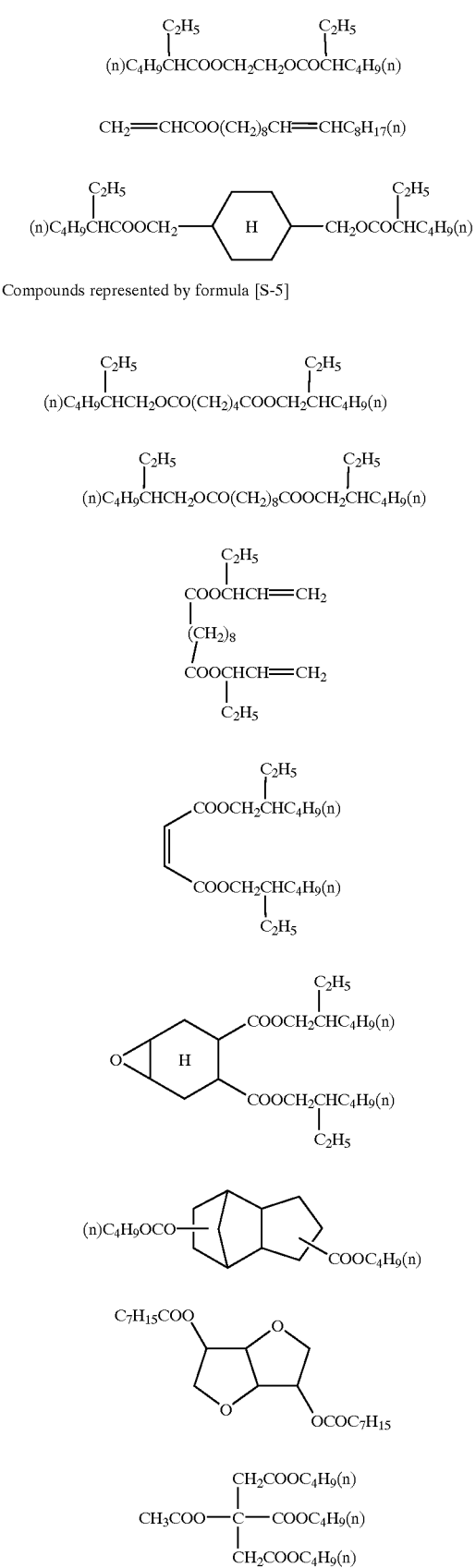
Compounds represented by formula [S-5]
-continued
Compounds represented by formula [S-6]
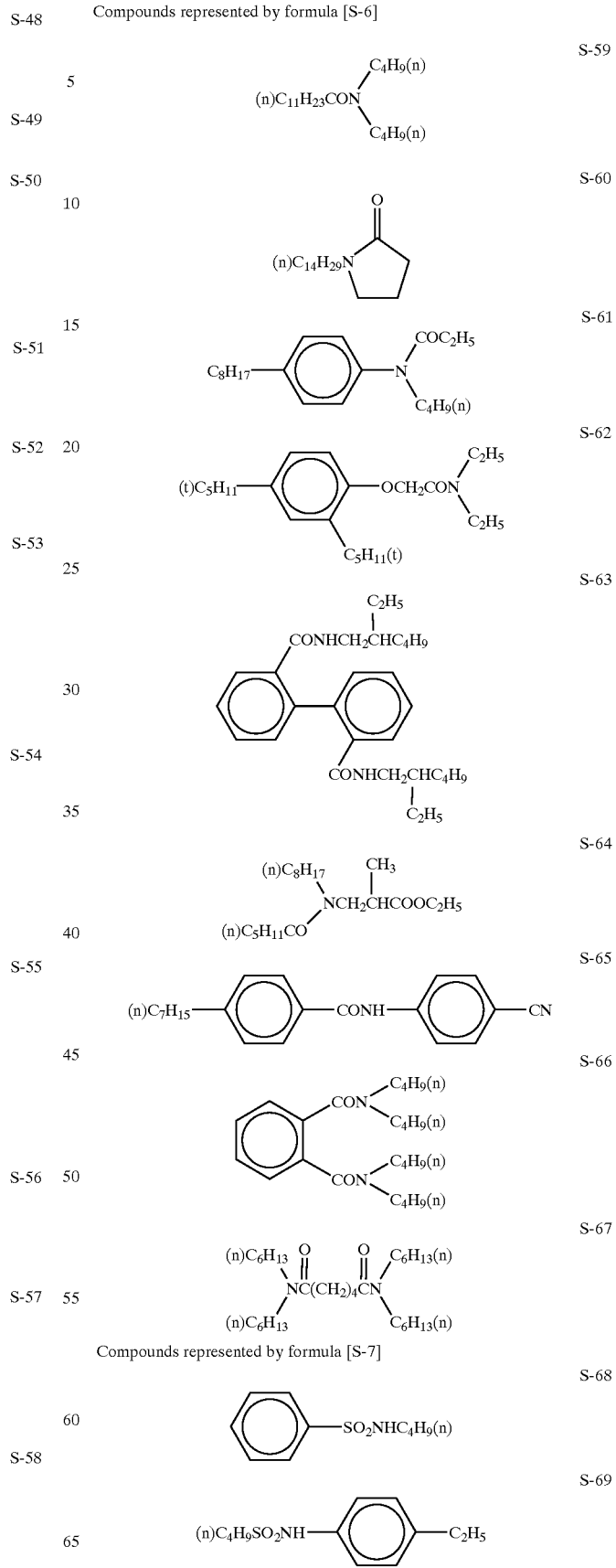
Compounds represented by formula [S-7]

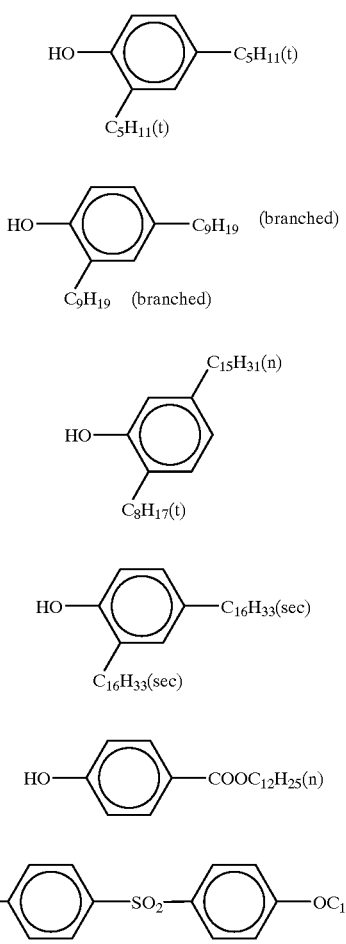

S-70

S-71

S-72

S-73

S-74

S-75

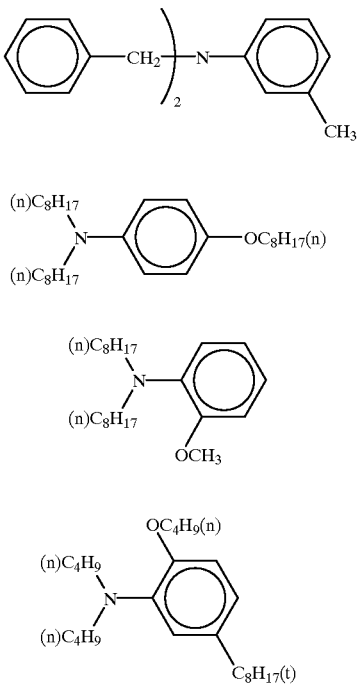

S-76

S-77

S-78

S-79

-continued

Compounds represented by formula [S-9]

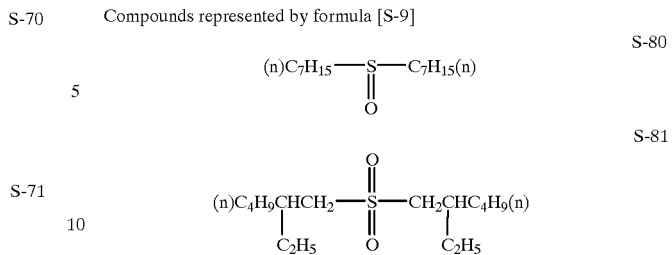

S-80

S-81

In the present invention, the hydrophobic high-boiling organic solvents may be used singly or in a combination thereof. For example, tricresyl phosphate may be used in combination with dibutyl phthalate, or trioctyl phosphate may be used in combination with di(2-ethylhexyl) sebacate.

Examples of hydrophobic high-boiling organic solvents other than those described above and/or methods of synthesizing these hydrophobic high-boiling organic solvents are described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, European Patent Nos. 276,319A, 286,253A, 289,820A, 309,158A, 309,159A, 309,160A, 509,311A and 510,576A, East German Patent Nos. 147,009, 157,147, 159,573 and 225,240A, British Patent No. 2,091,124A, JP-A 48-47335, JP-A 50-26530, JP-A 51-25133, JP-A 51-26036, JP-A 51-27921, JP-A 51-27922, JP-A 51-149028, JP-A 52-46816, JP-A 53-1520, JP-A 53-1521, JP-A 53-15127, JP-A 53-146622, JP-A 54-91325, JP-A 54-106228, JP-A 54-118246, JP-A 55-59464, JP-A 56-64333, JP-A 56-81836, JP-A 59-204041, JP-A 61-84641, JP-A 62-118345, JP-A 62-247364, JP-A 63-167357, JP-A 63-214744, JP-A 63-301941, JP-A 64-9452, JP-A 64-9454, JP-A 64-68745, JP-A 1-101543, JP-A 1-102454, JP-A 2-792, JP-A 2-4239, JP-A 2-43541, JP-A 4-29237, JP-A 4-30165, JP-A 4-232946, JP-A 4-346338, etc.

Now, production of the colored fine particle dispersion is described.

The colored fine particle dispersion of the present invention comprises colored fine particles containing at least an oil-soluble dye and the hydrophobic high-boiling organic solvent dispersed in an aqueous medium. Specifically, a method of co-emulsification dispersion of the oil-soluble dye and the hydrophobic high-boiling organic solvent (co-emulsification dispersion method) can be mentioned. The emulsification dispersion method is preferably a method of emulsifying an organic solvent phase containing the water-insoluble dye and the hydrophobic high-boiling organic solvent to form fine particles either by addition of water to said organic solvent phase or by addition of said organic solvent phase to water.

The emulsification dispersion unit used in the co-emulsification dispersion method may make use of any known units such as a simple stirrer, units in an impeller stirring system or an in-line stirring system, a colloid mill in a mill system, and units in an ultrasonic system, and in the present invention, a high-pressure emulsification dispersion unit is preferable, and in particular a high-pressure homogenizer is particularly preferable.

The detailed mechanism of the high-pressure homogenizer is described in U.S. Pat. No. 4,533,254 and JP-A 6-47264, and as commercial units, a Gaulin homogenizer (trade name, manufactured by A. P. V. Gaulin Inc.), Microfluidizer (trade name, manufactured by Microfluidex Inc.), Altimizer (trade name, manufactured by Sugino Machine Co., Ltd.), etc. can be exemplified.

A recent high-pressure homogenizer provided with a mechanism for fine pulverization in an ultrahigh-pressure jet stream as described in U.S. Pat. No. 5,720,551 is particularly effective for emulsification dispersion in the present invention.

The emulsification dispersion unit using the ultrahigh-pressure jet stream includes e.g. De BEE 2000 (trade name, manufactured by BEE INTERNATIONAL LTD.).

The pressure for emulsification dispersion by means of the ultrahigh-pressure emulsification dispersion unit is preferably 50 MPa or more (500 bar or more), more preferably 60 MPa or more (600 bar or more) and most preferably 180 MPa or more (1800 bar or more).

In the present invention, it is particularly preferable that two or more emulsification units are used in combination in a method wherein the materials are emulsified by a stirring emulsification unit and then passed through a high-pressure homogenizer. Further, it is also preferable that the materials are subjected to emulsification dispersion by these emulsification units, additives such as a wetting agent, a surfactant, etc. are added thereto, and then the ink for ink jet recording is passed again through the high-pressure homogenizer prior to introduction of the ink into a cartridge.

For emulsification dispersion when a low-boiling organic solvent is contained in the hydrophobic high-boiling organic solvent, it is desirable from the viewpoint of the stability, safety and hygiene of the emulsified product that the low-boiling organic solvent is substantially removed.

As the method of substantially removing the low-boiling organic solvent, various known methods such as an evaporation method, a vacuum evaporation method, an ultrafiltration method, etc. can be used depending on the type of the low-boiling organic solvent. The step of removal of the low-boiling organic solvent is conducted preferably as quickly as possible just after emulsification.

In the emulsification dispersion, various surfactants can be used. Preferable examples thereof include anionic surfactants such as fatty acid salts, alkyl sulfates, alkyl benzene sulfonates, alkyl naphthalene sulfonates, dialkyl sulfosuccinates, alkyl phosphates, naphthalene sulfonic acid-formalin condensates and polyoxyethylene alkyl sulfates; nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters and oxyethylene oxypropylene block copolymers; acetylene type polyoxyethylene oxide surfactant Surfynols (trade name, produced by Air Products & Chemicals Ltd.); amphoteric surfactants such as and amine oxide type surfactants; N,N-dimethyl-N-alkylamine oxide; and those described on pages 37 to 38 in JP-A 59-157,636 and in Research Disclosure No. 308119 (1989).

When the colored fine particles containing the oil-soluble dye and the hydrophobic high-boiling organic solvent are dispersed in an aqueous medium to form an aqueous ink by co-emulsification dispersion, it is particularly important to control the particle size.

To increase color purity and density upon formation of an image by ink jet, the average particle diameter of the colored fine particles in the colored fine particle dispersion is preferably reduced. Specifically, the volume average particle diameter of the colored fine particles is preferably 100 nm or less, more preferably 1 nm to 80 nm.

If there are coarse particles in the colored fine particles, printing performance may be lowered. For example, the coarse particles may clog head nozzles or form stains to prevent ink discharge or to cause uneven discharge, thus adversely affecting printing performance.

Accordingly, the ratio of coarse particles is preferably lower, and for preparation of the ink, it is preferable that the number of 5 $\mu$m or more particles is 10 or less and the number of 1 $\mu$m or more particles is 1000 or less per $\mu$L of the ink.

As the method of removing these coarse particles, a known centrifugation method, a precision filtration method, etc. can be used. These separation means can be used just after emulsification dispersion or just before charging an ink cartridge with the ink after addition of various additives such as a wetting agent, a surfactant, etc. to the emulsified dispersion. It is effective to use a mechanical emulsification unit in order to reduce the average particle diameter of the colored fine particles and to reduce the coarse particles.

The content of the hydrophobic high-boiling organic solvent in the colored fine particle dispersion of the present invention is not particularly limited, but from the viewpoint of the good stainability of the ink on a recording paper, the content of the hydrophobic high-boiling organic solvent in the colored fine particles is preferably 25% by weight or more.

From the viewpoint of keeping the good solubility of the oil-soluble dye, the hydrophobic high-boiling organic solvent is used in an amount of 30% by weight or more relative to the oil-soluble dye.

On the other hand, if the amount of the hydrophobic high-boiling organic solvent used is too high, the ratio of the oil phase becomes so high that a stable and fine dispersion is hardly achieved. From this viewpoint, the amount of the hydrophobic high-boiling organic solvent used is preferably 50 to 1500% by weight, more preferably 100 to 1000% by weight relative to the oil-soluble dye.

Now, the co-emulsification dispersion of the water-insoluble polymer is described.

For the colored fine particle dispersion of the present invention, a polymer may be added besides the oil-soluble dye and the hydrophobic high-boiling organic solvent at the time of co-emulsification dispersion, to form a colored fine particle dispersion containing the oil-soluble dye, the hydrophobic high-boiling organic solvent and the polymer.

The polymer may be a nonionic polymer or an ionic group-containing polymer.

The ionic group includes cationic groups such as tertiary amino groups and anionic groups such as those from carboxylic acid, sulfonic acid, etc. The ionic group-containing polymer includes e.g. vinyl polymers and condensation polymers (polyurethane, polyester, polyamide, polyurea and polycarbonate).

The method of co-emulsification dispersion of the nonionic polymer or the ionic group-containing polymer with the oil-soluble dye and the hydrophobic high-boiling organic solvent, as well as examples of the polymer, is described in detail in Japanese Patent Application Nos. 2000-203856 and 2000-203857.

In co-emulsification dispersion of the polymer, the dispersion time for achieving a fine particle dispersion tends to be longer with an increasing amount of the polymer added. Accordingly, it is advantageous for achieving a significant effect and improvement in the stability of the colored fine particle dispersion that as shown in the present invention, the water-insoluble polymer fine particles are first prepared and then added to the colored fine particle dispersion substantially not containing the polymer.

Now, the organic solvent is described.

The organic solvent other than the hydrophobic high-boiling organic solvent used in production of the colored fine particle dispersion is not particularly limited, and can be selected as necessary depending on the solubility of the oil-soluble dye, and examples thereof include ketone type solvents such as acetone, methyl ethyl ketone and diethyl ketone, alcohol type solvents such as methanol, ethanol, 2-propanol, 1-propanol, 1-butanol and tert-butanol, chlorine type solvents such as chloroform and methylene chloride, aromatic solvents such as benzene and toluene, ester type solvents such as ethyl acetate, butyl acetate and isopropyl acetate, ether type solvents such as diethyl ether, tetrahydrofuran and dioxane, and glycol ether type solvents such as ethylene glycol monomethyl ether and ethylene glycol dimethyl ether.

These organic solvents may be used singly or in a combination thereof. Depending on the solubility of the oil-soluble dye and the polymer, the solvent may be a mixed solvent with water.

The amount of the organic solvent used is not particularly limited insofar as the effect of the present invention is not impaired, but the amount thereof is preferably 2000 parts by weight or less, more preferably 100 to 1000 parts by weight, relative to 100 parts by weight of the oil-soluble dye.

If the amount of the organic solvent used is more than 2000 parts by weight, the cumbersome step of desolvation and concentration for removal of the organic solvent is essential, and allowances in compounding tend to be reduced.

If the solubility of the organic solvent in water is 10% or less or the vapor pressure of the organic solvent is higher than that of water, the organic solvent is preferably removed for stability of the colored fine particle dispersion.

The organic solvent can be removed at 10 to 100° C. under normal pressure to reduced pressure and preferably at 40 to 100° C. under normal pressure or at 10 to 50° C. under reduced pressure.

In the colored fine particle dispersion of the present invention, the colored fine particles are contained in an amount of preferably 1 to 45% by weight in the ink for ink jet recording, more preferably 2 to 30% by weight. Their content can be suitably regulated by dilution, evaporation, ultrafiltration, etc.

Water-Insoluble Ionic Group-Containing Polymer

The ink for ink jet recording according to the present invention includes an ionic group-containing water-insoluble polymer added to the colored fine particle dispersion. In this case, it is preferable that the water-insoluble polymer including an ionic group is converted by emulsification dispersion into a fine particle dispersion and added to the colored fine particle dispersion. The surface of the colored fine particle dispersion obtainable by the above-discribed emulsification process is coated by the fine particle dispersion of the water-insoluble ionic group-containing polymer.

Now, the water-insoluble polymer is described.

In the present invention, the water-insoluble ionic group-containing polymer refers to a polymer having an ionic group. The ionic group includes cationic groups such as tertiary amino groups and quaternary ammonium groups, and anionic groups in carboxylic acid, sulfonic acid and the like.

The ionic group-containing polymer includes e.g. vinyl polymers and condensation polymers (polyurethane, polyester, polyamide, polyurea and polycarbonate). The water-insoluble ionic group-containing polymer is preferably a water-dispersible (i.e. self-emulsifiable) polymer.

The ionic group in the ionic group-containing vinyl polymer includes a carboxyl group, sulfonic acid group, monosulfate group, -OPO(OH)$_2$, sulfinic acid group, and salts thereof (e.g., salts of alkali metals such as sodium and potassium), anionic groups such as ammonia, and ammonium salts such as dimethylamine, ethanolamine, diethanolamine, triethanolamine and trimethylamine).

Further, cationic groups such as a primary, secondary, or tertiary amine or salts thereof (e.g., salts of organic acids such as acetic acid, propionic acid, methanesulfonic acid, etc. and salts of inorganic acids such as hydrochloric acid, sulfuric acid, etc.) and quaternary ammonium salts.

Among these, the anionic groups are more preferable, and the carboxyl group is particularly preferable.

The carboxylic acid monomer includes e.g. acrylic acid, methacrylic acid, itaconic acid, maleic acid, fumaric acid, citraconic acid, crotonic acid, monoalkyl itaconates (e.g., monomethyl itaconate, monoethyl itaconate, monobutyl itaconate, etc.), and monoalkyl maleates (e.g., monomethyl maleate, monoethyl maleate, monobutyl maleate, etc.).

The sulfonic acid monomer includes e.g. styrene sulfonic acid, vinylsulfonic acid, acryloyloxyalkane sulfonic acid (e.g., acryloyloxyethane sulfonic acid, acryloyloxypropane sulfonic acid, etc.), methacryloyloxyalkane sulfonic acid (e.g., methacryloyloxyethane sulfonic acid, methacryloyloxypropane sulfonic acid, etc.), acrylamide alkane sulfonic acid (e.g., 2-acrylamide-2-methylethane sulfonic acid, 2-acrylamide-2-methylpropane sulfonic acid, 2-acrylamide-2-methylbutane sulfonic acid, etc.), and methacrylamide alkane sulfonic acid (e.g., 2-methacrylamide-2-methylethane sulfonic acid, 2-methacrylamide-2-methylpropane sulfonic acid, etc.).

The phosphoric acid monomer includes e.g. monoacryloyloxyethyl phosphate, monomethacryloyloxyethyl phosphate, etc.

Among these monomers, acrylic acid, methacrylic acid, styrene sulfonic acid, vinyl sulfonic acid, acrylamide alkane sulfonic acid, and methacrylamide alkane sulfonic acid are preferable, among which acrylic acid, methacrylic acid, styrene sulfonic acid, 2-acrylamide-2-methylpropane sulfonic acid and 2-acrylamide-2-methylbutane sulfonic acid are more preferable.

The cationic group-containing monomer described above includes e.g. monomers having a tertiary amino group, such as dialkylaminoethyl methacrylate and dialkylaminoethyl acrylate and monomers having a quaternary ammonium group, such as N-2-acryloyloxyethyl-N,N,N-trimethyl ammonium chloride, N-vinylbenzyl-N,N,N-triethyl ammonium chloride, etc.

The ionic group-containing monomer may be copolymerized with a monomer having no ionic group, and the monomer having no ionic group includes the following monomers. That is, mention is made of acrylates such as methyl acrylate, ethyl acrylate, n-propyl acrylate, isopropyl acrylate, n-butyl acrylate, isobutyl acrylate, sec-butyl acrylate, tert-butyl acrylate, hexyl acrylate, 2-ethylhexyl acrylate, tert-octyl acrylate, 2-chloroethyl acrylate, 2-bromoethyl acrylate, 4-chlorobutyl acrylate, 2-acetoxyethyl acrylate, benzyl acrylate, cyclohexyl acrylate, furfuryl acrylate, tetrahydrofurfuryl acrylate, phenyl acrylate, 2-hydroxyethyl acrylate, 2,2-dimethyl-3-hydroxypropyl acrylate, 2-methoxyethyl acrylate, 3-methoxybutyl acrylate, 2-ethoxyethyl acrylate, 2-butoxyethyl acrylate, 2-(2-methoxyethoxy)ethyl acrylate, glycidyl acrylate, 1-bromo-2-methoxyethyl acrylate, 2,2,2-tetrafluoroethyl acrylate, 1H,1H,2H,2H-perfluorodecyl acrylate, diphenyl-2-acryloyloxyethyl phosphate, diphenyl- 2-methacryloyloxyethyl phosphate, dibutyl-2-acryloyloxyethyl phosphate, etc.

Mention is made of methacrylates such as methyl methacrylate, ethyl methacrylate, n-propyl methacrylate, isopropyl methacrylate, n-butyl methacrylate, isobutyl methacrylate, sec-butyl methacrylate, tert-butyl methacrylate, cyclohexyl methacrylate, benzyl methacrylate, 2-ethylhexyl methacrylate, lauryl methacrylate, stearyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-ethoxyethyl methacrylate, 2-butoxyethyl methacrylate, 2-(2-methoxyethoxy)ethyl methacrylate, 2-(2-ethoxyethoxy)ethyl methacrylate, 2-acetoxyethyl methacrylate, 2-acetoacetoxyethyl methacrylate, allyl methacrylate, glycidyl methacrylate, 2,2,2-tetrafluoroethyl methacrylate, 1H,1H,2H,2H-perfluorodecyl methacrylate, dioctyl-2-methacryloyloxyethyl phosphate, etc.

Mention is made of vinyl esters such as vinyl acetate, vinyl propionate, vinyl butyrate, vinyl caproate, vinyl chloroacetate, vinyl methoxy acetate, vinyl phenyl acetate, vinyl benzoate, vinyl salicylate, etc.

Mention is made of acrylamides such as acrylamide, methyl acrylamide, ethyl acrylamide, isopropyl acrylamide, n-butyl acrylamide, tert-butyl acrylamide, tert-octyl acrylamide, cyclohexyl acrylamide, benzyl acrylamide, hydroxymethyl acrylamide, methoxymethyl acrylamide, butoxymethyl acrylamide, methoxyethyl acrylamide, phenyl acrylamide, dimethyl acrylamide, diethyl acrylamide, β-cyanoethyl acrylamide, N-(2-acetoacetoxyethyl) acrylamide, diacetone acrylamide, etc.

Mention is made of methacrylamides such as methacrylamide, methyl methacrylamide, ethyl methacrylamide, propyl methacrylamide, n-butyl methacrylamide, tert-butyl methacrylamide, cyclohexyl methacrylamide, benzyl methacrylamide, hydroxymethyl methacrylamide, methoxyethyl methacrylamide, phenyl methacrylamide, β-cyanoethyl methacrylamide, N-(2-acetoacetoxyethyl) methacrylamide, etc.

Mention is made of olefins such as dicyclopentadiene, ethylene, propylene, 1-butene, 1-pentene, vinyl chloride, vinylidene chloride, isoprene, chloroprene, butadiene and 2,3-dimethyl butadiene, as well as styrene and analogues thereof such as methyl styrene, dimethyl styrene, trimethyl styrene, ethyl styrene, chloromethyl styrene, methoxystyrene, actoxystyrene, chlorostyrene, dichlorostyrene, bromostyrene and vinyl methyl benzoate.

Mention is made of vinyl ethers such as methyl vinyl ether, butyl vinyl ether, hexyl vinyl ether, and methoxyethyl vinyl ether.

Mention is made of other monomers such as butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyl oxazolidone, N-vinyl pyrrolidone, methylene malononitrile, vinylidene, etc.

It is also preferable that the ionic group-containing polymer is copolymerized with a monomer containing a nonionic dispersible group as exemplified below, and the monomer containing a nonionic dispersible group includes e.g. esters of polyethylene glycol monoalkyl ether and carboxylic acid monomer, esters of polyethylene glycol monoalkyl ether and sulfonic acid monomer, esters of polyethylene glycol monoalkyl ether and phosphoric acid monomer, vinyl group-containing urethanes formed from a polyethylene glycol monoalkyl ether and isocyanate group-containing monomer, and macro-monomers having polyvinyl alcohol structures.

The number of repeating ethylene oxy moieties in the polyethylene glycol monoalkyl ether is preferably 8 to 50, more preferably 10 to 30.

The number of carbon atoms in the alkyl group in the polyethylene glycol monoalkyl ether is preferably 1 to 20, more preferably 1 to 12.

Now, the ionic group-containing condensation polymer is described.

The polyurethane applicable to the ionic group-containing polymer includes e.g. polyurethanes synthesized by polyaddition reaction of various combinations of the following diol compounds and diisocyanate compounds.

Examples of the diol compounds include non-dissociable diols such as ethylene glycol, 1,2-propanediol, 1,3-propanediol, 1,3-butanediol, 2,3-butanediol, 2,2-dimethyl-1,3-propanediol, 1,4-pentanediol, 2,4-pentanediol, 3,3-dimethyl-1,2-butanediol, 2-ethyl-2-methyl-1,3-propanediol, 1,6-hexanediol, 2,5-hexanediol, 2-methyl-2,4-pentanediol, 2,2-diethyl-1,3-propanediol, 2,4-dimethyl-2,4-pentanediol, 2-methyl-2-propyl-1,3-propanediol, 2,5-dimethyl-2,5-hexanediol, 2-ethyl-1,3-hexanediol, 1,2-octanediol, 2,2,4-trimethyl-1,3-pentanediol, 1,4-cyclohexane dimethanol, diethylene glycol, triethylene glycol, dipropylene glycol, tripropylene glycol, polyethylene glycol (average molecular weight=200, 300, 400, 600, 1000, 1500, or 4000), polypropylene glycol (average molecular weight=200, 400, or 1000), polyester polyol, 4,4'-dihydroxydiphenyl-2,2-propane, 4,4'-dihydroxyphenyl sulfone, etc.

Examples of the diisocyanate compounds include ethylene diisocyanate, isophorone diisocyanate, hexamethylene diisocyanate, 1,4-cyclohexane diisocyanate, 2,4-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenyl methane diisocyanate, 3,3'-dimethyl biphenylene diisocyanate, dicyclohexyl methane diisocyanate, methylenebis(4-cyclohexyl isocyanate), etc.

The ionic group-containing polyurethane can be obtained by using e.g. an ionic group-containing diol at the time of synthesis of polyurethane. In this case, the ionic group is introduced as a substituent group from a polymer main chain into polyurethane. Diols containing ionic groups, particularly anionic groups, include, but are not limited to, 2,2-bis(hydroxymethyl) propionic acid, 2,2-bis(hydroxymethyl) butanoic acid, 2,5,6-trimethoxy-3,4-dihydroxyhexanoic acid, 2,3-dihydroxy-4,5-dimethoxypentanoic acid and 3,5-di(2-hydroxy) ethyloxycarbonyl benzene sulfonic acid as well as salts thereof.

Ionic groups in the ionic group-containing polyurethane include e.g. anionic groups such as a carboxyl group, sulfonic acid group, monosulfate group, —OPO(OH)$_2$, sulfinic acid group, and salts thereof (e.g., salts of alkali metals such as sodium and potassium, ammonia, and ammonium salts such as dimethylamine, ethanolamine, diethanolamine, triethanolamine and trimethylamine) or cationic groups such as primary, secondary and tertiary amines and quaternary ammonium salts, among which the anionic groups are preferable and the carboxyl group is particularly preferable.

The polyester applicable to the ionic group-containing polymer includes e.g. polyesters synthesized by condensation reaction of various combinations of the following diol compounds and dicarboxylic acid compounds.

Examples of the dicarboxylic acid compounds include oxalic acid, malonic acid, succinic acid, glutaric acid, dimethyl malonic acid, adipic acid, pimelic acid, α,α-dimethyl succinic acid, acetone dicarboxylic acid, sebacic acid, 1,9-nonane dicarboxylic acid, fumaric acid, maleic acid, itaconic acid, citraconic acid, phthalic acid, isophthalic acid, terephthalic acid, 2-butyl terephthalic acid, tetrachloroterephthalic acid, acetylene dicarboxylic acid, poly(ethylene terephthalate) dicarboxylic acid, 1,2-cyclohexane dicarboxylic acid, 1,4-cyclohexane dicarboxylic acid, ω-poly (ethylene oxide) dicarboxylic acid, and p-xylylene dicarboxylic acid.

For polycondensation reaction with the diol compound, these compounds may be used in the form of alkyl dicarboxylate (e.g., dimethyl dicarboxylate), dicarboxylic acid chloride, or acid anhydride such as maleic anhydride, succinic anhydride and phthalic anhydride.

In addition to carboxylic acids, the ionic group-containing polyester can be synthesized by dicarboxylic acid compounds having ionic groups e.g. anionic groups such as a sulfonic acid group, monosulfate group, —OPO(OH)$_2$, sulfinic acid group, and salts thereof (e.g., salts of alkali metals such as sodium and potassium, ammonia, and ammonium salts such as dimethylamine, ethanolamine, diethanolamine, triethanolamine and trimethylamine) and cationic groups such as tertiary amines or salts thereof (e.g., salts of organic acids such as acetic acid, propionic acid, methanesulfonic acid, etc. and salts of inorganic acids such as hydrochloric acid, sulfuric acid, etc.) and quaternary ammonium salts.

An ionic group other than carboxylic acid in the ionic group-containing polyester is preferably an anionic group, particularly preferably a sulfonic acid group.

Preferable examples of starting materials of the sulfonic acid group-containing dicarboxylic acid and diol include sulfophthalic acids (3-sulfophthalic acid, 4-sulfophthalic acid, 4-sulfoisophthalic acid, 5-sulfoiosophthalic acid, 2-sulfoterephthalic acid), sulfosuccinic acid, sulfonaphthalene dicarboxylic acids (4-sulfo-1,8-naphthalene dicarboxylic acid, 7-sulfo-1,5-naphthalene dicarboxylic acid, etc.) and 3,5-di(2-hydroxy)ethyloxycarbonyl benzene sulfonic acid as well as salts thereof.

As the diol compound, a compound selected from the diols described above for the polyurethane can be used.

Typical methods of synthesizing the polyester described above include a method of condensation reaction of the diol compound with the dicarboxylic acid or a derivative thereof, a method of condensation of hydroxycarboxylic acids (e.g., 12-hydroxystearic acid), a method of ring-opening polymerization of a cyclic ether with a lactone (detailed in Lecture 6 on Polymerization Reaction, Ring-Opening Polymerization (I) (in Japanese), authored by Takeo Sanshi (kagaku Dojin, 1971).

Polyamides applicable to the ionic group-containing polymer include polyamides synthesized by e.g. polycondensation of various combinations of the following diamine compound and dicarboxylic acid compound, polyamides synthesized by polycondensation of aminocarboxylic acid compounds, and polyamides synthesized by ring-opening polymerization of monomers such as lactams.

The diamine compound includes e.g. ethylenediamine, 1,3-propanediamine, 1,2-propanediamine, hexamethylenediamine, octamethylenediamine, o-phenylenediamine, m-phenylenediamine, p-phenylenediamine, piperazine, 2,5-dimethyl piperazine, 4,4'-diaminodiphenyl ether, 3,3'-diaminodiphenyl sulfone, xylylenediamine, etc., and the aminocarboxylic acid compound includes e.g. glycine, alanine, phenylalanine, ω-aminohexanoic acid, ω-aminodecanoic acid, ω-aminodecanoic acid and anthranilic acid.

The monomer usable in the ring-opening polymerization includes ε-caprolactam, azetidinone and pyrrolidone.

As the dicarboxylic acid compound, the same dicarboxylic acid compound as described above for the polyester can be used.

Polyureas applicable to the ionic group-containing polymer include polyureas synthesized by e.g. polyaddition reaction of various combinations of the following diamine compound and diisocyanate compound, and polyureas synthesized by ammonia-eliminating reaction of the diamine compound and urea.

As the diamine compound, the same diamine compounds as exemplified above for the polyamide can be used.

As the diisocyanate compound, the same diisocyanate compounds as exemplified above for the polyurethane can be used.

Polycarbonates applicable to the ionic group-containing polymer include polycarbonates synthesized by reacting e.g. the following diol compounds with phosgene or a carbonate derivative (e.g., an aromatic ester such as diphenyl carbonate, etc.).

As the diol compound, the same diol compounds as exemplified above for the polyurethane can be used.

The ionic group can be introduced by various methods into each of the above polymers. For example, when polyurethane is used, ionic group-containing diol can be used to introduce the ionic group as a substituent group from a polymer main chain at the time of synthesis of polyurethane. When polyester is used, the ionic group can be introduced as an unreacted terminal of the dicarboxylic acid into the terminal of the polymer. Further, after polymerization of each of the above polymers, the ionic group can be introduced by reaction with an acid hydride (e.g., maleic anhydride), etc. into a reactive group such as a hydroxy group, amino group, etc.

For the ionic group-containing polymer, the vinyl polymer and the condensation polymer, one kind of essential constitutional material may be used for each of them, or depending on various purposes (e.g. regulation of the glass transition temperature (Tg) of the polymer, solubility thereof, compatibility thereof with dyes, and stability of the dispersion), two or more kinds of constitutional materials may be used in combination in an arbitrary ratio for each of them.

The ionic group-containing polymer is preferably a polymer containing a carboxyl group and/or sulfonic acid group as the ionic group, particularly preferably a polymer containing a carboxyl group as the ionic group.

The content of the ionic group in the ionic group-containing polymer is preferably 0.1 to 3.0 mmol/g, more preferably 0.2 to 2.0 mmol/g. When the content of the ionic group is too high or too low, the self-emulsifiablity of the ionic group-containing polymer is decreased and the stabilizing effect of the oil-soluble dye on the colored fine particle dispersion is reduced.

Further, the ionic group may be alkali metals (e.g., sodium, potassium, etc.) or ammonium ion salts as the anionic group described above, or salts of organic acids such as acetic acid, propionic acid, methane sulfonic acid and inorganic acids such as hydrochloric acid, sulfuric acid, etc. as the cationic group (tertiary amine) described above.

The ionic group-containing polymer is particularly preferably vinyl polymer, polyurethane or polyester, more preferably vinyl polymer, for impartment of good dispersion stability and easy introduction of the ionic group.

Examples (P-1) to (P-54) of the ionic group-containing vinyl polymer are shown below. The ratio in the parentheses means weight ratio. These examples are not intended to limit the present invention.

P-1) tert-Butyl methacrylamide-methyl methacrylate-acrylic acid copolymer (60:30:10)
P-2) n-Butyl acrylate-acrylic acid copolymer (95:5)
P-3) Methyl methacrylate-isobutyl methacrylate-acrylic acid copolymer (60:30:10)
P-4) sec-Butyl acrylate-acrylic acid copolymer (90:10)
P-5) Ethyl acrylate-acrylic acid (95:5)
P-6) Isopropyl acrylate-acrylic acid copolymer (90:10)
P-7) n-Butyl methacrylate-2-hydroxyethyl methacrylate-acrylic acid copolymer (85:5:10)
P-8) Isobutyl methacrylate-tetrahydrofurfuryl acrylate-acrylic acid copolymer (60:30:10)
P-9) n-Butyl methacrylate-1H,1H,2H,2H-perfluorodecyl acrylate-acrylic acid copolymer (75:20:5)
P-10) Methyl methacrylate-n-butyl acrylate-acrylic acid copolymer (47.5:47.5:5)
P-11) 2-Ethylhexyl methacrylate-methyl acrylate-acrylic acid copolymer (40:55:5)
P-12) 3-Methoxybutyl methacrylate-styrene-acrylic acid copolymer (35:50:15)
P-13) Cyclohexyl methacrylate-allyl methacrylate-acrylic acid copolymer (70:20:10)
P-14) Isopropyl methacrylate-2-butoxyethyl methacrylate-acrylic acid copolymer (80:15:5)
P-15) Ethyl acrylate-phenyl methacrylate-acrylic acid copolymer (82:15:3)
P-16) Methyl methacrylate-2-ethylhexyl acrylate-acrylic acid copolymer (47.5:47.5:5)
P-17) Isobutyl methacrylate-polyethylene glycol monomethyl ether (number of repeating ethylene oxy chains: 23) methacrylate-acyclic acid copolymer (70:25:5)
P-18) Isobutyl methacrylate-dipropylene glycol monomethacrylate-acrylic acid copolymer (85:10:5)
P-19) Isobutyl methacrylate-polyethylene glycol monomethyl ether (number of repeating ethylene oxy chains: 9) methacrylate-acrylic acid copolymer (85:10:5)
P-20) Isobutyl acrylate-methoxystyrene-acrylic acid copolymer (75:15:10)
P-21) tert-Butyl acrylate-methacrylic acid copolymer (88:12)
P-22) Hexyl acrylate-styrene-methacrylic acid copolymer (80:10:10)
P-23) 2,2,2-Tetrafluoroethyl methacrylate-methyl methacrylate-methacrylic acid copolymer (35:60:5)
P-24) Ethyl methacrylate-methacrylic acid copolymer (95:5)
P-25) Ethyl methacrylate-2-methoxyethyl methacrylate-methacrylic acid copolymer (70:15:15)
P-26) n-Butyl methacrylate-methacrylic acid copolymer (95:5)
P-27) Vinyl acetate-methacrylic acid copolymer (85:15)
P-28) n-Butyl methacrylate-acrylamide-methacrylic acid copolymer (80:15:5)
P-29) tert-Octyl acrylamide-propyl methacrylate-methacrylic acid copolymer (20:65:15)
P-30) n-Butyl methacrylate-butoxymethyl acrylamide-methacrylic acid copolymer (80:5:15)
P-31) n-Butyl methacrylate-diphenyl-2-methacryloyloxyethyl phosphate-methacrylic acid copolymer (50:40:10)
P-32) Isobutyl methacrylate-dimethyl acrylamide-methacrylic acid copolymer (80:15:5)
P-33) n-Butyl methacrylate-phenyl acrylamide-methacrylic acid copolymer (70:15:15)
P-34) n-Butyl methacrylate-methoxyethyl methacrylamide-methacrylic acid copolymer (70:15:15)
P-35) Isobutyl methacrylate-2-(2-methoxyethoxy)ethyl methacrylate-methacrylic acid copolymer (50:35:15)
P-36) Ethyl methacrylate-2-carboxyethyl methacrylate copolymer (90:10)
P-37) n-Butyl methacrylate-styrene sulfonic acid copolymer (90:10)
P-38) Ethyl methacrylate-styrene sulfonic acid copolymer (90:10)
P-39) n-Butyl acrylate-styrene-styrene sulfonic acid copolymer (60:35:5)
P-40) n-Butyl acrylate-1H,1H,2H,2H-perfluorodecyl methacrylate-styrene sulfonic acid copolymer (80:10:10)
P-41) n-Butyl methacrylate-2-acrylamide-2-methylethane sulfonic acid copolymer (90:10)
P-42) Isobutyl acrylate-n-butyl methacrylate-2-acrylamide-2-methylethane sulfonic acid copolymer (70:20:10)
P-43) n-Butyl methacrylate-2-acrylamide-2-methylpropane sulfonic acid copolymer (90:10)
P-44) Ethyl methacrylate-2-acrylamide-2-methylpropane sulfonic acid copolymer (90:10)
P-45) Ethyl acrylate-tert-butyl methacrylate-2-acrylamide-2-methylpropane sulfonic acid copolymer (60:35:5)
P-46) tert-Butyl acrylate-tetrahydrofurfuryl acrylate-2-acrylamide-2-methylpropane sulfonic acid copolymer (50:40:10)
P-47) tert-Butyl acrylate-polyethylene glycol monomethyl ether (number of repeating ethylene oxy chains: 23) methacrylate-2-acrylamide-2-methylpropane sulfonic acid copolymer (70:27:3)
P-48) Isobutyl acrylate-N-vinyl pyrrolidone-2-acrylamide-2-methylpropane sulfonic acid copolymer (65:30:5)
P-49) Isobutyl methacrylate-sodium 2-acrylamide-2-methylpropane sulfonate copolymer (88:12)
P-50) n-Butyl methacrylate-2-acrylamide-2-methylpropane sulfonic acid copolymer (90:10)
P-51) n-Butyl acrylate-tert-butyl methacrylate-vinyl sulfonic acid copolymer (60:30:10)
P-52) Ethyl acrylate-tert-butyl methacrylate-vinyl sulfonic acid copolymer (60:30:10)
P-53) Ethyl methacrylate-2-acrylamide-2-methylbutane sulfonic acid copolymer (90:10)
P-54) n-Butyl methacrylate-sodium 2-acrylamide-2-methylbutane sulfonate copolymer (88:12)

Examples (P-55) to (P-74) of the condensation polymers among the ionic group-containing polymers described above are shown below, but these examples are not intended to limit the present invention.

Every acidic group in each polymer is shown in a non-dissociated form. Regardless of starting materials, all components in those polymers such as polyester, polyamide, etc. formed by condensation reaction are shown the form of dicarboxylic acid, diol, diamine, dihydroxycarboxylic acid and aminocarboxylic acid. The ratio in the parentheses shows the molar ratio (%) of each component.

P-55) 4,4'-Diphenyl methane diisocyanate/hexamethylene diisocyanate/tetraethylene glycol/ethylene glycol/2,2-bis (hydroxymethyl) propionic acid (40/10/20/20/10)
P-56) 4,4'-Diphenyl methane diisocyanate/hexamethylene diisocyanate/butanediol/polyethylene glycol (Mw=400)/ 2,2-bis(hydroxymethyl) propionic acid (40/10/20/10/20)
P-57) 1,5-Naphthylene diisocyanate/butane diol/4,4'-dihydroxy-diphenyl-2,2-propane/polypropylene glycol (Mw=400)/2,2-bis(hydroxymethyl)propionic acid (50/20/5/10/15)

P-58) 1,5-Naphthylene diisocyanate/hexamethylene diisocyanate/2,5-bis(hydroxymethyl)butanoic acid/polybutylene oxide (Mw=500) (35/15/25/25)

P-59) Isophorone diisocyanate/diethylene glycol/neopentyl glycol/2,2-bis(hydroxymethyl) propionic acid (50/20/20/10)

P-60) Toluene diisocyanate/2,2-bis(hydroxymethyl) butanoic acid/polyethylene glycol (Mw=1000)/cyclohexane dimethanol (50/10/10/30)

P-61) Diphenyl methane diisocyanate/hexamethylene diisocyanate/tetraethylene glycol/butanediol/3,5-di(2-hydroxy) ethyloxycarbonylbenzene sulfonic acid (40/10/10/33/7)

P-62) Diphenyl methane diisocyanate/hexamethylene diisocyanate/butanediol/ethylene glycol/2,2-bis (hydroxymethyl) butanoic acid/3,5-di(2-hydroxy) ethyloxycarbonylbenzene sulfonic acid (40/10/20/15/10/5)

P-63) Terephthalic acid/isophthalic acid/5-sulfoisophthalic acid/ethylene glycol/neopentyl glycol (24/24/2/25/25)

P-64) Terephthalic acid/isophthalic acid/5-sulfoisophthalic acid/cyclohexane dimethanol/1,4-butanediol/ethylene glycol (22/22/6/25/15/10)

P-65) Isophthalic acid/5-sulfoisophthalic acid/cyclohexane dimethanol/ethylene glycol (40/10/40/10)

P-66) Cyclohexane dicarboxylic acid/isophthalic acid/3,5-di(2-hydroxy) ethyloxycarbonylbenzene sulfonic acid/cyclohexane dimethanol/ethylene glycol (30/20/5/25/20)

P-67) 11-Aminodecanoic acid (100)

P-68) 12-Aminododecanoic acid (100)

P-69) A reaction product of poly(12-aminododecanoic acid) and maleic anhydride

P-70) 11-Aminodecanoic acid/7-aminoheptanoic acid (50/50)

P-71) Hexamethylene diamine/adipic acid (50/50)

P-72) N,N-dimethyl ethylene diamine/adipic acid/cyclohexane dicarboxylic acid (50/20/30)

P-73) Toluene diisocyanate/hexamethylene diamine/2,2-bis (hydroxymethyl) propionic acid (50/40/10)

P-74) 11-Aminodecanoic acid/hexamethylene diamine/urea (33/33/33)

For synthesis of the ionic group-containing condensation polymers described above, it is possible to use known methods described in "Polymer Experiment (Volume 5) Polycondensation and Polyaddition (in Japanese) (edited by Amane Kamihara and published by Kyoritz Shuppan Co., Ltd. (1980)", "Polyester Resin Handbook (in Japanese) (edited by Eiichiro Takiyama and published by The Nikkan Kogyo Shimbum Ltd. (1988))", "Polyurethane Resin Handbook (in Japanese) (edited by Keiji Iwata and published by The Nikkan Kogyo Shimbum Ltd. (1987))", "Experimental Methods in Polymer Synthesis (coauthored by Takayuki Ohzu & Masaetsu Kinoshita and published by Kagaku Dojin (1972))", JP-B 33-1141, JP-B 37-7641, JP-B 39-5989, JP-B 40-27349, JP-B 42-5118, JP-B 42-24194, JP-B 45-10957, JP-B 48-25435, JP-B 49-36942, JP-B 52-81344, JP-A 56-88454, JP-A 6-340835, etc.

The molecular weight (Mw) of the ionic group-containing polymer is usually 1,000 to 200,000, preferably 2,000 to 50,000. If the molecular weight is less than 1,000, the stabilizing effect of the colored fine particle dispersion tends to be hardly achieved, while if the molecular weight is greater than 200,000, the addition thereof into the colored fine particle dispersion tends to be difficult owing to difficult formation of an aqueous polymer fine particle dispersion.

(II) Method of Manufacturing the Ink for Ink Jet Recording Addition of the Water-insoluble Ionic Group-containing Polymer to the Colored Fine Particle Dispersion The ink for ink jet recording according to the present invention is produced by adding the water-insoluble ionic group-containing polymer to the colored fine particle dispersion.

In the present invention, the method of adding the water-insoluble polymer to the colored fine particle dispersion is not particularly limited, and the polymer may be added in a powdery form or as a solution in an organic solvent or as an aqueous dispersion as described above.

It is particularly preferable for the stabilizing effect of the colored fine particle dispersion that the water-insoluble polymer is formed by emulsification dispersion into a fine particle dispersion, and this fine particle dispersion is mixed with the colored fine particle dispersion.

That is, the method of manufacturing the ink for ink jet recording according to the present invention preferably features the step of allowing colored fine particles containing at least a hydrophobic high-boiling organic solvent having a boiling point of 150° C. or more and an oil-soluble dye to be dispersed in an aqueous medium to prepare a colored fine particle dispersion and the step of mixing a water-insoluble polymer including an ionic group with the colored fine particle dispersion, and it is particularly preferable in the step of mixing a water-insoluble ionic group-containing polymer with the colored fine particle dispersion that a fine particle dispersion prepared by emulsification dispersion of a water-insoluble ionic group-containing polymer is mixed with the colored fine particle dispersion.

The emulsification dispersion method is preferably a method of emulsifying an organic solvent containing the water-insoluble ionic group-containing polymer to form fine particles either by addition of water to said organic solvent solution or by addition of said organic solvent solution to water.

The emulsification dispersion unit used in the co-emulsification dispersion method may make use of any known units such as a simple stirrer, units in an impeller stirring system or an in-line stirring system, a colloid mill in a mill system, and units in an ultrasonic system, and a high-pressure homogenizer is particularly preferably used.

The detailed mechanism of the high-pressure homogenizer is described in U.S. Pat. No. 4,533,254 and JP-A 6-47264, and as commercial units, a Gaulin homogenizer (trade name, manufactured by A. P. V. Gaulin Inc.), Microfluidizer (trade name, manufactured by Microfluidex Inc.), Altimizer (trade name, manufactured by Sugino Machine Co., Ltd.), etc. can be exemplified.

A recent high-pressure homogenizer provided with a mechanism for fine pulverization in an ultrahigh-pressure jet stream as described in U.S. Pat. No. 5,720,551 is particularly effective for emulsification dispersion in the present invention.

The emulsification dispersion unit using the ultrahigh-pressure jet stream includes e.g. De BEE 2000 (trade name, manufactured by BEE International Ltd.).

The pressure for emulsification dispersion by means of the high-pressure emulsification dispersion unit is preferably 50 MPa or more (500 bar or more), more preferably 60 MPa or more (600 bar or more) and most preferably 180 MPa or more (1800 bar or more).

In the present invention, it is particularly preferable that two or more emulsification units are used in combination in a method wherein the materials are emulsified by a stirring emulsification unit and then passed through a high-pressure homogenizer.

For emulsification dispersion when a low-boiling organic solvent is contained in the water-insoluble polymer including an ionic group, it is preferable from the viewpoint of the stability, safety and hygiene of the emulsified product that the low-boiling organic solvent is substantially removed.

As the method of substantially removing the low-boiling organic solvent, various known methods such as an evaporation method, a vacuum evaporation method, an ultrafiltration method, etc. can be used depending on the type of the low-boiling organic solvent. The step of removal of the low-boiling organic solvent is conducted preferably as quickly as possible just after emulsification.

In the emulsification dispersion, various surfactants can be used. Preferable examples thereof include anionic surfactants such as fatty acid salts, alkyl sulfates, alkyl benzene sulfonates, alkyl naphthalene sulfonates, dialkyl sulfosuccinates, alkyl phosphates, naphthalene sulfonic acid-formalin condensates and polyoxyethylene alkyl sulfates, nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters and oxyethylene oxypropylene block copolymers, acetylene type polyoxyethylene oxide surfactants such as Surfynols (trade name, produced by Air Products & Chemicals Ltd.), amphoteric surfactants such as amine oxide type surfactants, N,N-dimethyl-N-alkylamine oxide, and those described on pages 37 to 38 in JP-A 59-157,636 and Research Disclosure No. 308119 (1989).

The particle diameter of the water-insoluble ionic group-containing polymer obtained by emulsification dispersion is not particularly limited, but those having a smaller average particle diameter are preferable, and specifically, the volume average particle size is preferably 300 nm or less, more preferably 1 nm to 150 nm.

The amount of the water-insoluble ionic group-containing polymer added is not particularly limited, but the polymer is preferably contained in an amount of preferably 0.1 to 30 weight %, more preferably 1 to 20 weight % in the ink for ink jet recording. The content can be suitably regulated depending on the type and amount of the colored fine particle dispersion and other components.

Other Components

The ink for ink jet recording according to the present invention comprises the water-insoluble ionic group-containing polymer added to the colored fine particle dispersion of the present invention. The ink for ink jet recording preferably comprises an oil-soluble dye, containing the compounds represented by the formulae (I), (M-I), (C-I), or compounds derived from the compounds represented by the formulae (I), (M-I), or (C-I), in an amount of 0.1 to 20% by weight in the ink for ink jet recording. Further, the ink for ink jet recording may comprise other components selected suitably as necessary.

The other components may be contained insofar as the effect of the present invention is not impaired, and the other components include known additives such as drying-preventing agents, penetration promoters, UV absorbers, antioxidants, mildew-proofing agents, pH regulators, surface tension regulators, defoaming agents, viscosity regulators, dispersants, dispersion stabilizers, rust preventives, chelating agents, etc.

The drying-preventing agent can be suitably used so that an ink jet recording nozzle used in the ink jet recording system is prevented from being clogged owing to drying of the ink for ink jet recording.

The drying preventing agent is preferably a water-soluble organic solvent having a lower vapor pressure than that of water. Examples of the drying preventing agent include polyhydric alcohols, typically ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane, lower alkyl ethers of polyhydric alcohols, such as ethylene glycol monomethyl (or ethyl) ethers, diethylene glycol monomethyl (or ethyl) ethers, and triethylene glycol monoethyl (or butyl) ethers, heterocyclic rings such as 2-pyrrolidone, N-methyl-2-pyrrolidone, 1,3-dimethyl-2-imidazolidinone and N-ethyl morpholine, sulfur-containing compounds such as sulforane, dimethyl sulfoxide, and 3-sulforene, multifunctional compounds such as diacetone alcohol and diethanol amine, and urea derivatives.

Among these, polyhydric alcohols such as glycerine and diethylene glycol are preferable. These drying-preventing agents may be used singly or in combination. The content of the drying-preventing agent in the ink for ink jet recording is preferably 10 to 50 weight %.

The penetration promoters are used preferably for the purpose of sufficiently penetrating the ink for ink jet recording into paper.

The penetration promoters include e.g. alcohols such as ethanol, isopropanol, butanol, di(tri)ethylene glycol monobutyl ether and 1,2-hexanediol, sodium lauryl sulfate, sodium oleate, and nonionic surfactants.

The penetration promoter is contained in such a range that bleeding of printing, print-through, etc. are not caused, and when contained in an amount of about 5 to 30 weight % in the ink for ink jet recording, its sufficient effect is usually demonstrated.

The UV absorbers are used for the purpose of improving the storage of images, and include the so-called fluorescent brightening agents, that is, those compounds absorbing ultraviolet rays and emitting fluorescence, typically benzotriazole type compounds described in e.g. JP-A 58-185677, JP-A 61-190537, JP-A 2-782, JP-A 5-197075, JP-A 9-34057, etc., benzophenone type compounds described in JP-A 46-2784, JP-A 5-194483, U.S. Pat. No. 3,214,463, etc., cinnamic acid type compounds described in JP-B 48-30492, JP-B 56-21141, JP-A 10-88106, etc., triazine type compounds described in JP-A 4-298503, JP-A 8-53427, JP-A 8-239368, JP-A 10-182621, JP-A 8-501291, and stilbene type and benzoxazole type compounds described in Research Disclosure No. 24239.

The antioxidants are used for the purpose of improving the storage of images, and for example, various organic and metal complex discoloration-preventing agents can be used.

The organic discoloration-preventing agents include hydroquinones, alkoxyphenols, dialkoxyphenols, phenols, anilines, amines, indanes, chromans, alkoxyanilines, heterocyclic rings, etc.

The metal complex discoloration-preventing agents include nickel complexes, zinc complexes, etc., and specifically, it is possible to use the compounds described in patents cited in Research Disclosure (RD) No. 17643, VII, items I to J, RD No. 15162, RD No. 18716, page 650, left column, RD No. 36544, page 527, RD No. 307105, page 872, and RD No. 15162, as well as the compounds included in the general formulae of typical compounds and in compound examples described in JP-A 62-215272, pages 127 to 137.

The mildew-proofing agents include sodium dehydroacetate, sodium benzoate, sodium pyridinethion-1-oxide, ethyl p-hydroxybenzoate, 1,2-benzoisothiazoline-3-one and salts thereof. These are used in an amount of preferably 0.02 to 1.00 weight % in ink.

Preferable examples of the surface tension regulators include nonionic, cationic or anionic surfactants.

The surface tension of the ink for ink jet recording according to the present invention is preferably 25 to 70 mN/m, more preferably 25 to 60 mN/m.

The viscosity of the ink for ink jet recording according to the present invention is preferably 30 mPa.s or less, more preferably 20 mPa.s or less.

As the deforming agents, fluorine or silicone type compounds or chelating agents represented by EDTA can also be used as necessary.

The pH regulators can be used preferably for regulating the pH of the colored fine particle dispersion and conferring dispersion stability, and are added to adjust the ink to preferably pH 4.5 to 10.0, more preferably pH 6 to 10.0.

Preferable examples of the pH regulators include organic bases, inorganic alkalis, etc. as basic ones, and organic acids, inorganic acids, etc. as acidic ones.

Among the basic pH regulators, the organic bases are more preferably triethanolamine, diethanolamine, N-methyl diethanolamine and dimethyl ethanolamine, while the inorganic alkalis are more preferably alkali metal hydroxides, carbonates, ammonia, etc. The alkali metal hydroxides are more preferably sodium hydroxide, lithium hydroxide, potassium hydroxide, etc., the carbonates are more preferably sodium carbonate, sodium hydrogen carbonate, etc.

In the acidic pH regulators, the organic acids are more preferably acetic acid, propionic acid, trifluoroacetic acid and alkyl sulfonic acid, while the inorganic acids are more preferably hydrochloric acid, sulfuric acid, phosphoric acid, etc.

(III) Ink Jet Recording Method

In the ink jet recording method of the present invention, the ink for ink jet recording is used for recording on an image-receiving material, but ink nozzles, etc. used are not particularly limited and can be selected depending on the object.

Image-Receiving Material

The recording material is not particularly limited, and may be a known recording material such as paper, resin-coated paper, paper for exclusive use in ink jet recording, film, electrophotographic paper, woven goods, glass, metal, ceramic ware, etc.

The recording material is preferably paper for exclusive use in ink jet recording, and more preferable examples thereof are those described in e.g. JP-A 8-169172, JP-A 8-27693, JP-A 2-276670, JP-A 7-276789, JP-A 9-323475, JP-A 62-238783, JP-A 10-153989, JP-A 10-217473, JP-A 10-235995, JP-A 10-337947, JP-A 10-217597, JP-A 10-337947, etc.

Among the image-recording materials described above, the following recording paper and recording film are particularly preferable in the present invention.

The recording paper and recording film comprise a support and an ink-receiving layer laminated thereon, and as necessary, other layers such as a back coat, etc. may be laminated thereon.

Each layer, such as the ink-receiving layer, may consist of one layer or two or more layers.

The support includes chemical pulp such as LBKP and NBKP, machine pulp such as GP, PGW, RMP, TMP, CTMP, CMP, CGP, etc., and waste pulp such as DIP, etc. The pulp may contain known dyes, binders, sizing agents, fixing agents, cationic agents, and paper force enhancers as necessary. The support produced by various apparatuses such as wire paper machines can be used, or the support may be synthetic paper, plastic film sheet, etc.

The thickness of the support is about 10 to 250 $\mu$m, and the basis weight thereof is desirably 10 to 250 g/m$^2$.

The support may be provided with the ink-receiving layer and further with the back coat layer, or the support may be provided first with a size press layer or an anchor coat layer of starch, polyvinyl alcohol, etc. thereon and then provided with the ink-receiving layer and the back coat layer.

The support may be flattened by calendering machines such as machine calendering, TG calendering and soft calendering machines.

The support used is preferably a paper or a plastic film having polyolefins (e.g., polyethylene, polystyrene, polyethylene terephthalate, polybutene and copolymers thereof) laminated on both sides thereof.

It is more preferable to add white dyes (e.g., titanium oxide, zinc oxide) or coloring dyes (e.g., cobalt blue, ultramarine blue, neodymium oxide) to said polyolefins.

The ink-receiving layer contains a pigment, an aqueous binder, a mordant, a water-resistance-conferring agent, a light-resistance improver, a surfactant and other additives.

The pigment is preferably a white pigment. The white pigment includes e.g. inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, as well as organic pigments such as styrene type pigments, acrylic pigments, urea resin, and melamine resin.

These white pigments are preferably porous inorganic pigments, particularly preferably synthetic amorphous silica, etc. with pores of large area.

The synthetic amorphous silica may be silicic anhydride obtained in a dry process or hydrous silicic acid obtained in a wet process, among which hydrous silicic acid is used particularly preferably.

The aqueous binder includes e.g. water-soluble polymers such as polyvinyl alcohol, silanol-modified polyvinyl alcohol, starch, cationic starch, casein, gelatin, carboxymethyl cellulose, hydroxyethyl cellulose, polyvinyl pyrrolidone, polyalkylene oxide and polyalkylene oxide derivatives, as well as water-dispersible polymers such as styrene butadiene latex, acryl emulsion, etc.

These aqueous binders may be used singly or in combination. Among these binders, polyvinyl alcohol and silanol-modified polyvinyl alcohol are preferable for adhesion to the pigment and difficult removal of the ink-receiving layer.

The mordant is preferably in a passive state. Accordingly, a polymer mordant is preferably used.

Preferable examples of the polymer mordant includes polymer mordants described in JP-A 48-28325, JP-A 54-74430, JP-A 54-124726, JP-A 55-22766, JP-A 55-142339, JP-A 60-23850, JP-A 60-23851, JP-A 60-23852, JP-A 60-23853, JP-A 60-57836, JP-A 60-60643, JP-A 60-118834, JP-A 60-122940, JP-A 60-122941, JP-A 60-122942, JP-A 60-235134, JP-A 1-161236, U.S. Pat. Nos. 2,484,430, U.S. Pat. No. 2,548,564, 3,148,061, 3,309,690, 4,115,124, 4,124,386, 4,193,800, 4,273,853, 4,282,305, and 4,450,224. The polymer mordants described on pp. 212 to 215 in JP-A 1-161236 are particularly preferable. The polymer mordants described therein can be used for endowing images with excellent qualities and for improving light resistance of images.

The water resistance-conferring agent is effective for making images water-resistant, and preferable examples thereof include cationic resin.

The cationic resin includes e.g. polyamide polyamine epichlorohydrin, polyethylene imine, polyamine sulfone, a polymeric product of dimethyl diallyl ammonium chloride, cation polyacrylamide, etc. Among these cationic resins, polyamide polyamine epichlorohydrin is particularly preferable.

The content of the cationic resin is preferably 1 to 15 weight %, more preferably 3 to 10 weight %, relative to the total solid content of the ink-receiving layer.

The light-resistance improver includes e.g. zinc sulfate, zinc oxide, hindered amine antioxidants, benzotriazole UV absorbers and benzophenone UV absorbers, etc. Among these, zinc sulfate is particularly preferable.

The surfactant described above functions as a coating aid, a releasability improver, a sliding improver or an antistatic agent. The surfactant includes those described in JP-A 62-173463 and JP-A 62-183457.

An organic fluoro compound may be used in place of the surfactant. The organic fluoro compound is preferably hydrophobic. The organic fluoro compound includes e.g. fluorine type surfactants, oily fluorine type compounds (e.g., fluorine oil) and solid fluorine compound resins (e.g., ethylene tetrafluoride resin).

The organic fluoro compounds are described in JP-B 57-9053 (columns 8 to 17), JP-A 61-20994 and JP-A 62-135826.

The other additives include e.g. a pigment dispersant, a thickening agent, a defoaming agent, a dye, a fluorescent brightening agent, a preservative, a pH regulator, a matting agent, a hardener, etc.

The back coat layer described above contains a white pigment, an aqueous binder and other components.

The white pigment includes e.g. white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate and magnesium hydroxide, as well as organic pigments such as styrene type plastic pigment, acrylic plastic pigment, polyethylene, microcapsules, urea resin, melamine resin, etc.

The aqueous binder includes water-soluble polymers such as styrene/maleate copolymer, styrene/acrylate copolymer, polyvinyl alcohol, silanol-modified polyvinyl alcohol, starch, cationic starch, casein, gelatin, carboxymethyl cellulose, hydroethyl cellulose and polyvinyl pyrrolidone, as well as water-dispersible polymers such as styrene butadiene latex, acryl emulsion, etc.

The other components include a defoaming agent, a form inhibitor, a dye, a fluorescent brightening agent, a preservative, a water resistance-conferring agent, etc.

A polymer latex may be added to each constitutional layer (including the back coat layer) in the recording paper and recording film described above.

The polymer latex is used for the purpose of improving physical properties such as improvement of dimensional stability of film and prevention of film curling, adhesion and cracking.

The polymer latex is described in JP-A 62-245258, JP-A 62-136648 and JP-A 62-110066.

If the polymer latex having a low glass transition temperature (40° C. or less) is added to a layer containing the mordant, the cracking and curling of the layer can be prevented. Further, if the polymer latex having a high glass transition temperature is added to the back coat layer, curling can be prevented.

The image-receiving material used in the ink jet recording method of the present invention is not particularly limited, but a recording material comprising an ink-receiving layer containing a white pigment laminated on a support is preferably used to produce high-quality images.

Further, when a large number of conventional dispersion inks are used on a recording material comprising an ink receiving layer containing a porous inorganic pigment such as white pigment, their ability to penetrate the recording material is poor, so there is the problem that when the formed image is rubbed with hands, the dye is removed from the surface. However, the ink of the present invention is superior in the ability to penetrate the recording material, thus solving this problem. Accordingly, the recording material can be used to produce high-quality and high-strength images.

The ink jet recording system of the present invention is not particularly limited and may be any known method such as a charge regulating system utilizing electrostatically induced force to discharge ink, a drop-on-demand system (pressure pulse system) utilizing a vibration pressure of piezo elements, an acoustic ink jet system of converting an electric signal into an acoustic beam which is irradiated on ink to discharge the ink by the radiation pressure, and a thermal ink jet (bubble jet) system of heating ink to form bubbles and utilizing the resulting pressure, etc.

The ink jet recording systems described above include a system of jetting an ink of low concentration (called photo ink) in a large number of small volumes, a system of improving the qualities of images by use of a plurality of inks having substantially the same hue but different concentrations, and a system of using a colorless transparent ink.

EXAMPLES

Hereinafter, Examples of the present invention are described, but these Examples are not intended to limit the present invention.

Example 1

Preparation of a Water-insoluble Ionic Group-containing Polymer Fine Particle Dispersion (i) Preparation of an Ionic Group-containing Polymer Fine Particle Dispersion PD-1

3.0 g of the water-insoluble ionic group-containing polymer (P-10) was dissolved in 17 g of isopropyl alcohol in a 200 ml three-necked flask equipped with a stirrer and a reflux condenser, and 0.17 g of sodium hydrogen carbonate and 1 g of distilled water were added thereto and heated at 80° C. under stirring.

50 ml of distilled water was added dropwise to this mixture at a rate of 1 ml/min. under stirring. Thereafter, the resulting ionic group-containing polymer fine particle dispersion was concentrated at 40° C. under reduced pressure and filtered through a filter cloth of 225 mesh size to give an ionic group-containing polymer fine particle dispersion (PD-1) with a solid content of 18.0%.

The particle diameter of the ionic group-containing polymer fine particle dispersion was 28.2 nm.

(ii) Preparation of Ionic Group-containing Polymer Fine Particle Dispersions (PD-2) to (PD-9)

The ionic group-containing polymer fine particle dispersions (PD-2) to (PD-9) were prepared in the same manner as in production of PD-1 described above except that the type of the ionic group-containing polymer was changed as shown in Table 12.

TABLE 12

Preparation of the water-insoluble ionic group-containing polymer fine particle dispersions

| Polymer fine particle dispersion | Ionic group-containing polymer | Solid content (%) | Particle diameter (nm) |
|---|---|---|---|
| PD-1 | P-10 | 18.0 | 28 |
| PD-2 | P-16 | 17.7 | 19 |
| PD-3 | P-44 | 19.3 | 11 |
| PD-4 | P-36 | 21.3 | 14 |
| PD-5 | P-24 | 17.1 | 18 |
| PD-6 | P-26 | 19.4 | 15 |
| PD-7 | P-2 | 10.5 | 16 |
| PD-8 | P-55 | 16.5 | 33 |
| PD-9 | P-63 | 17.8 | 24 |

Preparation of Comparative Ink for Ink Jet Recording 101

2.5 g of an oil-soluble dye (M-6), 1.6 g of sodium dioctyl sulfosuccinate, 1.8 g of a hydrophobic high-boiling organic solvent (S-2) and 3.2 g of a hydrophobic high-boiling organic solvent (S-11) were dissolved in 75 ml of ethyl acetate at 75° C. 75 ml of deionized water heated to 75° C. was poured into this solution and then emulsified at 10,000 rpm for 4 minutes with a homogenizer, and this emulsification was repeated 6 times in total at 1 minute intervals.

Then, the resulting emulsion was concentrated in a nitrogen flow until an odor of ethyl acetate disappeared, and the concentrate was then filtered to give a colored fine particle dispersion.

Further, diethylene glycol, glycerin and deionized water were added to the resulting colored fine particle dispersion, such that a magenta ink for ink jet recording (comparative ink for ink jet recording 101), comprising 2 weight % oil-soluble dye, 5 weight % diethylene glycol and 5 weight % glycerin in 100 ml of the final solution, was obtained.

The volume average particle diameter of the colored fine particles in the resulting ink for ink jet recording, as determined by a Micro-track UPA™ (Nikkiso Co., Ltd.), was 83 nm.

Preparation of Inks for Ink Jet Recording 102 to 110

Magenta inks for ink jet recording (inks for ink jet recording 102 to 110), comprising 2 weight % of oil-soluble dye, 2 weight % ionic group-containing polymer fine particle dispersion, 5 weight % diethylene glycol and 5 weight % glycerin, were prepared in the same manner as in the process for preparing comparative ink for ink jet recording 101 as described above, except that the water-insoluble ionic group-containing polymer fine particle dispersion shown in Table 13 was added to the colored fine particle dispersion after the concentration step was completed.

Preparation of Comparative Ink for Ink Jet Recording 111

A magenta ink for ink jet recording (comparative ink for ink jet recording 111) comprising 2 weight % oil-soluble dye, 2 weight % ionic group-containing polymer fine particle dispersion, 5 weight % diethylene glycol and 5 weight % glycerin was prepared in the same manner as in the process for preparing comparative ink for ink jet recording 101 as described above, except that 2.5 g of the oil-soluble dye (M-6), 1.6 g of sodium dioctyl sulfosuccinate, 1.8 g of the hydrophobic high-boiling organic solvent (S-2), 3.2 g of the hydrophobic high-boiling organic solvent (S-11) and 2.5 g of the water-insoluble ionic group-containing polymer (P-10) were dissolved in the 75 ml of ethyl acetate at 75° C.

The volume average particle diameter of the colored fine particles in the resulting ink for ink jet recording, as determined by a Micro-track UPA™ (Nikkixo Co., Ltd.), was 110 nm.

TABLE 13

Preparation of inks for ink jet recording and changes of particle diameters with time

| Ink for ink jet recording | Ionic group-containing polymer fine particle dispersion | Volume average particle diameter (nm) Day 0 | Volume average particle diameter (nm) Day 10 | |
|---|---|---|---|---|
| 101 | — | 83 | 95 | Comparative Example |
| 102 | PD-1 | 79 | 81 | Present Invention |
| 103 | PD-2 | 79 | 74 | Present Invention |
| 104 | PD-3 | 78 | 84 | Present Invention |
| 105 | PD-4 | 79 | 79 | Present Invention |
| 106 | PD-5 | 85 | 79 | Present Invention |
| 107 | PD-6 | 71 | 74 | Present Invention |
| 108 | PD-7 | 81 | 80 | Present Invention |
| 109 | PD-8 | 82 | 83 | Present Invention |
| 110 | PD-9 | 83 | 83 | Present Invention |
| 111 | — | 110 | 112 | Comparative Example |

<Stability of Ink for Ink Jet Recording 101 to 111 with Time>

After the prepared inks 101 to 111 for ink jet recording had been left for 10 days at 80° C., the volume average particle diameters of the colored fine particles were measured. The results are shown in Table 13. From results in Table 13, it is clear that the stability of the ink for ink jet recording with time was significantly improved by adding the water-insoluble ionic group-containing polymer of the present invention.

Further, it is clear that even in the case where the water-insoluble ionic group-containing polymer was added in the same formulation, an ink of the present invention prepared by mixing the water-insoluble ionic group-containing polymer fine particle dispersion with the colored fine particle dispersion substantially not containing the polymer, as compared with an ink prepared by co-emulsification dispersion thereof, has a smaller volume average particle diameter and is thus more advantageous to the progress of dispersion.

Example 2

Preparation of Comparative Ink Set 201

8 g of the oil-soluble dye (M-6) and 5 g of sodium dioctyl sulfosuccinate were dissolved in 6 g of the hydrophobic high-boiling organic solvent (S-2), 10 g of the hydrophobic high-boiling organic solvent (S-11), 5.0 g of UV absorbers UV1 to UV5 (a mixture in the ratio 1:2:2:3:1 by weight) and 50 ml ethyl acetate at 70° C. 500 ml deionized water was added to this solution under stirring with a magnetic stirrer to prepare a coarse particle dispersion of oil-in-water type.

Next, this coarse particle dispersion was passed 5 times through a Microfluidizer™ (Microfluidex Inc.) at a pressure of 60 MPa (600 bar) to form fine particles. The solvent was removed from the resulting emulsion in a rotary evaporator until an odor of ethyl acetate disappeared, and a colored fine particle dispersion was obtained.

160 g of diethylene glycol, 64 g of glycerin, 7 g of Surfynol 465™ (Air Products & Chemicals) and additives such as urea were added to the resulting colored fine particle dispersion, and deionized water was added thereto, and the dispersion was adjusted to pH 9 with 10 mol/l KOH, to prepare a light magenta ink for ink jet recording. The composition of the resulting light magenta ink is shown in Table 14 below.

The volume average particle diameter of the colored fine particles in the resulting ink for ink jet recording, as determined by a Micro-track UPA™ (Nikkiso Co., Ltd.), was 47 nm.

Further, a comparative ink set 201 (including a magenta ink, a light cyan ink, a cyan ink, a yellow ink and a black ink) as shown in Table 14 was prepared by changing the type of the oil-soluble dye and hydrophobic high-boiling organic solvent used.

TABLE 14

Comparative ink set 201

|  |  | Light magenta | Magenta | Light cyan | Cyan | Yellow | Black |
|---|---|---|---|---|---|---|---|
| Dye (g/l) |  | M-6 5.00 | M-6 20.0 | C-1 9.3 | C-1 37.2 | Y-1 27.2 | M-6 10.0 C-1 18.6 Y-1 13.6 |
| High-boiling organic solvent (g/l) | S-1 S-2 | 3.8 6.3 | 15.0 25.0 | 7.0 11.8 | 27.9 47.0 | 20.4 34.0 | 31.7 53.3 |
| UV absorber (g/l) (1/2/2/3/1 mixture of UV1/UV2/UV3/UV4/UV5) |  | 3.13 | 12.5 | 5.8 | 23.3 | 17.0 | 26.4 |
| Sodium dioctyl sulfosuccinate (g/l) |  | 3.13 | 12.5 | 5.8 | 23.3 | 17.0 | 26.4 |
| Diethylene glycol (g/l) |  | 100.0 | 100.0 | 100.0 | 100.0 | 100.0 | 100.0 |
| Urea (g/l) |  | 46.0 | 46.0 | 46.0 | 46.0 | 46.0 | 46.0 |
| Glycerin (g/l) |  | 40.0 | 40.0 | 40.0 | 40.0 | 40.0 | 40.0 |
| SURFYNOL 465 (g/l) |  | 5.5 | 5.5 | 5.5 | 5.5 | 5.5 | 5.5 |
| Triethanolamine (g/l) |  | 7.5 | 7.5 | 7.5 | 7.5 | 7.5 | 7.5 |
| Benzotriazole (g/l) |  | 0.075 | 0.075 | 0.075 | 0.075 | 0.075 | 0.075 |
| Proxel XL2 (g/l) |  | 2.5 | 2.5 | 2.5 | 2.5 | 2.5 | 2.5 |
|  | Adjusted to 1 L with deionized water |  |  |  |  |  |  |
| Volume average particle diameter (nm) |  | 47 | 53 | 56 | 57 | 49 | 64 |

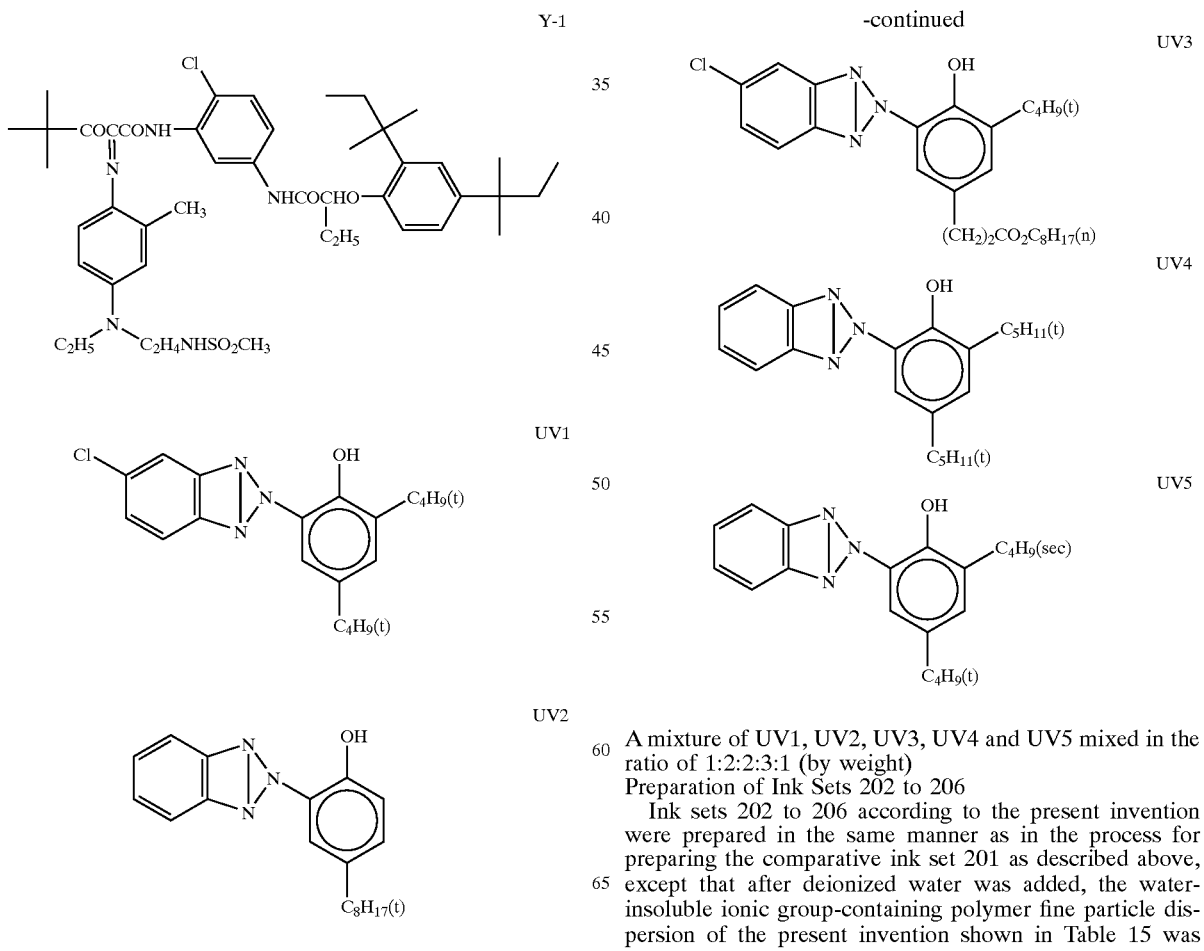

A mixture of UV1, UV2, UV3, UV4 and UV5 mixed in the ratio of 1:2:2:3:1 (by weight)

Preparation of Ink Sets 202 to 206

Ink sets 202 to 206 according to the present invention were prepared in the same manner as in the process for preparing the comparative ink set 201 as described above, except that after deionized water was added, the water-insoluble ionic group-containing polymer fine particle dispersion of the present invention shown in Table 15 was added. (The total liquid volume of deionized water and the water-insoluble ionic group-containing polymer dispersion of the present invention was made constant. The weight of each ionic group-containing polymer fine particle dispersion shown in Tables 15 and 16 indicates the solid content of the polymer per liter of the ink.)

Preparation of Ink Sets 207 to 215

Then, comparative ink sets 207 and 211 were prepared in the same manner as for the comparative ink set 201 described above except that the type and amount of the oil-soluble dye and high-boiling organic solvent were changed as shown in Tables 15 and 16.

Further, ink sets 208 to 210 of the present invention corresponding to the comparative ink set 207, and ink sets 212 to 214 of the present invention corresponding to the comparative ink set 211, were prepared respectively in the same manner as for the ink sets 202 to 206 described above except that each water-insoluble ionic group-containing polymer fine particle dispersion of the present invention shown in Table 16 was added.

Further, ink set 215 shown in Table 17 was prepared as a comparative ink set using a water-soluble dye.

TABLE 15

Ink sets 202 to 207

| Ink Set | | | Light magenta | Magenta | Light cyan | Cyan | Yellow | Black | Remarks |
|---|---|---|---|---|---|---|---|---|---|
| 201 | Dye | | M-6 | M-6 | C-1 | C-1 | Y-1 | M-6 10.0 | Comparative Example |
| | (g/l) | | 5.0 | 20.0 | 9.3 | 37.2 | 27.2 | C-1 18.6 | |
| | | | | | | | | Y-1 13.6 | |
| | High-boiling organic solvent | S-2/ S-11 | 3.8 6.3 | 15.0 25.0 | 7.0 11.8 | 27.9 47.0 | 20.4 34.0 | 31.7 53.3 | |
| | Volume particle diameter (nm) | | 47 | 53 | 56 | 57 | 49 | 64 | |
| 202 | Dye | | M-6 | M-6 | C-1 | C-1 | Y-1 | M-6 10.0 | Present Invention |
| | (g/l) | | 5.0 | 20.0 | 9.3 | 37.2 | 27.2 | C-1 18.6 | |
| | | | | | | | | Y-1 13.6 | |
| | High-boiling organic solvent | S-2/ S-11 | 3.8 6.3 | 15.0 25.0 | 7.0 11.8 | 27.9 47.0 | 20.4 34.0 | 31.7 53.3 | |
| | Volume particle diameter (nm) | | 47 | 53 | 56 | 57 | 49 | 64 | |
| | Ionic group-containing polymer fine particle dispersion PD-1 (g/l) | | 50 | 25 | 50 | 25 | 25 | 25 | |
| 203 | Dye | | M-6 | M-6 | C-1 | C-1 | Y-1 | M-6 10.0 | Present Invention |
| | (g/l) | | 5.0 | 20.0 | 9.3 | 37.2 | 27.2 | C-1 18.6 | |
| | | | | | | | | Y-1 13.6 | |
| | High-boiling organic solvent | S-2/ S-11 | 3.8 6.3 | 15.0 25.0 | 7.0 11.8 | 27.9 47.0 | 20.4 34.0 | 31.7 53.3 | |
| | Volume particle diameter (nm) | | 47 | 53 | 56 | 57 | 49 | 64 | |
| | Ionic group-containing polymer fine particle dispersion PD-3 (g/l) | | 50 | 25 | 50 | 25 | 25 | 25 | |
| 204 | Dye | | M-6 | M-6 | C-1 | C-1 | Y-1 | M-6 10.0 | Present Invention |
| | (g/l) | | 5.0 | 20.0 | 9.3 | 37.2 | 27.2 | C-1 18.6 | |
| | | | | | | | | Y-1 13.6 | |
| | High-boiling organic solvent | S-10/ S-15 | 7.5 2.5 | 30.0 10.0 | 7.0 11.8 | 18.8 56.4 | 13.6 40.8 | 21.3 63.8 | |
| | Volume particle diameter (nm) | | 48 | 51 | 49 | 56 | 45 | 60 | |
| | Ionic group-containing polymer fine particle dispersion PD-1 (g/l) | | 50 | 25 | 50 | 25 | 25 | 25 | |
| 205 | Dye | | M-6 | M-6 | C-1 | C-1 | Y-1 | M-6 10.0 | Present Invention |
| | (g/l) | | 5.0 | 20.0 | 9.3 | 37.2 | 27.2 | C-1 18.6 | |
| | | | | | | | | Y-1 13.6 | |
| | High-boiling organic solvent | S-10/ S-15 | 7.5 2.5 | 30.0 10.0 | 7.0 11.8 | 18.8 56.4 | 13.6 40.8 | 21.3 63.8 | |
| | Volume particle diameter (nm) | | 48 | 51 | 49 | 56 | 45 | 60 | |
| | Ionic group-containing polymer fine particle dispersion PD-8 (g/l) | | 50 | 25 | 50 | 25 | 25 | 25 | |
| 206 | Dye | | M-6 | M-6 | C-1 | C-1 | Y-1 | M-6 10.0 | Present Invention |
| | (g/l) | | 5.0 | 20.0 | 9.3 | 37.2 | 27.2 | C-1 18.6 | |
| | | | | | | | | Y-1 13.6 | |
| | High-boiling organic solvent | S-2/ S-11 | 3.8 6.3 | 15.0 25.0 | 7.0 11.8 | 27.9 47.0 | 20.4 34.0 | 31.7 53.3 | |
| | Volume particle diameter (nm) | | 47 | 53 | 56 | 57 | 49 | 64 | |
| | Ionic group-containing polymer fine particle dispersion PD-3 (g/l) | | 20 | 10 | 20 | 10 | 10 | 10 | |

TABLE 15-continued

Ink sets 202 to 207

| Ink Set | | | Light magenta | Magenta | Light cyan | Cyan | Yellow | Black | Remarks |
|---|---|---|---|---|---|---|---|---|---|
| | Polymer latex SBR (g/l) (Note 1) | | 30 | 15 | 30 | 15 | 15 | 15 | |
| 207 | Dye (g/l) | | MM-2 3.6 | MM-2 14.4 | CC-2 17.4 | CC-2 69.6 | YY-2 26.5 | MM-2 6.5 CC-2 34.8 YY-2 13.3 | Comparative Example |
| | High-boiling organic solvent | S-2/ S-11 | 2.6 4.6 | 10.5 18.5 | 12.6 22.1 | 50.5 88.7 | 19.2 33.7 | 39.6 69.6 | |
| | Volume particle diameter (nm) | | 43 | 48 | 53 | 56 | 47 | 61 | |

Note 1: An SBR-styrene/butadiene (ratio by weight: 37/63) latex (emulsion polymer)

TABLE 16

Ink sets 208 to 214

| Ink Set | | | Light magenta | Magenta | Light cyan | Cyan | Yellow | Black | Remarks |
|---|---|---|---|---|---|---|---|---|---|
| 208 | Dye (g/l) | | MM-2 3.6 | MM-2 14.4 | CC-2 17.4 | CC-2 69.6 | YY-2 26.5 | MM-2 6.5 CC-2 34.8 YY-2 13.3 | Present Invention |
| | High-boiling organic solvent | S-2/ S-11 | 2.6 4.6 | 10.5 18.5 | 12.6 22.1 | 50.5 88.7 | 19.2 33.7 | 39.6 69.6 | |
| | Volume particle diameter (nm) | | 43 | 48 | 53 | 56 | 47 | 61 | |
| | Ionic group-containing polymer fine particle dispersion PD-2 (g/l) | | 50 | 25 | 50 | 25 | 25 | 25 | |
| 209 | Dye (g/l) | | MM-2 3.6 | MM-2 14.4 | CC-2 17.4 | CC-2 69.6 | YY-2 26.5 | MM-2 6.5 CC-2 34.8 YY-2 13.3 | Present Invention |
| | High-boiling organic solvent | S-2/ S-11 | 2.6 4.6 | 10.5 18.5 | 12.6 22.1 | 50.5 88.7 | 19.2 33.7 | 39.6 69.6 | |
| | Volume particle diameter (nm) | | 43 | 48 | 53 | 56 | 47 | 61 | |
| | Ionic group-containing polymer fine particle dispersion PD-4 (g/l) | | 50 | 25 | 50 | 25 | 25 | 25 | |
| 210 | Dye (g/l) | | MM-2 3.6 | MM-2 14.4 | CC-2 17.4 | CC-2 69.6 | YY-2 26.5 | MM-2 6.5 CC-2 34.8 YY-2 13.3 | Present Invention |
| | High-boiling organic solvent | S-2/ S-11 | 2.6 4.6 | 10.5 18.5 | 12.6 22.1 | 50.5 88.7 | 19.2 33.7 | 39.6 69.6 | |
| | Volume particle diameter (nm) | | 43 | 48 | 53 | 56 | 47 | 61 | |
| | Ionic group-containing polymer fine particle dispersion PD-9 (g/l) | | 50 | 25 | 50 | 25 | 25 | 25 | |
| 211 | Dye (g/l) | | MM-3 3.6 | MM-3 14.4 | CC-3 17.4 | CC-3 69.6 | YY-2 26.5 | MM-3 6.5 CC-3 34.8 YY-2 13.3 | Comparative Example |
| | High-boiling organic solvent | S-9/ S-24 | 2.9 4.3 | 11.5 17.3 | 13.9 20.9 | 55.7 83.5 | 21.2 31.8 | 43.6 65.5 | |
| | Volume particle diameter (nm) | | 42 | 45 | 50 | 58 | 47 | 62 | |
| 212 | Dye (g/l) | | MM-3 3.6 | MM-3 14.4 | CC-3 17.4 | CC-3 69.6 | YY-2 26.5 | MM-3 6.5 CC-3 34.8 YY-2 13.3 | Present Invention |
| | High-boiling organic solvent | S-9/ S-24 | 2.9 4.3 | 11.5 17.3 | 13.9 20.9 | 55.7 83.5 | 21.2 31.8 | 43.6 65.5 | |
| | Volume particle diameter (nm) | | 42 | 45 | 50 | 58 | 47 | 62 | |
| | Ionic group-containing polymer fine particle dispersion PD-5 (g/l) | | 30 | 15 | 30 | 15 | 15 | 15 | |

TABLE 16-continued

Ink sets 208 to 214

| Ink Set | | | Light magenta | Magenta | Light cyan | Cyan | Yellow | Black | Remarks |
|---|---|---|---|---|---|---|---|---|---|
| 213 | Dye (g/l) | | MM-3 3.6 | MM-3 14.4 | CC-3 17.4 | CC-3 69.6 | YY-2 26.5 | MM-3 6.5 CC-3 34.8 YY-2 13.3 | Present Invention |
| | High-boiling organic solvent | S-9/ S-24 | 2.9 4.3 | 11.5 17.3 | 13.9 20.9 | 55.7 83.5 | 21.2 31.8 | 43.6 65.5 | |
| | Volume particle diameter (nm) | | 42 | 45 | 50 | 58 | 47 | 62 | |
| | Ionic group-containing polymer fine particle dispersion (g/l) | PD-1/ PD-6 | 30 20 | 15 10 | 30 20 | 15 10 | 15 10 | 15 10 | |
| 214 | Dye (g/l) | | MM-3 3.6 | MM-3 14.4 | CC-3 17.4 | CC-3 69.6 | YY-2 26.5 | MM-3 6.5 CC-3 34.8 YY-2 13.3 | Present Invention |
| | High-boiling organic solvent | S-9/ S-24 | 2.9 4.3 | 11.5 17.3 | 13.9 20.9 | 55.7 83.5 | 21.2 31.8 | 43.6 65.5 | |
| | Volume particle diameter (nm) | | 42 | 45 | 50 | 58 | 47 | 62 | |
| | Ionic group-containing polymer fine particle dispersion PD-2 (g/l) | | 80 | 40 | 80 | 40 | 40 | 40 | |

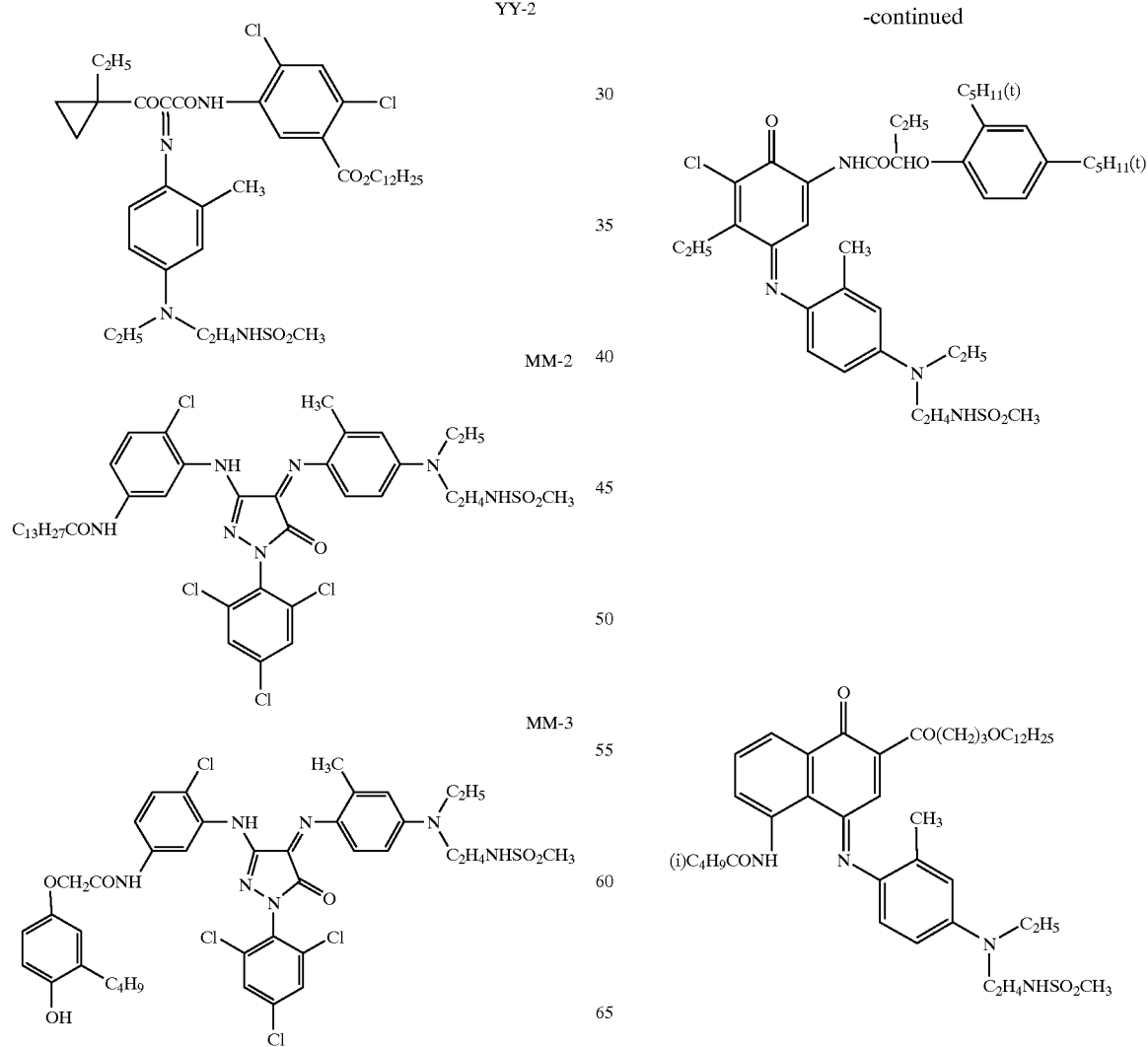

TABLE 17

| | Comparative ink set 215 | | | | | |
|---|---|---|---|---|---|---|
| | Light magenta | Magenta | Light cyan | Cyan | Yellow | Black |
| Dye (g/l) | A-1 7.0 | A-1 28.0 | A-2 8.75 | A-2 35.0 | A-3 14.7 A-4 14.0 | A-5 20.0 A-6 20.0 A-7 20.0 A-3 21.0 |
| Diethylene glycol (g/l) | 150 | 110 | 130 | 200 | 160 | 20 |
| Urea (g/l) | 37 | 46 | — | — | — | — |
| Glycerin (g/l) | 130 | 130 | 150 | 180 | 150 | 120 |
| Triethylene glycol monobutyl ether (g/l) | 130 | 140 | 130 | 140 | 130 | — |
| Diethylene glycol monobutyl ether (g/l) | — | — | — | — | — | 230 |

TABLE 17-continued

| | Comparative ink set 215 | | | | | |
|---|---|---|---|---|---|---|
| | Light magenta | Magenta | Light cyan | Cyan | Yellow | Black |
| 2-Pyrrolidone (g/l) | — | — | — | — | — | 80 |
| SURFYNOL 465 (g/l) | 10.5 | 11.5 | 11.1 | 9.8 | — | — |
| SURFYNOL TG (g/l) | — | — | — | — | 9.0 | 8.5 |
| Triethanolamine (g/l) | 6.9 | 7.4 | 6.8 | 6.7 | 0.8 | 17.9 |
| Benzotriazole (g/l) | 0.08 | 0.07 | 0.08 | 0.08 | 0.06 | 0.06 |
| PROXEL XL2 (g/l) | 3.5 | 2.5 | 1.8 | 2.0 | 2.5 | 1.8 |
| Adjusted to 1 L with deionized water | | | | | | |

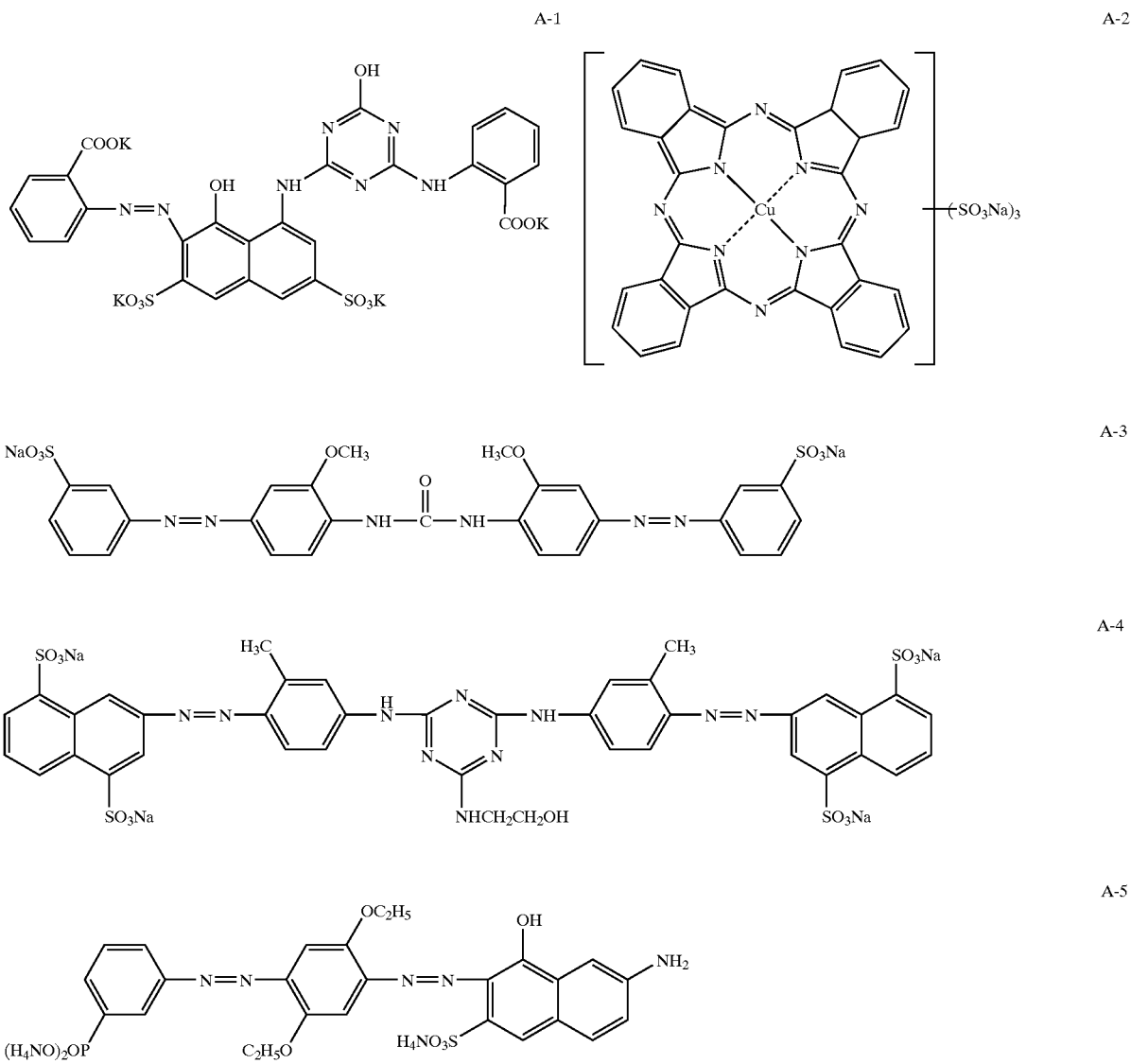

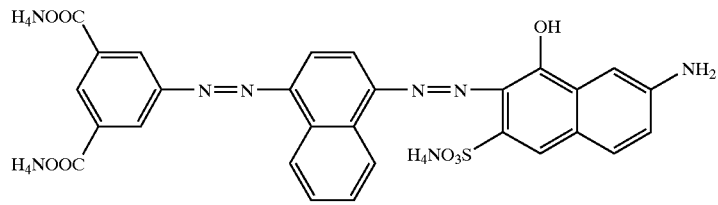

A-6

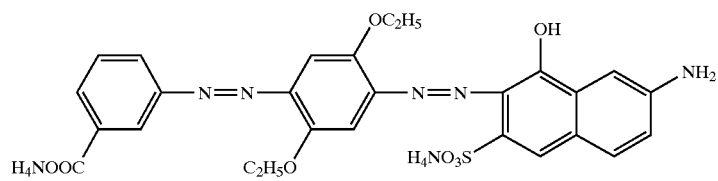

A-7

Recording and Evaluation of Images

Each of the prepared ink sets 201 to 215 was charged into a cartridge in an ink jet printer PM670C (trade name, manufactured by Epson Co., Ltd.), printed on ink jet paper photo glossy paper EX (trade name, manufactured by Fuji Photo Film Co., Ltd.), and evaluated as follows.

(i) Printing Performance ①

The cartridge was set in the printer and, after it had been confirmed that ink was discharged from all nozzles, 20 sheets of A4 paper were subjected to printing. Irregularity of the resulting printed characters was evaluated under the following criteria.

A: The printed characters were not irregular throughout printing.
B: The printed characters were irregular occasionally.
C: The printed characters were irregular throughout printing.

(ii) Printing Performance ②

After the cartridge had been left at 60° C. for 2 days, the irregulararity of printed characters was evaluated in the same manner as in printing performance ①.

(iii) Drying Characteristics

A stain on a finger upon contacting with printed letters just after printing was evaluated visually, and ○ was assigned to good drying characteristics, while was assigned to poor drying characteristics.

(iv) Bleeding of a Thin Line

Each of the yellow, magenta, cyan and black inks was used in printing to form a thin line, and bleeding of the thin line was evaluated visually (evaluation ①). For evaluation of the black ink, a thin line of the black ink was printed after solid printing of the magenta ink, and bleeding of the thin line upon contact of the two colors was evaluated visually (evaluation ②).

(v) Water Resistance

For water resistance, the resulting images were dipped in deionized water for 10 seconds, and bleeding of the images was evaluated visually.

(vi) Image Fastness Properties

For image fastness properties, each of the yellow, magenta, cyan and black inks was used in printing to form a sample of printed characters and measured for thermal shelf stability in the dark, that is, residual degree of color (%) as shown below.

Under conditions of 80° C. and 10% RH, the density ratio before and after storage of the sample for 14 days was determined as the residual degree of color (%) in the following manner.

Residual degree of color (%)=(density after being left for 14 days at 80° C. and 10% RH)/density just after printing ×100

Each ink was evaluated to one of the following 4 ranks: "A" was given when the residual degree of color was 80 to 100%; "B" when the residual degree was 60 to 80%; "C" when the residual degree was 40 to 60%; and "D" when the residual degree was 40% or less.

The results are shown in Tables 18 and 19.

TABLE 18

Evaluation results of ink sets 201 to 215

| Ink Set | Printing performance ① | Printing performance ② | Drying characteristics | Bleeding of thin line ① | Bleeding of thin line ② | Water resistance | Remarks |
|---|---|---|---|---|---|---|---|
| 201 | A | A | ○ | ○ | ○ | ○ | Comparative Example |
| 202 | A | A | ○ | ○ | ○ | ○ | Present Invention |
| 203 | A | A | ○ | ○ | ○ | ○ | Present Invention |
| 204 | A | A | ○ | ○ | ○ | ○ | Present Invention |
| 205 | A | A | ○ | ○ | ○ | ○ | Present Invention |
| 206 | A | A | ○ | ○ | ○ | ○ | Present Invention |
| 207 | A | B | ○ | ○ | ○ | ○ | Comparative Example |
| 208 | A | A | ○ | ○ | ○ | ○ | Present Invention |
| 209 | A | A | ○ | ○ | ○ | ○ | Present Invention |
| 210 | A | A | ○ | ○ | ○ | ○ | Present Invention |

TABLE 18-continued

Evaluation results of ink sets 201 to 215

| Ink Set | Printing performance ① | Printing performance ② | Drying characteristics | Bleeding of thin line ① | Bleeding of thin line ② | Water resistance | Remarks |
|---|---|---|---|---|---|---|---|
| 211 | A | B | ○ | ○ | ○ | ○ | Comparative Example |
| 212 | A | A | ○ | ○ | ○ | ○ | Present Invention |
| 213 | A | A | ○ | ○ | ○ | ○ | Present Invention |
| 214 | A | A | ○ | ○ | ○ | ○ | Present Invention |
| 215 | A | A | X | X | X | X | Comparative Example |

TABLE 19

Residual degree of color in ink sets 201 to 215

| Ink Set | Residual degree of color (%) | | | | Remarks |
|---|---|---|---|---|---|
| | Yellow | Magenta | Cyan | Black | |
| 201 | C | C | C | C | Comparative Example |
| 202 | B | B | B | B | Present Invention |
| 203 | B | B | B | B | Present Invention |
| 204 | A | A | A | A | Present Invention |
| 205 | A | A | A | A | Present Invention |
| 206 | A | A | A | A | Present Invention |
| 207 | C | D | D | D | Comparative Example |
| 208 | B | C | C | C | Present Invention |
| 209 | B | C | C | C | Present Invention |
| 210 | B | C | C | C | Present Invention |
| 211 | C | D | D | D | Comparative Example |
| 212 | B | C | C | C | Present Invention |
| 213 | B | C | C | C | Present Invention |
| 214 | B | C | C | C | Present Invention |
| 215 | B | C | C | B | Comparative Example |

Example 3

The same ink prepared in Example 2 was charged into a cartridge in an ink jet printer BJ-F850 (trade name, manufactured by Canon Co., Ltd.), printed on ink jet paper photo glossy paper EX (trade name, manufactured by Fuji Photo Film Co., Ltd.) and evaluated in the same manner as in Example 2, to give the same results as in Example 2.

Example 4

Preparation of Ink Set 301

An ink set 301 for comparison, which included a light magenta ink, a magenta ink, a light cyan ink, a cyan ink, a yellow ink, and a black ink as shown in the following Table 20, was prepared in the same manner as in the process for preparing the comparative ink set 201 except that the UV absorbers UV1 to UV5 were not used.

TABLE 20

Comparative ink set 301

| | | Light magenta | Magenta | Light cyan | Cyan | Yellow | Black |
|---|---|---|---|---|---|---|---|
| Dye (g/l) | | M-6 | M-6 | C-1 | C-1 | Y-1 | M-6 10.0 |
| | | 5.00 | 20.0 | 93 | 37.2 | 27.2 | C-1 18.6 |
| | | | | | | | Y-1 13.6 |
| High-boiling organic solvent (g/l) | S-1/ S-2 | 3.8 6.3 | 15.0 25.0 | 7.0 11.8 | 27.9 47.0 | 20.4 34.0 | 31.7 53.3 |
| Sodium dioctyl sulfosuccinate (g/l) | | 3.13 | 12.5 | 5.8 | 23.3 | 17.0 | 26.4 |
| Diethylene glycol (g/l) | | 100.0 | 100.0 | 100.0 | 100.0 | 100.0 | 100.0 |
| Urea (g/l) | | 46.0 | 46.0 | 46.0 | 46.0 | 46.0 | 46.0 |
| Glycerin (g/l) | | 40.0 | 40.0 | 40.0 | 40.0 | 40.0 | 40.0 |
| SURFYNOL 465 (g/l) | | 5.5 | 5.5 | 5.5 | 5.5 | 5.5 | 5.5 |
| Triethanolamine (g/l) | | 7.5 | 7.5 | 7.5 | 7.5 | 7.5 | 7.5 |
| Benzotriazole (g/l) | | 0.075 | 0.075 | 0.075 | 0.075 | 0.075 | 0.075 |
| PROXEL XL2 (g/l) | | 2.5 | 2.5 | 2.5 | 2.5 | 2.5 | 2.5 |
| | | Adjusted to 1 L with deionized water | | | | | |
| Volume average particle diameter (nm) | | 42 | 48 | 51 | 50 | 43 | 58 |

Preparation of Ink Set 302

An ink set 302 for comparison was prepared in the same manner as in the process for preparing the comparative ink set 301, except that the kinds and weights of the dyes were varied as shown in the following Table 21.

Preparation of Ink Sets 303 to 305

Ink sets 303 to 305 according to the present invention shown in Table 21 were prepared in the same manner as in the process for preparing the comparative ink set 302, except that after deionized water was added, the water-insoluble ionic group-containing polymer fine particle dispersion of the invention shown in Table 12 was added. (The total liquid volume of deionized water and the water-insoluble ionic group-containing polymer dispersion of the present invention was made constant. The weight of the ionic group-containing polymer fine particle dispersion shown in Table 21 indicates the solid content of the polymer per liter of the ink.)

Preparation of Ink Sets 306 to 309

Then, a comparative ink set 306 was prepared in the same manner as for the comparative ink set 302 described above except that the type and amount of the oil-soluble dye and high-boiling organic solvent were changed as shown in Table 21.

Further, ink sets 307 to 309 of the present invention corresponding to the comparative ink set 306 were prepared respectively in the same manner as for the ink sets 303 to 305 described above except that the water-insoluble ionic group-containing polymer fine particle dispersion of the present invention shown in Table 12 was added.

Further, the ink set 215 shown in Table 17 was prepared as a comparative ink set using a water-soluble dye.

TABLE 21

Ink sets 301 to 309

| Ink Set | | | Light magenta | Magenta | Light cyan | Cyan | Yellow | Black | Remarks |
|---|---|---|---|---|---|---|---|---|---|
| 301 | Dye | | M-6 | M-6 | C-1 | C-1 | Y-1 | M-6 10.0 | Compa- |
| | (g/l) | | 5.0 | 20.0 | 9.3 | 37.2 | 27.2 | C-1 18.6 | rative |
| | | | | | | | | Y-1 13.6 | Example |
| | High-boiling | S-2 | 3.8 | 15.0 | 7.0 | 27.9 | 20.4 | 31.7 | |
| | organic solvent | S-11 | 6.3 | 25.0 | 11.8 | 47.0 | 34.0 | 53.3 | |
| | Volume particle diameter (nm) | | 42 | 48 | 51 | 50 | 43 | 58 | |
| 302 | Dye | | a-17 | a-17 | C-114 | C-114 | Y-1 | a-17 10.0 | Compa- |
| | (g/l) | | 5.0 | 20.0 | 10.5 | 42.0 | 27.2 | C-114 21.0 | rative |
| | | | | | | | | Y-1 13.6 | Example |
| | High-boiling | S-2 | 3.8 | 15.0 | 7.0 | 27.9 | 20.4 | 31.7 | |
| | organic solvent | S-11 | 6.3 | 25.0 | 11.8 | 47.0 | 34.0 | 53.3 | |
| | Volume particle diameter (nm) | | 40 | 49 | 45 | 53 | 43 | 58 | |
| 303 | Dye | | a-17 | a-17 | C-114 | C-114 | Y-1 | a-17 10.0 | Present |
| | (g/l) | | 5.0 | 20.0 | 10.5 | 42.0 | 27.2 | C-114 21.0 | Invention |
| | | | | | | | | Y-1 13.6 | |
| | High-boiling | S-2 | 3.8 | 15.0 | 7.0 | 27.9 | 20.4 | 31.7 | |
| | organic solvent | S-11 | 6.3 | 25.0 | 11.8 | 47.0 | 34.0 | 53.3 | |
| | Volume particle diameter (nm) | | 40 | 49 | 45 | 53 | 43 | 58 | |
| | Ionic group-containing polymer fine particle dispersion PD-3 (g/l) | | 50 | 25 | 50 | 25 | 25 | 25 | |
| 304 | Dye | | a-17 | a-17 | C-114 | C-114 | Y-1 | a-17 10.0 | Present |
| | (g/l) | | 5.0 | 20.0 | 10.5 | 42.0 | 27.2 | C-114 21.0 | Invention |
| | | | | | | | | Y-1 13.6 | |
| | High-boiling | S-2 | 3.8 | 15.0 | 7.0 | 27.9 | 20.4 | 31.7 | |
| | organic solvent | S-11 | 6.3 | 25.0 | 11.8 | 47.0 | 34.0 | 53.3 | |
| | Volume particle diameter (nm) | | 40 | 49 | 45 | 53 | 43 | 58 | |
| | Ionic group-containing polymer fine particle dispersion PD-5 (g/l) | | 50 | 25 | 50 | 25 | 25 | 25 | |
| 305 | Dye | | a-17 | a-17 | C-114 | C-114 | Y-1 | a-17 10.0 | Present |
| | (g/l) | | 5.0 | 20.0 | 10.5 | 42.0 | 27.2 | C-114 21.0 | Invention |
| | | | | | | | | Y-1 13.6 | |
| | High-boiling | S-2 | 3.8 | 15.0 | 7.0 | 27.9 | 20.4 | 31.7 | |
| | organic solvent | S-11 | 6.3 | 25.0 | 11.8 | 47.0 | 34.0 | 53.3 | |
| | Volume particle diameter (nm) | | 40 | 49 | 45 | 53 | 43 | 58 | |
| | Ionic group-containing polymer fine particle dispersion PD-8 (g/l) | | 50 | 25 | 50 | 25 | 25 | 25 | |
| 306 | Dye | | a-3 | a-3 | C-105 | C-105 | Y-1 | a-3 10.0 | Compa- |
| | (g/l) | | 5.0 | 20.0 | 9.8 | 37.2 | 27.2 | C-105 18.6 | rative |
| | | | | | | | | Y-1 13.6 | Example |
| | High-boiling | S-10 | 7.5 | 30.0 | 4.7 | 18.8 | 13.6 | 21.3 | |
| | organic solvent | S-15 | 2.5 | 10.0 | 14.1 | 56.4 | 40.8 | 63.8 | |
| | Volume particle diameter (nm) | | 42 | 46 | 44 | 51 | 42 | 59 | |

TABLE 21-continued

Ink sets 301 to 309

| Ink Set | | | Light magenta | Magenta | Light cyan | Cyan | Yellow | Black | Remarks |
|---|---|---|---|---|---|---|---|---|---|
| 307 | Dye (g/l) | | a-3 5.0 | a-3 20.0 | C-105 9.3 | C-105 37.2 | Y-1 27.2 | a-3 10.0 C-105 18.6 Y-1 13.6 | Present Invention |
| | High-boiling organic solvent | S-10 S-15 | 7.5 2.5 | 30.0 10.0 | 4.7 14.1 | 18.8 56.4 | 13.6 40.8 | 21.3 63.8 | |
| | Volume particle diameter (nm) | | 42 | 46 | 44 | 51 | 42 | 59 | |
| | Ionic group-containing polymer fine particle dispersion PD-2 (g/l) | | 30 | 15 | 30 | 15 | 15 | 15 | |
| 308 | Dye (g/l) | | a-3 5.0 | a-3 20.0 | C-105 9.3 | C-105 37.2 | Y-1 27.2 | a-3 10.0 C-105 18.6 Y-1 13.6 | Present Invention |
| | High-boiling organic solvent | S-10 S-15 | 7.5 2.5 | 30.0 10.0 | 4.7 14.1 | 18.8 56.4 | 13.6 40.8 | 21.3 63.8 | |
| | Volume particle diameter (nm) | | 42 | 46 | 44 | 51 | 42 | 59 | |
| | Ionic group-containing polymer fine particle dispersion (g/l) | PD-1 PD-4 | 20 30 | 10 15 | 20 30 | 10 15 | 10 15 | 10 15 | |
| 309 | Dye (g/l) | | a-3 5.0 g/l | a-3 20.0 | C-105 9.3 | C-105 37.2 | Y-1 27.2 | a-3 10.0 C-105 18.6 Y-1 13.6 | Present Invention |
| | High-boiling organic solvent | S-10 S-15 | 7.5 2.5 | 30.0 10.0 | 4.7 14.1 | 18.8 56.4 | 13.6 40.8 | 21.3 63.8 | |
| | Volume particle diameter (nm) | | 42 | 46 | 44 | 51 | 42 | 59 | |
| | Ionic group-containing polymer fine particle dispersion PD-8 (g/l) | | 50 | 25 | 50 | 25 | 25 | 25 | |

Recording and Evaluation of Images

Each of the prepared ink sets 301 to 309 and 215 was charged into a cartridge in an ink jet printer PM670C (trade name, manufactured by Epson Co., Ltd.), printed on ink jet paper photo glossy paper EX (trade name, manufactured by Fuji Photo Film Co., Ltd.), and evaluated as follows.

The printing performance, bleeding of a thin line and water resistance were evaluated with the same conditions and criteria as those of Example 2.

Image Fastness Property

For image fastness properties, each of the yellow, magenta, cyan and black inks was used in printing to form a sample of printed characters and evaluated as follows.

(i) For thermal shelf stability in the dark, density ratios before (Ci) and density ratios after (Cf) storage of the sample for 14 days under conditions of 80° C. and 15% RH were measured using an X-RITE 310. Then the residual degree of color (Cf/Ci*100) was calculated.

(ii) For ozone resistance, density ratios before and after storage of the sample for 14 days in conditions of 0.5 ppm of ozone gas were measured in the same manner as in the measurement of thermal shelf stability in the dark. Then a residual degree of color was calculated in the same manner as for the measurement of thermal shelf stability in the dark.

The results for each of the thermal shelf stability and ozone resistance were evaluated into the following 5 ranks: "A" was given when the residual degree of color was 90 to 100%; "B" when the residual degree was 80 to 90%; "C" when the residual degree was 60 to 80%; "D" when the residual degree was 40 to 60%; and "E" when the residual degree was 40% or less. The results are shown in Tables 22 and 23.

TABLE 22

Evaluation results of ink sets 301 to 309 and 215

| Ink Set | Printing performance ① | Printing performance ② | Drying characteristics | Bleeding of thin line ① | Bleeding of thin line ② | Water resistance | Remarks |
|---|---|---|---|---|---|---|---|
| 301 | A | B | ○ | ○ | ○ | ○ | Comparative Example |
| 302 | A | B | ○ | ○ | ○ | ○ | Comparative Example |
| 303 | A | A | ○ | ○ | ○ | ○ | Present Invention |
| 304 | A | A | ○ | ○ | ○ | ○ | Present Invention |
| 305 | A | A | ○ | ○ | ○ | ○ | Present Invention |
| 306 | A | B | ○ | ○ | ○ | ○ | Comparative Example |
| 307 | A | A | ○ | ○ | ○ | ○ | Present Invention |

TABLE 22-continued

Evaluation results of ink sets 301 to 309 and 215

| Ink Set | Printing performance ① | Printing performance ② | Drying characteristics | Bleeding of thin line ① | Bleeding of thin line ② | Water resistance | Remarks |
|---|---|---|---|---|---|---|---|
| 308 | A | A | ○ | ○ | ○ | ○ | Present Invention |
| 309 | A | A | ○ | ○ | ○ | ○ | Present Invention |
| 215 | A | A | X | X | X | X | Comparative Example |

TABLE 23

Residual degrees of color in ink sets 301 to 309 and 215

| | Yellow | | Magenta | | Cyan | | Black | | |
|---|---|---|---|---|---|---|---|---|---|
| Ink set | TD | Ozone | TD | Ozone | TD | Ozone | TD | Ozone | Remark |
| 301 | D | C | D | D | D | D | D | C | Comparative Example |
| 302 | D | C | B | B | B | B | D | C | Comparative Example |
| 303 | B | B | A | A | A | A | B | B | Present Invention |
| 304 | B | B | A | A | A | A | B | B | Present Invention |
| 305 | B | B | A | A | A | A | B | B | Present Invention |
| 306 | C | C | B | B | B | B | C | C | Comparative Example |
| 307 | A | A | A | A | A | A | A | A | Present Invention |
| 308 | A | A | A | A | A | A | A | A | Present Invention |
| 309 | A | A | A | A | A | A | A | A | Present Invention |
| 215 | C | C | D | D | D | D | C | C | Comparative Example |

TD: thermal shelf stability in the dark

From the results in Tables 22 and 23, it was revealed that the inks for ink jet recording according to the present invention were excellent in printing performance, drying characteristics and water resistance, and excellent in performance in printing a thin line without bleeding. Further, the effect of improving image fastness properties was even more significant when the dyes represented by the formulae (C-I) or (M-I) were used.

Example 5

The same ink prepared in Example 4 was charged into a cartridge in an ink jet printer BJ-F850 (trade name, manufactured by Canon Co., Ltd.), printed on ink jet paper photo glossy paper EX (trade name, manufactured by Fuji Photo Film Co., Ltd.) and evaluated in the same manner as in Example 4, and gave the same results as in Example 4.

From the results in Examples 1 to 5, it is clear that the inks for ink jet recording according to the present invention have a significant improvement in stability with time. Further, the ink sets using the inks for ink jet recording according to the present invention were excellent in printing performance, drying characteristics and water resistance, and excellent in performance in printing a thin line without bleeding. Further, the effect of improving image fastness properties was significant.

According to the present invention, there can be provided: an ink for ink jet recording preferable for a thermal, piezoelectric, electric field or acoustic ink jet recording system, not depending on paper, excellent in color reproduction and color tone when printing on an arbitrarily selected paper, capable of high recording density, excellent in ink penetration into a photograph-quality paper, free of staining just after printing, excellent in image water resistance and image fastness properties, and also excellent in the stability of the ink with time and in discharge stability; a method of manufacturing the ink for ink jet recording; and an ink jet recording method capable of high-quality recording by use of the ink for ink jet recording.

What is claimed is:

1. A method of producing an ink for ink jet recording, the method comprising the steps of:
    dispersing colored fine particles, which include at least a hydrophobic high-boiling organic solvent having a boiling point of at least 150° C. and an oil-soluble dye, in an aqueous medium to prepare a colored fine particle dispersion;
    dispersing by emulsification of an ionic group-containing water-insoluble polymer to prepare a fine particle dispersion; and
    mixing the fine particle dispersion with the colored fine particle dispersion wherein an ink is produced.

2. The method of claim 1, wherein the ionic group-containing water-insoluble polymer comprises at least one of a vinyl polymer or a condensation polymer selected from the group consisting of polyurethane, polyester, polyamide, polyurea and polycarbonate.

3. The method of claim 1, wherein the ionic group-containing water-insoluble polymer is a self-emulsifiable water-dispersible polymer.

4. The method of claim 1, wherein the ionic group-containing water-insoluble polymer comprises at least one of a carboxyl group or a sulfonic acid group.

5. The method of claim 1, wherein molecular weight of the ionic group-containing water-insoluble polymer is from 1,000 to 200,000.

6. The method of claim 1, wherein the content of the hydrophobic high-boiling organic solvent in the colored fine particles is 25% by weight or more.

7. The method of claim 1, wherein the ionic group-containing water-insoluble polymer comprises ionic groups in the amount of 0.1 to 3.0 mmol/g.

8. The method of claim 1, wherein the ionic group-containing water-insoluble polymer comprises an amount of 0.1 to 30% by weight relative to the total amount of the ink.

9. The method of claim 1, wherein the ionic group-containing water-insoluble polymer comprises a vinyl polymer, the vinyl polymer including an ionic group selected from the group consisting of a carboxyl group, a sulfonic acid group, a monosulfate group, —OPO(OH)$_2$, a sulfinic acid group, a salt of a carboxyl group, a salt of a sulfonic acid group, a salt of a monosulfate group, a salt of —OPO(OH)$_2$, a salt of a sulfinic acid group, a primary amine, a secondary amine, a tertiary amine, a salt of a primary amine, a salt of a secondary amine, a salt of a tertiary amine, and a quaternary ammonium salt.

10. The method of claim 1, wherein the oil-soluble dye is represented by the following general formula I:

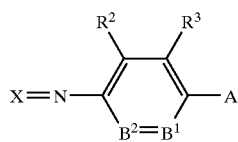

General formula I wherein X represents a residue of a color-photographic coupler; A represents —NR$^4$R$^5$ or a hydroxyl group; R$^4$ and R$^5$ each independently represents a hydrogen atom, an aliphatic group, an aromatic group or a heterocyclic group; B$^1$ represents =C(R$^6$)— or =N—; B$^2$ represents —C(R$^7$)= or —N=; R$^2$, R$^3$, R$^6$ and R$^7$ each independently represents a hydrogen atom, a halogen atom, an aliphatic group, an aromatic group, a heterocyclic group, a cyano group, —OR$^{51}$, —SR$^{52}$, —CO$_2$R$^{53}$, —OCOR$^{54}$, —NR$^{55}$R$^{56}$, —CONR$^{57}$R$^{58}$, —SO$_2$R$^{59}$, —SO$_2$NR$^{60}$R$^{61}$, —NR$^{62}$CONR$^{63}$R$^{64}$, —NR$^{65}$CO$_2$R$^{66}$, —COR$^{67}$, —NR$^{68}$COR$^{69}$ or —NR$^{70}$SO$_2$R$^{71}$; R$^{51}$, R$^{52}$, R$^{53}$, R$^{54}$, R$^{55}$, R$^{56}$, R$^{57}$, R$^{58}$, R$^{59}$, R$^{60}$, R$^{61}$, R$^{62}$, R$^{63}$, R$^{64}$, R$^{65}$, R$^{66}$, R$^{67}$, R$^{68}$, R$^{69}$, R$^{70}$ and R$^{71}$ each independently represents a hydrogen atom, an aliphatic group or an aromatic group; and R$^2$ and R$^3$, R$^3$ and R$^4$, R$^4$ and R$^5$, R$^5$ and R$^6$, and R$^6$ and R$^7$ may be bound to each other to form a ring.

11. The method of claim 1, wherein the hydrophobic high-boiling organic solvent comprises at least one hydrophobic high-boiling organic solvent selected from the group consisting of hydrophobic high-boiling organic solvents represented by the following formulae S-1 to S-9:

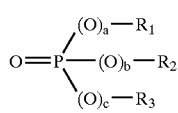

Formula S-1

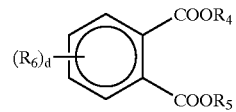

Formula S-2

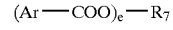

Formula S-3

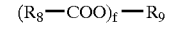

Formula S-4

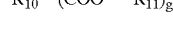

Formula S-5

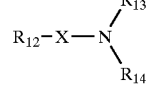

Formula S-6

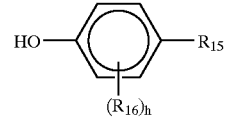

Formula S-7

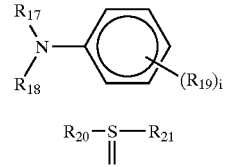

Formula S-8

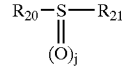

Formula S-9 wherein:
in formula S-1, R$_1$, R$_2$ and R$_3$ each independently represents an aliphatic group or aryl group, and a, b and c each independently represents 0 or 1;

in formula S-2, R$_4$ and R$_5$ each independently represents an aliphatic or aryl group, R$_6$ represents a halogen atom, an alkyl group, an alkoxy group, an aryloxy group, an alkoxycarbonyl group or an aryloxycarbonyl group, d is an integer from 0 to 3, and, if d is two or more, a plurality of R$_6$ groups may be the same as each other or different;

in formula S-3, Ar represents an aryl group, e is an integer from 1 to 6, and R$_7$ represents a hydrocarbon group or hydrocarbon groups bound to each other via ether linkage;

in formula S-4, R$_8$ represents an aliphatic group, f is an integer from 1 to 6, and R$_9$ represents a hydrocarbon group or hydrocarbon groups bound to each other via ether linkage;

in formula S-5, g is an integer from 2 to 6, R$_{10}$ represents a hydrocarbon group other than an aryl group, and R$_{11}$ represents an aliphatic group or an aryl group;

in formula S-6, R$_{12}$, R$_{13}$ and R$_{14}$ each independently represents a hydrogen atom, an aliphatic group or an aryl group, X represents —CO— or SO$_2$—, and R$_{12}$ and R$_{13}$ or R$_{13}$ and R$_{14}$ may be bound to each other to form a ring;

in formula S-7, R$_{15}$ represents an aliphatic group, an alkoxycarbonyl group, an aryloxycarbonyl group, an alkylsulfonyl group, an arylsulfonyl group, an aryl group or a cyano group, R$_{16}$ represents a halogen atom, an aliphatic group, an aryl group, an alkoxy group or an aryloxy group, h is an integer from 0 to 3, and, if h is two or more, a plurality of R$_{16}$ groups may be the same as each other or different;

in formula S-8, $R_{17}$ and $R_{18}$ each independently represents an aliphatic group or an aryl group, $R_{19}$ represents a halogen atom, an aliphatic group, an aryl group, an alkoxy group or an aryloxy group, i is an integer from 0 to 4, and, if i is two or more, a plurality of $R_{19}$ groups may be the same as each other or different;

in formula S-9, $R_{20}$ and $R_{21}$ each independently represents an aliphatic group or an aryl group, and j is 1 or 2;

in the formulae S-1 to S-9, in any of $R_1$ to $R_6$, $R_8$, and $R_{11}$ to $R_{21}$ that represents an aliphatic group or a group containing an aliphatic group, the aliphatic group may be straight-chain, branched or cyclic, may contain an unsaturated bond, and may have a substituent group; in any of $R_1$ to $R_6$, $R_8$ and $R_{11}$ to $R_{21}$ that represents a cycloalkyl group or a group containing a cycloalkyl group, the cycloalkyl group may contain an unsaturated bond in a 3- to 8-membered ring thereof, or may have a substituent group or a crosslinking group; and in any of $R_1$ to $R_6$, $R_8$, and $R_{11}$ to $R_{21}$ that represents an aryl group or a group containing an aryl group, the aryl group may be substituted; and in the formulae S-3, S-4 and S-5, any of $R_7$, $R_9$ and $R_{10}$ that is a hydrocarbon group may contain a cyclic structure or an unsaturated bond or may have a substituent group.

12. The method of claim 1, wherein the relative dielectric constant at 25° C. of the hydrophobic high-boiling organic solvent is from 3 to 12.

13. The method of claim 1, wherein the hydrophobic high-boiling organic solvent comprises an amount of 50 to 1500% by weight relative to the oil-soluble dye.

14. The method of claim 1, wherein the colored fine particles comprise a content amount of 1 to 45% by weight relative to the total amount of the ink.

15. The method of claim 1, wherein the colored fine particle dispersion comprises colored fine particles with an average particle diameter of at most 100 nm.

16. The method of claim 1, wherein the dispersing by emulsification of the ionic group-containing water-insoluble polymer comprises emulsifying the organic solvent containing the ionic group-containing water-insoluble polymer either by addition of water to the organic solvent solution or by addition of the organic solvent solution to water.

17. An ink jet recording method, which comprises the steps of:
producing an ink for ink jet recording according to the method of claim 1; and
using the ink for ink jet recording.

18. The method of claim 17, wherein the step of using the ink for ink jet recording includes using an image-receiving material comprising a support and, on the support, an ink-receiving layer including a porous inorganic pigment.

19. The method of claim 17, wherein the oil-soluble dye is represented by the following general formula I:

General formula I

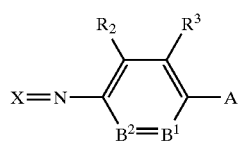

wherein X represents a residue of a color-photographic coupler; A represents —$NR^4R^5$ or a hydroxyl group; $R^4$ and $R^5$ each independently represents a hydrogen atom, an aliphatic group, an aromatic group or a heterocyclic group; $B^1$ represents =$C(R^6)$— or =N—; $B^2$ represents —$C(R^7)$= or —N=; $R^2$, $R^3$, $R^6$ and $R^7$ each independently represents a hydrogen atom, a halogen atom, an aliphatic group, an aromatic group, a heterocyclic group, a cyano group, —$OR^{51}$, —$SR^{52}$, —$CO_2R^{53}$, —$COOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$ or —$NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group; and $R^2$ and $R^3$, $R^3$ and $R^4$, $R^4$ and $R^5$, $R^5$ and $R^6$, and $R^6$ and $R^7$ may be bound to each other to form a ring.

20. An ink jet recording method, which comprises the steps of:
producing an ink for ink jet recording according to a method comprising the steps of:
dispersing colored fine particles, which include at least a hydrophobic high-boiling organic solvent having a boiling point of at least 150° C. and an oil-soluble dye, in an aqueous medium to prepare a colored fine particle dispersion;
dispersing by emulsification of an ionic group-containing water-insoluble polymer to prepare a fine particle dispersion; and
mixing the fine particle dispersion with the colored fine particle dispersion; and
using the ink for ink jet recording, wherein the oil-soluble dye is represented by the following general formula M-I:

General formula M-I

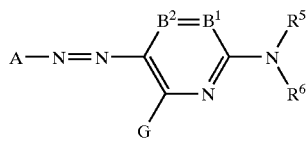

wherein A represents a residue of a 5-membered heterocyclic ring diazo component A—$NH_2$; $B^1$ represents =$CR^1$— and $B^2$ represents —$CR^2$=, or $B^1$ represents a nitrogen atom and $B^2$ represents —$CR^2$=, or $B^1$ represents =$CR^1$— and $B^2$ represents a nitrogen atom; $R^5$ and $R^6$ each independently represents a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, and each of these groups may have a further substituent group; G, $R^1$ and $R^2$ each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbomoyloxy group, heterocyclic oxy group, alkoxycarbonyloxy group, aryloxycarbonyloxy group, amino group, anilino group, acylamino group, ureido group, sulfamoylamino group, alkoxycarbonylamino group, alkylarylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group, and each of these groups may have a further substituent group; and $R^1$ and $R^5$ or $R^5$ and $R^6$ may be bonded to form a 5- or 6-membered ring.

21. An ink jet recording method, which comprises the steps of:

producing an ink for ink jet recording according to a method comprising the steps of:

dispersing colored fine particles, which include at least a hydrophobic high-boiling organic solvent having a boiling point of at least 150° C. and an oil-soluble dye, in an aqueous medium to prepare a colored fine particle dispersion;

dispersing by emulsification of an ionic group-containing water-insoluble polymer to prepare a fine particle dispersion; and mixing the fine particle dispersion with the colored fine particle dispersion; and using the ink for ink jet recording, wherein the oil-soluble dye is represented by the following general formula C-I:

General formula C-I

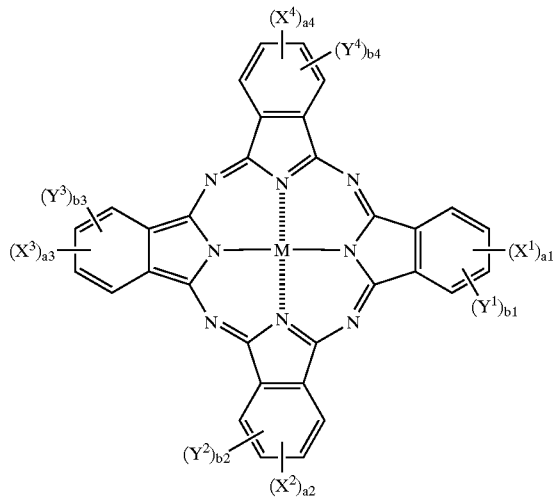

wherein $X^1$, $X^2$, $X^3$ and $X^4$ each independently represents —SO—$Z^1$, —SO$_2$—$Z^1$ or —SO$_2$NR$^{21}$R$^{22}$; each $Z^1$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; each of $R^{21}$ and $R^{22}$ independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, but $R^{21}$ and $R^{22}$ are not both hydrogen atoms; $Y^1$, $Y^2$, $Y^3$ and $Y^4$ each represents a monovalent substituent; and $a^1$, $a^2$, $a^3$, $a^4$, $b^1$, $b^2$, $b^3$ and $b^4$ represent substituent numbers for $X^1$, $X^2$, $X^3$, $X^4$, $Y^1$, $Y^2$, $Y^3$ and $Y^4$ respectively, each substituent number being an integer from 0 to 4 and the sum of $a^1$, $a^2$, $a^3$ and $a^4$ being at least 2.

22. A method of producing an ink for ink jet recording, the method comprising the steps of:

dispersing colored fine particles, which include at least a hydrophobic high-boiling organic solvent having a boiling point of at least 150° C. and an oil-soluble dye, in an aqueous medium to prepare a colored fine particle dispersion;

dispersing by emulsification of an ionic group-containing water-insoluble polymer to prepare a fine particle dispersion; and mixing the fine particle dispersion with the colored fine particle dispersion wherein an ink is produced, wherein the oil-soluble dye is represented by the following general formula II:

General formula II

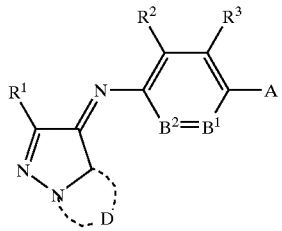

wherein $R^1$ represents a hydrogen atom, an aliphatic group, an aromatic group, a heterocyclic group, a cyano group, —OR$^{11}$, —SR$^{12}$, —CO$_2$R$^{13}$, —OCOR$^{14}$, —NR$^{15}$R$^{16}$, —CONR$^{17}$R$^{18}$, —SO$_2$R$^{19}$, —SO$_2$NR$^{20}$R$^{21}$, —NR$^{22}$CONR$^{23}$R$^{24}$, —NR$^{25}$CO$_2$R$^{26}$, —COR$^{27}$, —NR$^{28}$COR$^{29}$ or —NR$^{30}$SO$_2$R$^{31}$; $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group or an aromatic group; D represents an atomic group forming a 5- or 6-membered nitrogenous heterocyclic ring which may be substituted with at least one substituent group and may further form a fused ring with another ring; at least one substituent group on the atomic group represented by D is an aliphatic group, an aromatic group, a heterocyclic group, a cyano group, —OR$^{81}$, —SR$^{82}$, —CO$_2$R$^{83}$, —OCOR$^{84}$, —NR$^{85}$R$^{86}$, —CONR$^{87}$R$^{88}$, —SO$_2$R$^{89}$—SO$_2$NR$^{90}$R$^{91}$, —NR$^{92}$CONR$^{93}$R$^{94}$, —NR$^{95}$CO$_2$R$^{96}$, —COR$^{97}$, —NR$^{98}$COR$^{99}$ or —NR$^{100}$SO$_2$R$^{101}$; and $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$ and $R^{101}$ each independently represents a hydrogen atom, an aliphatic group or an aromatic group, A represents —NR$^4$R$^5$ or a hydroxyl group; $R^4$ and $R^5$ each independently represents a hydrogen atom, an aliphatic group, an aromatic group or a heterocyclic group; $B^1$ represents =C($R^6$)— or =N—; $B^2$ represents —C($R^7$)= or —N=; $R^2$, $R^3$, $R^6$ and $R^7$ each independently represents a hydrogen atom, a halogen atom, an aliphatic group, an aromatic group, a heterocyclic group, a cyano group, —OR$^{51}$, —SR$^{52}$, —CO$_2$R$^{53}$, —OCOR$^{54}$, —NR$^{55}$R$^{56}$, —CONR$^{57}$ R$^{58}$, —SO$_2$R$^{59}$, —SO$_2$NR$^{60}$R$^{61}$, —NR$^{62}$CONR$^{63}$R$^{64}$, —NR$^{65}$CO$_2$R$^{66}$, —COR$^{67}$, —NR$^{68}$COR$^{69}$ or —NR$^{70}$SO$_2$R$^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group; and $R^2$ and $R^3$, $R^3$ and $R^4$, $R^4$ and $R^5$, $R^5$ and $R^6$, and $R^6$ and $R^7$ may be bound to each other to form a ring.

23. The method of claim 22, wherein the compound represented by the general formula II is a compound represented by the following general formula III:

General formula III

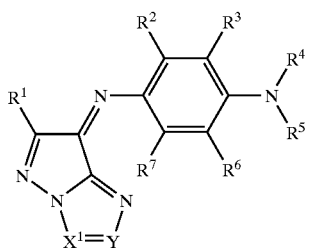

wherein one of $X^1$ and Y represents —N= and the other represents —$C(R^8)$=, and $R^8$ represents a hydrogen atom, an aliphatic group or an aromatic group.

24. A method of producing an ink for ink jet recording, the method comprising the steps of:

dispersing colored fine particles, which include at least a hydrophobic high-boiling organic solvent having a boiling point of at least 150° C. and an oil-soluble dye, in an aqueous medium to prepare a colored fine particle dispersion;

dispersing by emulsification of an ionic group-containing water-insoluble polymer to prepare a fine particle dispersion; and mixing the fine particle dispersion with the colored fine particle dispersion wherein an ink is produced, wherein the oil-soluble dye is represented by at least one compound represented by one of the following formulae IV-1 to IV-4:

(IV-1)

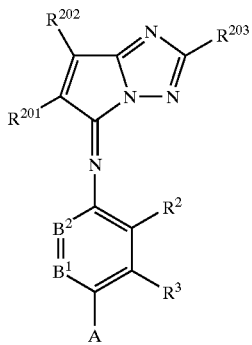

(IV-2)

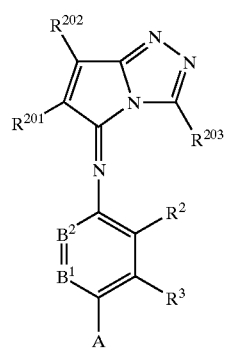

(IV-3)

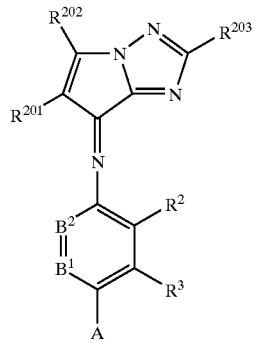

(IV-4)

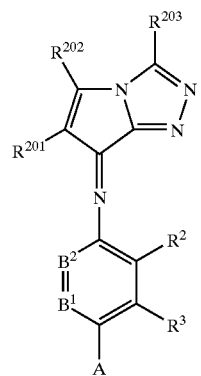

wherein $R^{201}$, $R^{202}$ and $R^{203}$ each independently represents a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$ or —$NR^{30}SO_2R^{31}$; $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group or an aromatic group; and $R^{201}$ and $R^{202}$ may be bound to each other to form a ring, A represents —$NR^4R^5$ or a hydroxyl group; $R^4$ and $R^5$ each independently represents a hydrogen atom, an aliphatic group, an aromatic group or a heterocyclic group; $B^1$ represents =$C(R^6)$— or =N—; $B^2$ represents —$C(R^7)$= or —N=; $R^2$, $R^3$, $R^6$ and $R^7$ each independently represents a hydrogen atom, a halogen atom, an aliphatic group, an aromatic group, a heterocyclic group, a cyano group, —$OR^{51}$, —$SR^{52}$, —$CO_2R^{53}$, —$OCOR^{54}$, —$NR^{55}R^{56}$, —$CONR^{57}R^{58}$, —$SO^2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$ or —$NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group; and $R^2$ and $R^3$, $R^3$ and $R^4$, $R^4$ and $R^5$, $R^5$ and $R^6$, and $R^6$ and $R^7$ may be bound to each other to form a ring.

25. A method of producing an ink for ink jet recording, the method comprising the steps of:

dispersing colored fine particles, which include at least a hydrophobic high-boiling organic solvent having a boiling point of at least 150° C. and an oil-soluble dye, in an aqueous medium to prepare a colored fine particle dispersion;

dispersing by emulsification of an ionic group-containing water-insoluble polymer to prepare a fine article dispersion; and mixing the fine particle dispersion with the colored fine particle dispersion wherein an ink is produced, wherein the oil-soluble dye is represented by the following general formula M-I:

General formula M-I

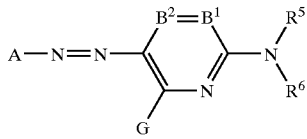

wherein A represents a residue of a 5-membered heterocyclic ring diazo component A—NH$_2$; B$^1$ represents =CR$^1$— and B$^2$ represents —CR$^2$=, or B$^1$ represents a nitrogen atom and B$^2$ represents —CR$^2$=, or B$^1$ represents =CR$^1$— and B$^2$ represents a nitrogen atom; R$^5$ and R$^6$ each independently represents a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, and each of these groups may have a further substituent group; G, R$^1$ and R$^2$ each independently represents a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbomoyloxy group, heterocyclic oxy group, alkoxycarbonyloxy group, aryloxycarbonyloxy group, amino group substituted by alkyl group or aryl group or heterocyclic group, acylamino group, ureido group, sulfamoylamino group, alkoxycarbonylamino group, alkylarylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group, and each of these groups may have further substituent group(s); and R$^1$ and R$^5$ or R$^5$ and R$^6$ may be bonded to form a 5- or 6-membered ring.

26. The method of claim 25, wherein A in the general formula M-I is represented by one of the following formulae M-a through M-f:

(M-a)

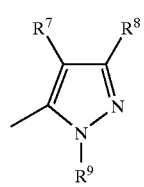

(M-b)

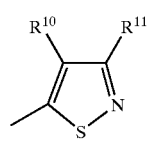

(M-c)

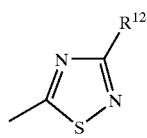

(M-d)

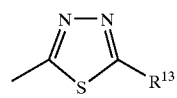

(M-e)

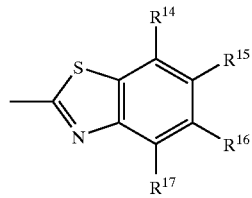

(M-f)

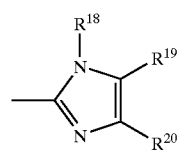

wherein R$^7$ through R$^{20}$ each independently represents the same range of substituents as each of G, R$^1$ and R$^2$ of the general formula M-I.

27. A method of producing an ink for ink jet recording, the method comprising the steps of:

dispersing colored fine particles, which include at least a hydrophobic high-boiling organic solvent having a boiling point of at least 150° C. and an oil-soluble dye, in an aqueous medium to prepare a colored fine particle dispersion;

dispersing by emulsification of an ionic group-containing water-insoluble polymer to prepare a fine particle dispersion; and mixing the fine particle dispersion with the colored fine particle dispersion wherein an ink is produced, wherein the oil-soluble dye is represented by the following general formula C-I:

General formula C-I

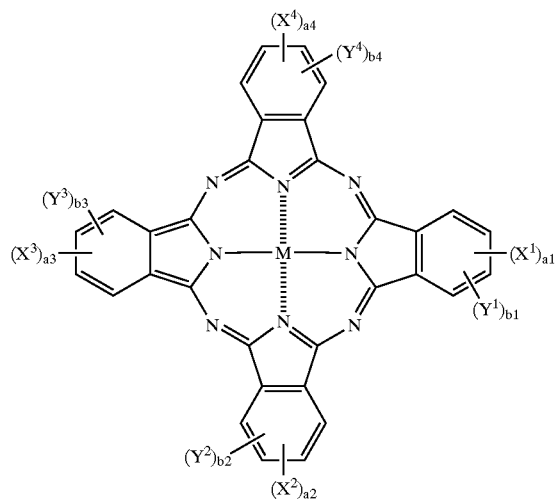

wherein $X^1$, $X^2$, $X^3$ and $X^4$ each independently represents —SO—$Z^1$, —SO$_2$—$Z^1$ or —SO$_2$NR$^{21}$R$^{22}$; each $Z^1$ independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; each of $R^{21}$ and $R^{22}$ independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and $R^{21}$ and $R^{22}$ are not both hydrogen atoms; $Y^1$, $Y^2$, $Y^3$ and $Y^4$ each represents a monovalent substituent; and $a^1$, $a^2$, $a^3$, $a^4$, $b^1$, $b^2$, $b^3$ and $b^4$ represent substituent numbers for $X^1$, $X^2$, $X^3$, $X^4$, $Y^1$, $Y^2$, $Y^3$ and $Y^4$ respectively, each substituent number being an integer from 0 to 4 and the sum of $a^1$, $a^2$, $a^3$ and $a^4$ being at least 2.

* * * * *